(12) United States Patent
Itoh

(10) Patent No.: US 6,327,099 B1
(45) Date of Patent: Dec. 4, 2001

(54) ZOOM LENS AND OPTICAL DEVICE HAVING THE SAME

(75) Inventor: Yoshinori Itoh, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/524,572

(22) Filed: Mar. 13, 2000

(30) Foreign Application Priority Data

Mar. 16, 1999 (JP) .................................................. 11-069818
Mar. 16, 1999 (JP) .................................................. 11-069819

(51) Int. Cl.$^7$ .................................................. G02B 15/14
(52) U.S. Cl. ........................................ 359/686; 359/683
(58) Field of Search .................................. 359/686, 683, 359/684, 680, 681, 682

(56) References Cited

U.S. PATENT DOCUMENTS

| 5,055,868 | 10/1991 | Itoh et al. | 354/222 |
| 5,218,478 | 6/1993 | Itoh | 359/692 |
| 5,274,504 | 12/1993 | Itoh | 359/676 |
| 5,305,148 | 4/1994 | Ikemori et al. | 359/689 |
| 5,365,376 | 11/1994 | Itoh | 359/686 |
| 5,574,599 | 11/1996 | Hoshi et al. | 359/689 |
| 5,585,971 | 12/1996 | Itoh | 359/692 |
| 5,587,840 | 12/1996 | Itoh | 359/686 |
| 5,638,210 | 6/1997 | Sato et al. | 359/557 |
| 5,663,835 | * 9/1997 | Shibayama | 359/684 |
| 5,687,027 | 11/1997 | Itoh | 359/692 |
| 5,815,320 | 9/1998 | Hoshi et al. | 359/686 |
| 5,831,772 | 11/1998 | Nishio et al. | 359/689 |
| 5,844,725 | 12/1998 | Itoh | 359/692 |
| 6,008,953 | 12/1999 | Itoh | 359/692 |

FOREIGN PATENT DOCUMENTS

| 6-265827 | 9/1994 | (JP) . |
| 7-318865 | 12/1995 | (JP) . |
| 8-82769 | 3/1996 | (JP) . |

* cited by examiner

Primary Examiner—Scott J. Sugarman
Assistant Examiner—Michael A. Lucas
(74) Attorney, Agent, or Firm—Fitzpatrick, Cella, Harper & Scinto

(57) ABSTRACT

A zoom lens is enabled to favorably correct aberrations even when a vibration-proofing operation is performed, despite high magnification thereof. This zoom lens includes, in order from an object side, a first lens unit of negative refractive power, a second lens unit of positive refractive power, a third lens unit of positive refractive power, and a fourth lens unit of negative refractive power. When performing zooming from a wide-angle end of this zoom lens to a telephoto end thereof, both of the spacing between the first and second lens units increases, and the spacing between the second and third lens units increase, while the spacing between the third and fourth lens units decreases. Further, an image of an object is displaced by moving the first lens unit or a part of the second lens unit in such a manner as to have a component perpendicular to an optical axis. Thus, an image blur is corrected when the zoom lens vibrates.

18 Claims, 58 Drawing Sheets

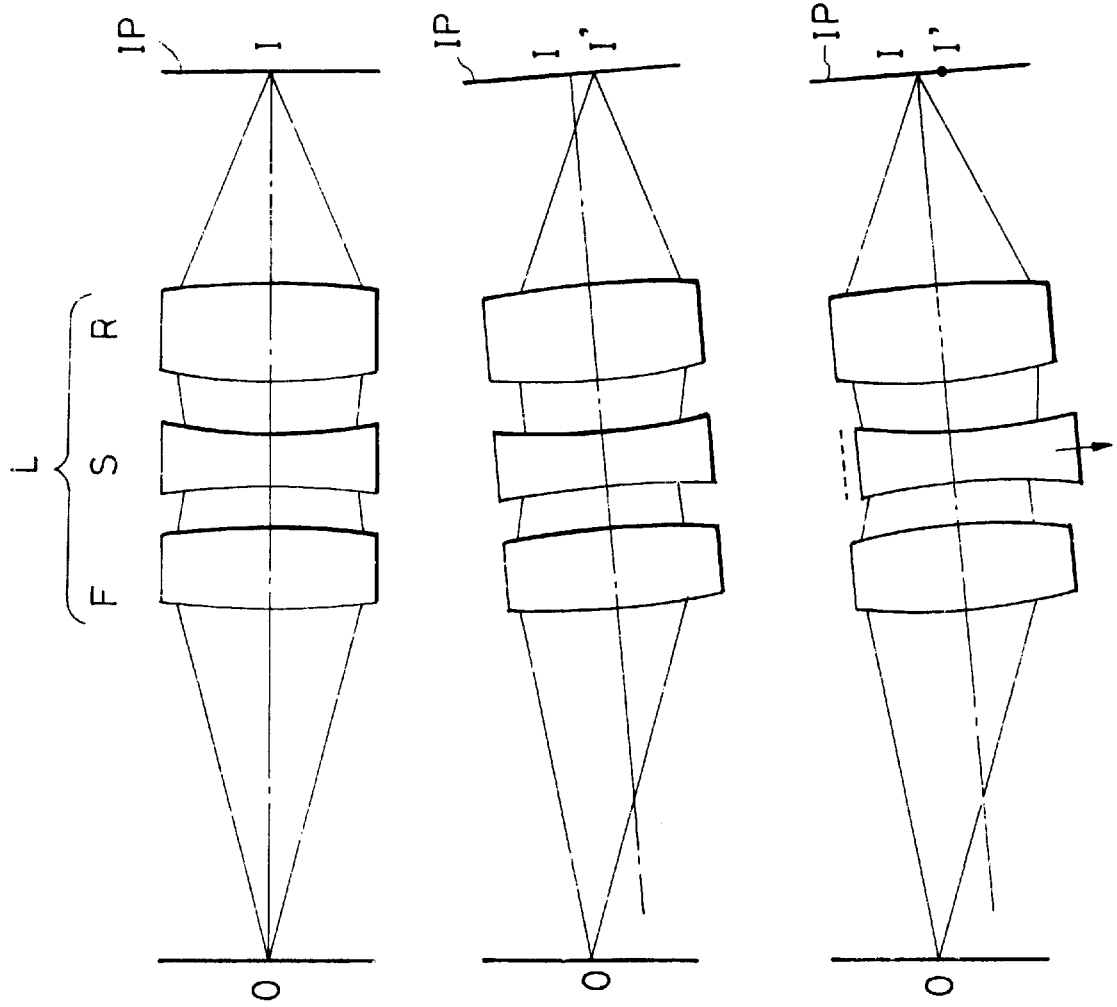

FIG. 7
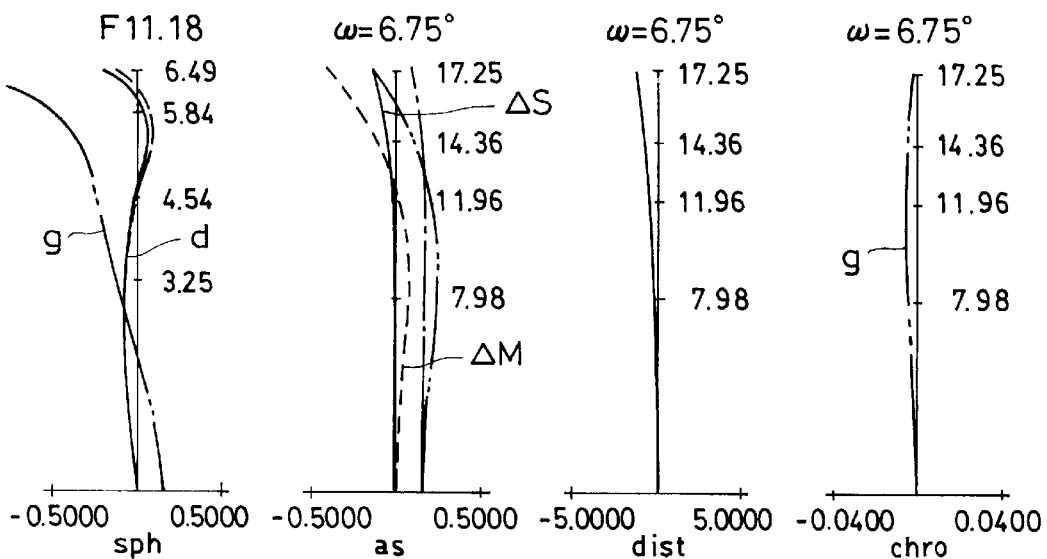
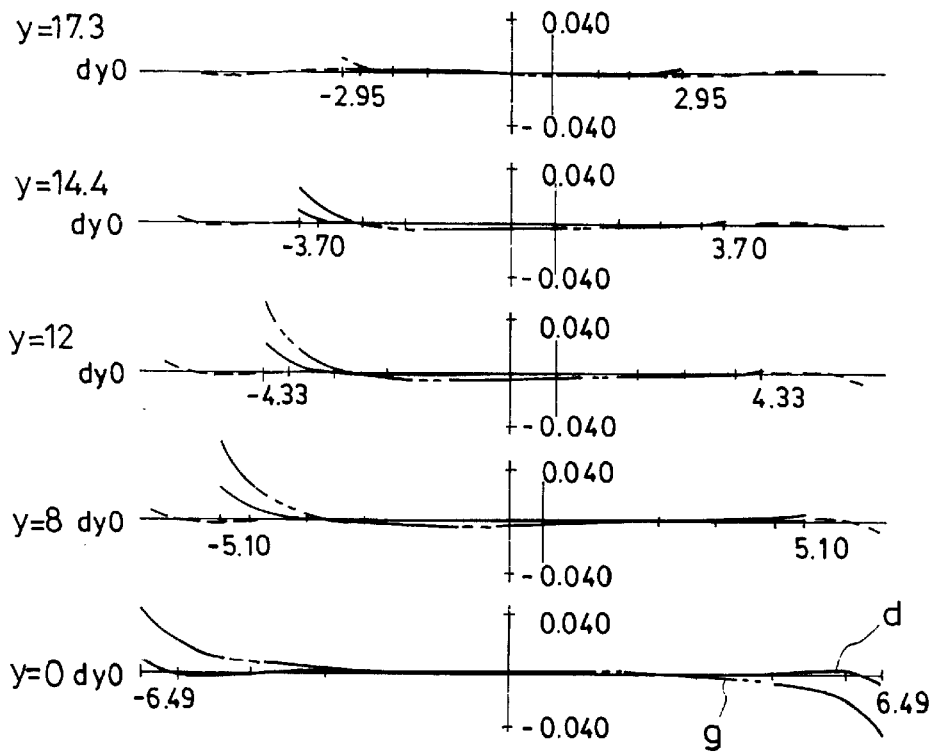

FIG. 12
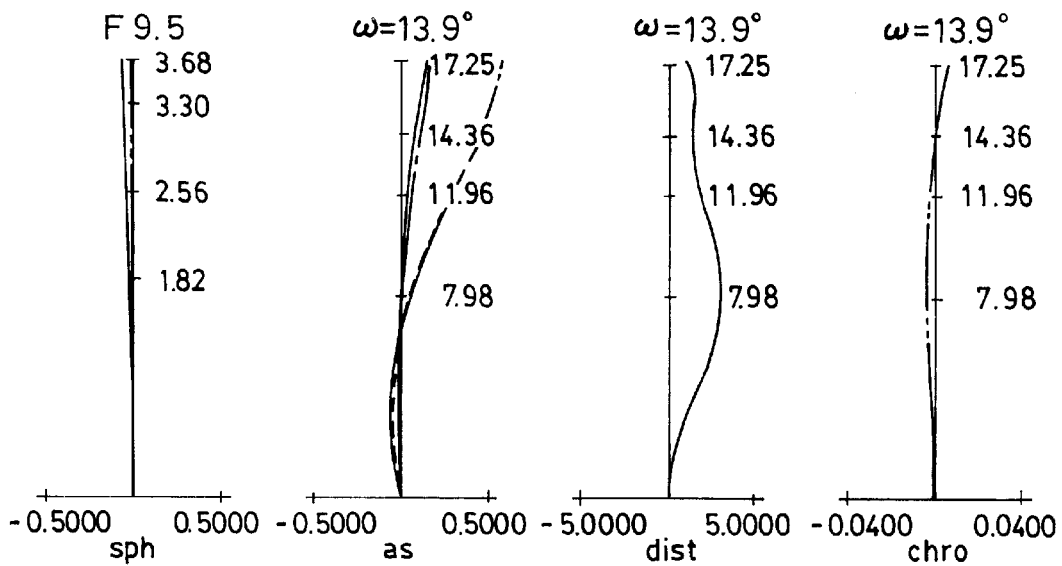
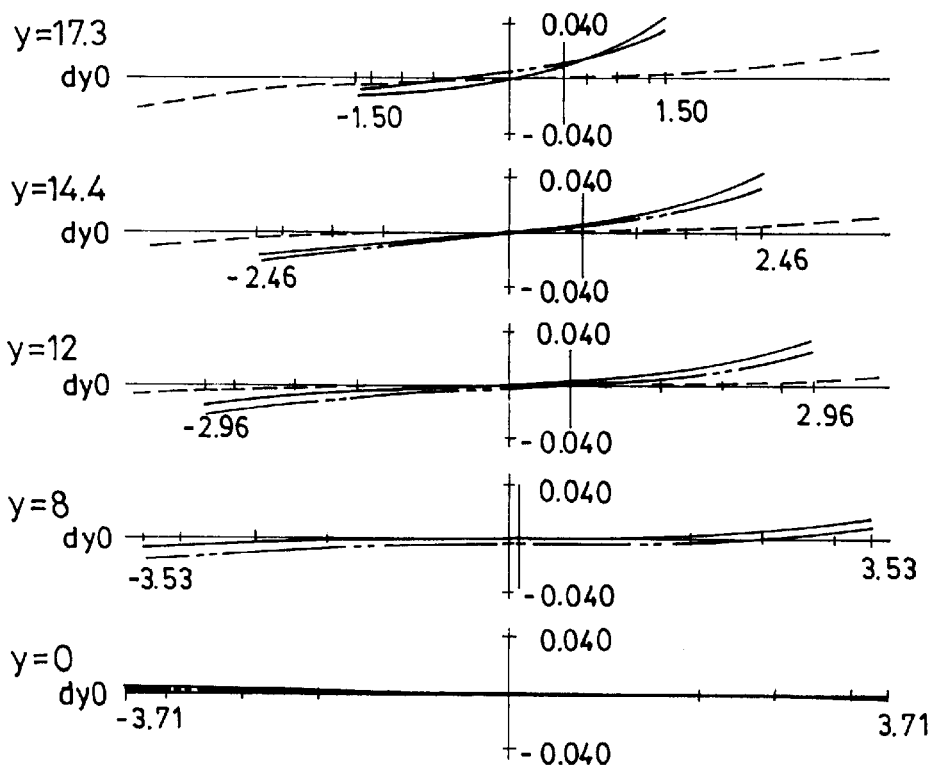

FIG. 14
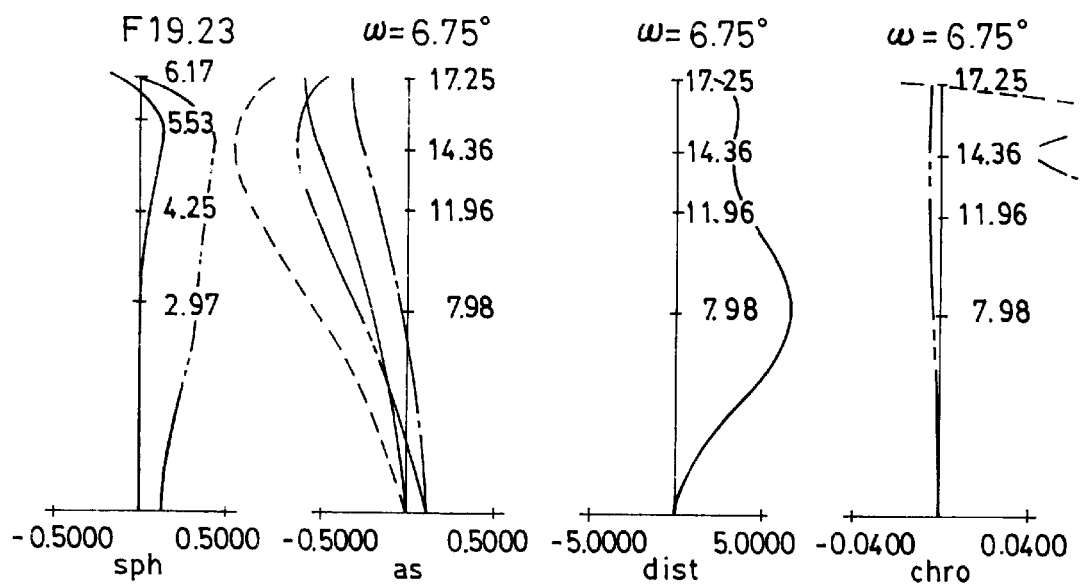
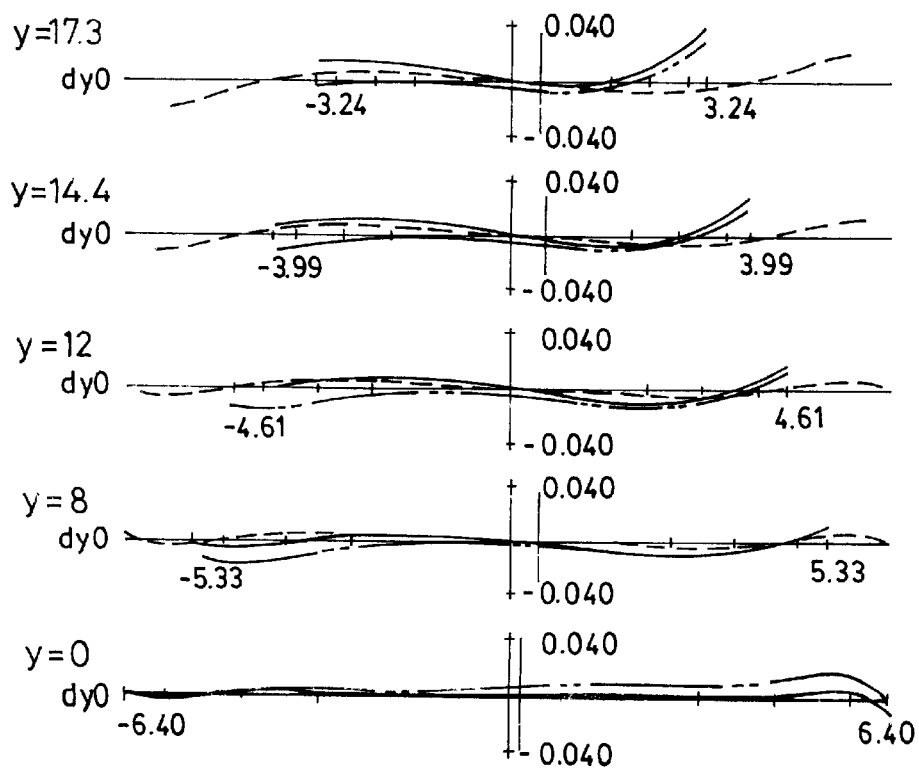

FIG. 19
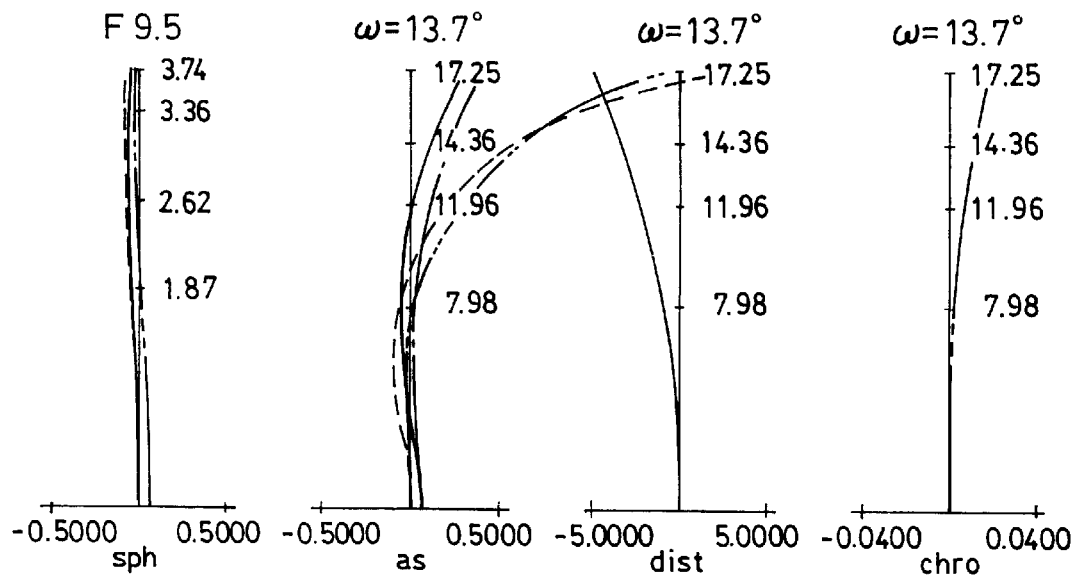
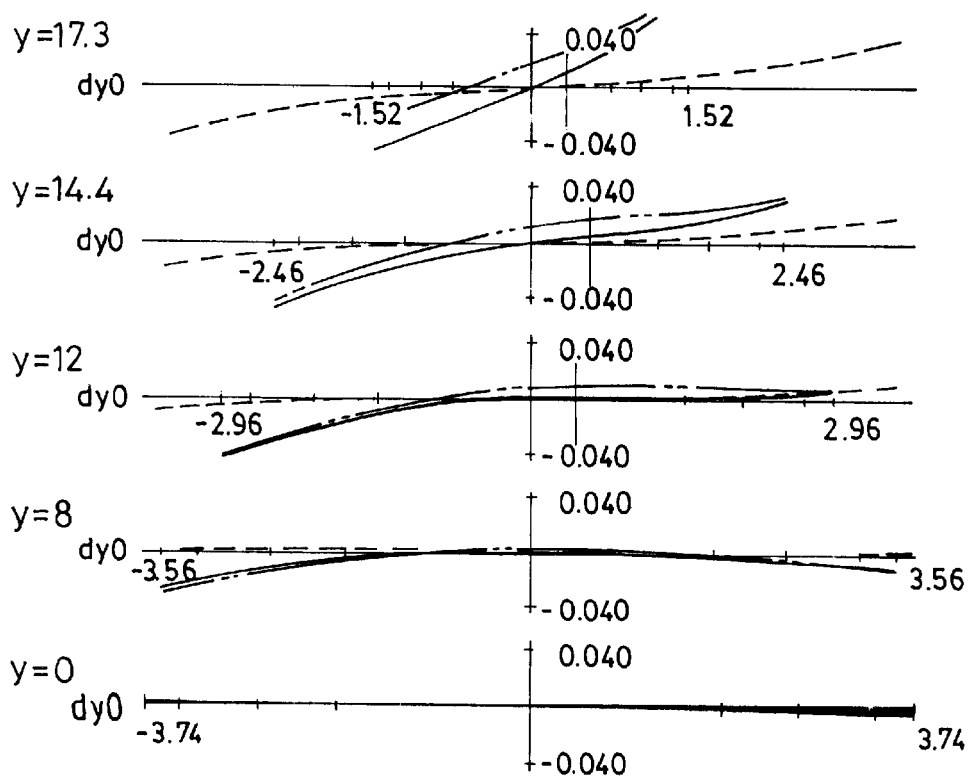

FIG. 21
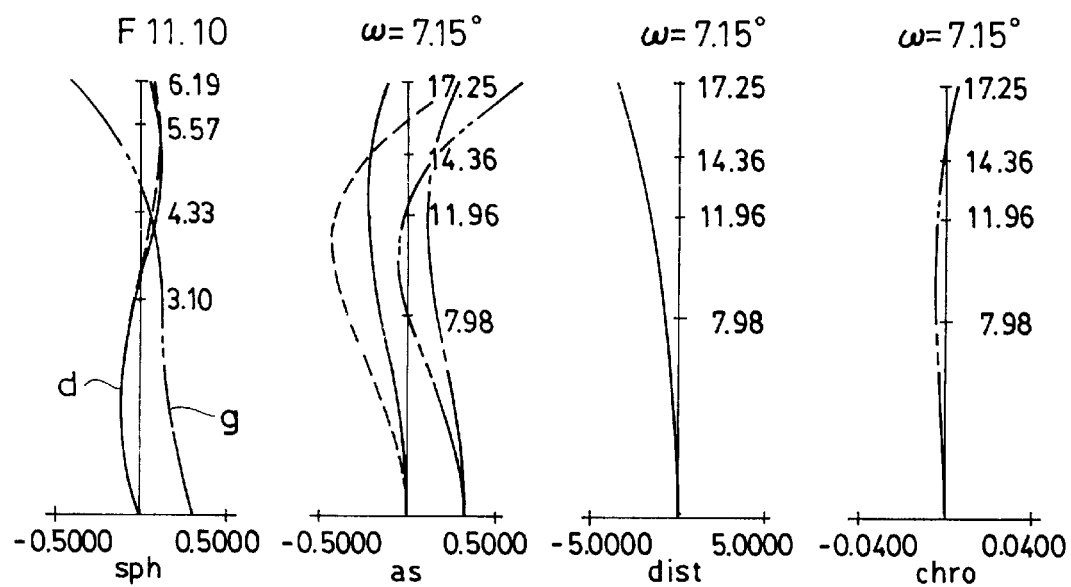
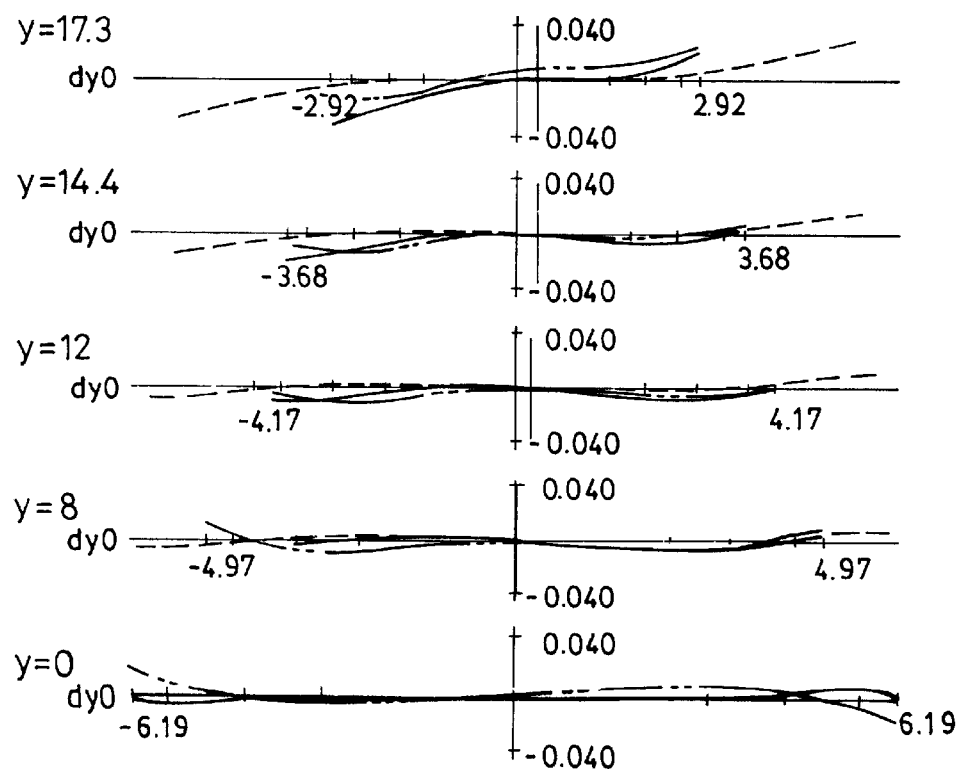

FIG. 24
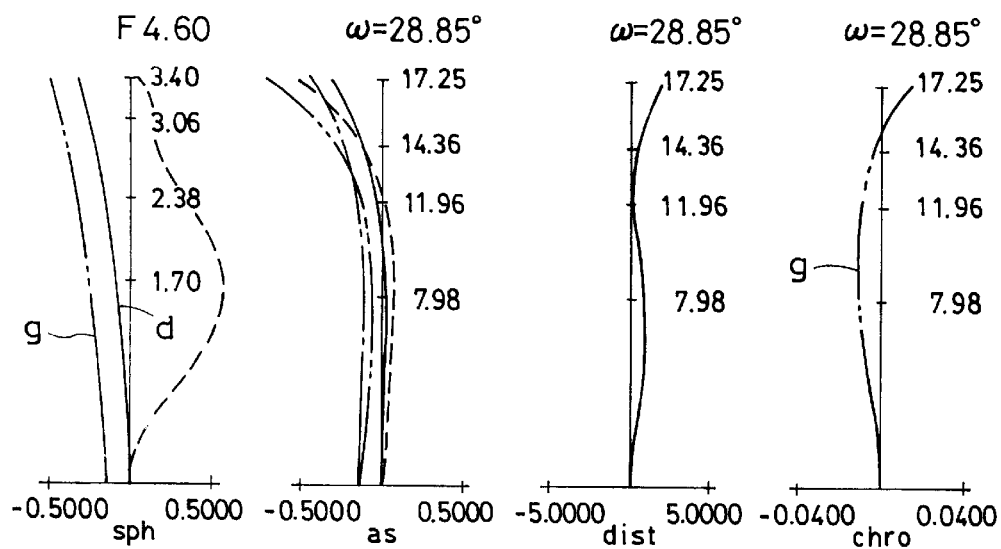
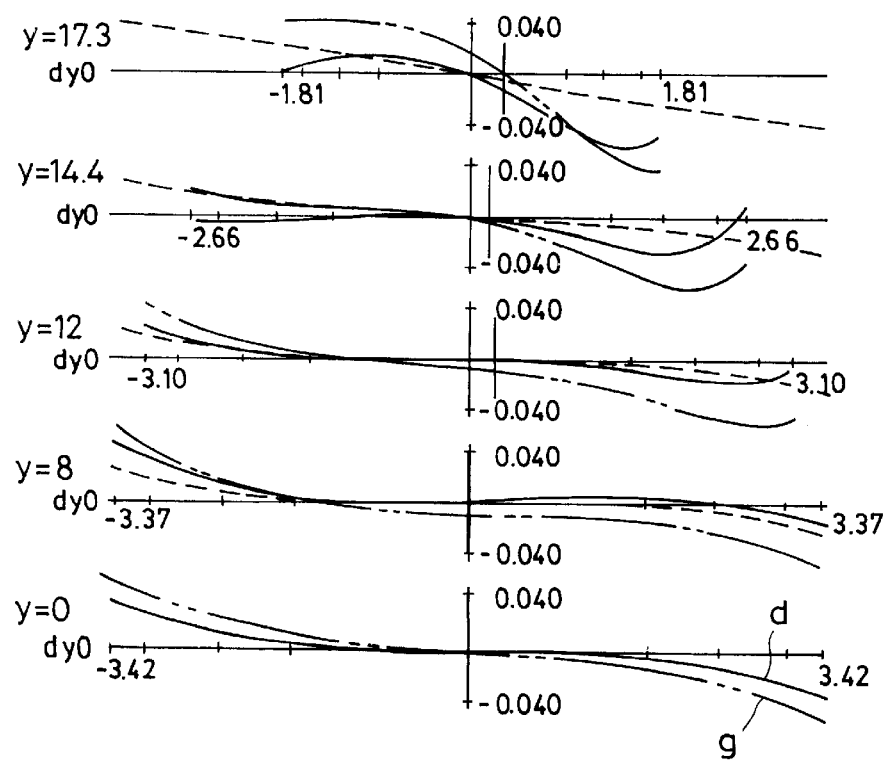

FIG. 26
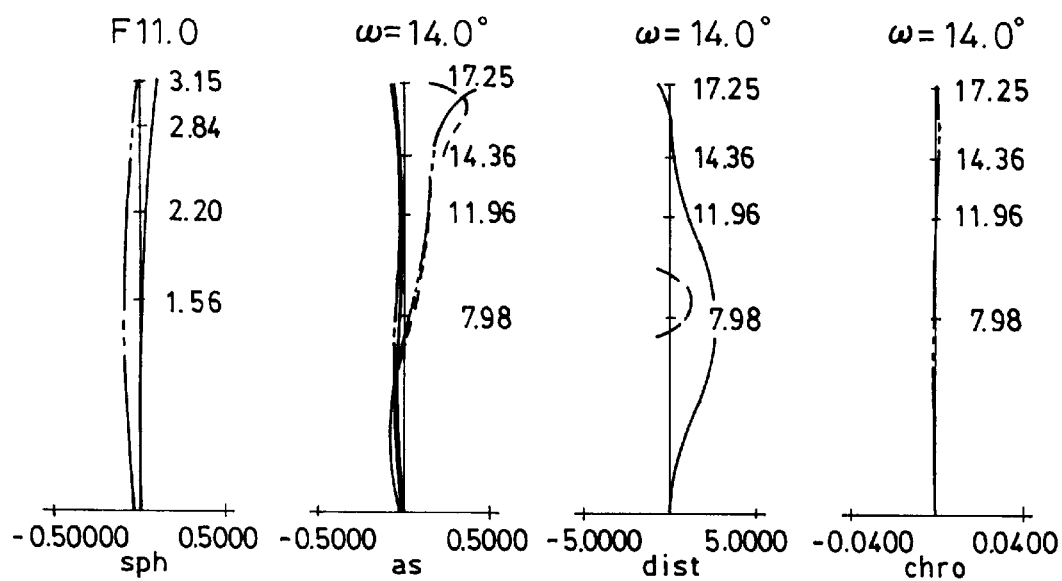
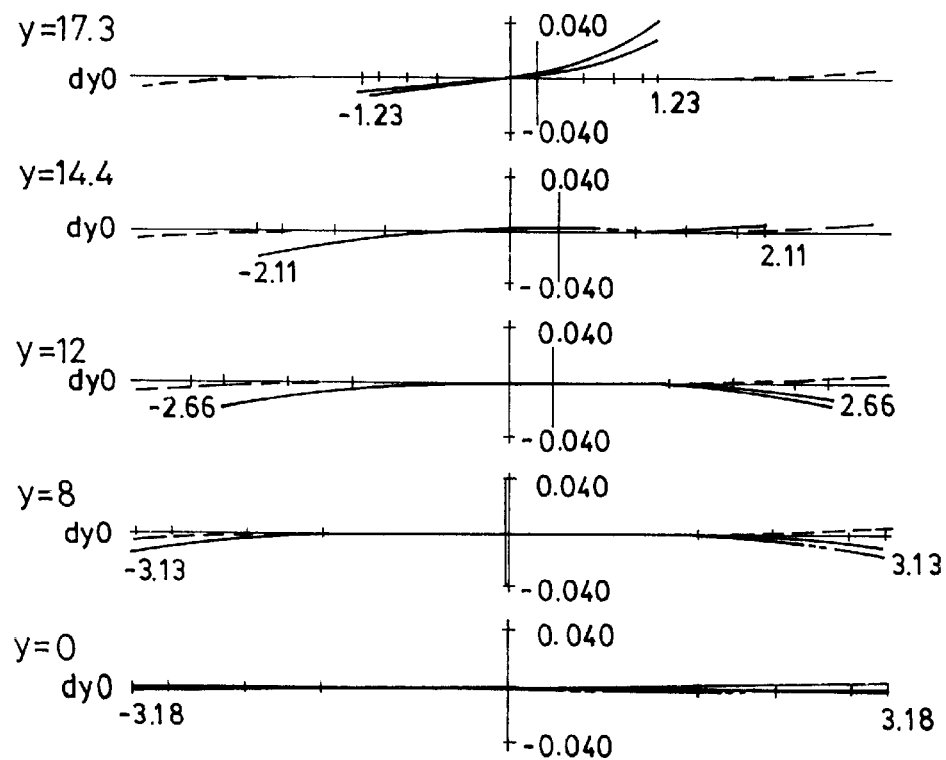

FIG. 31
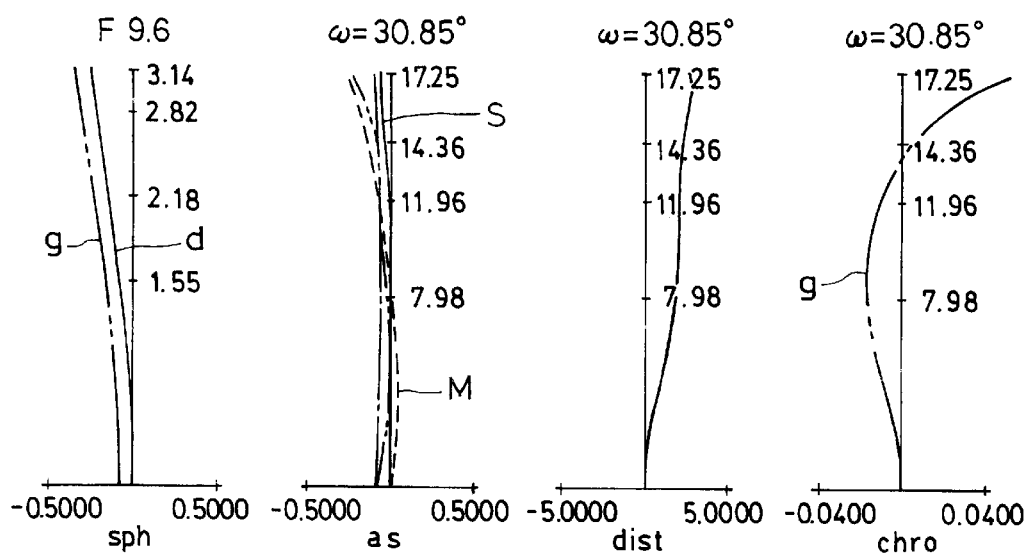
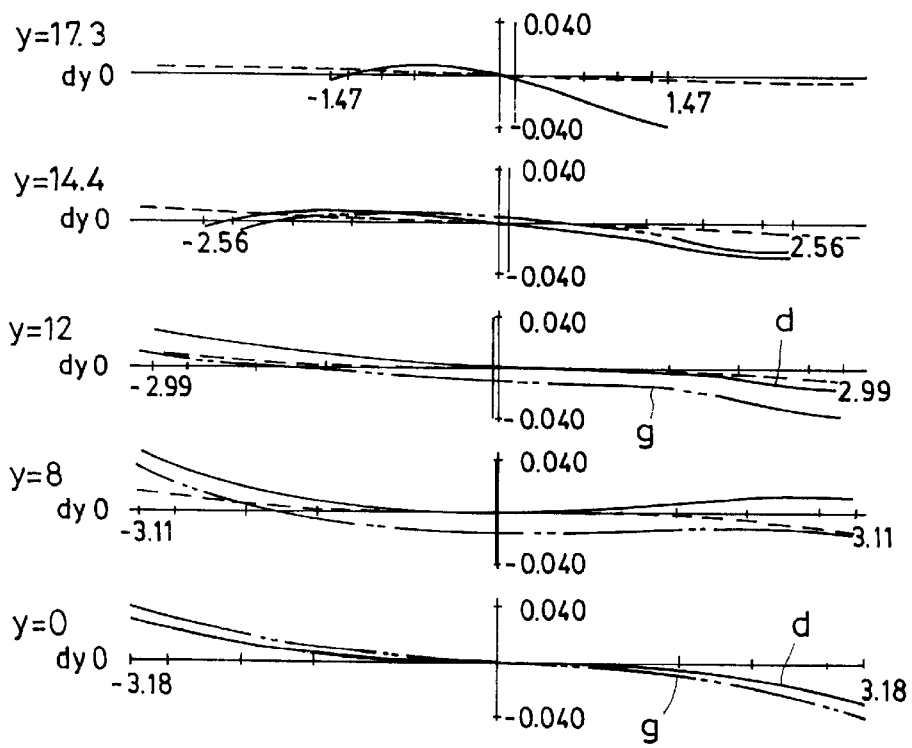

FIG. 33
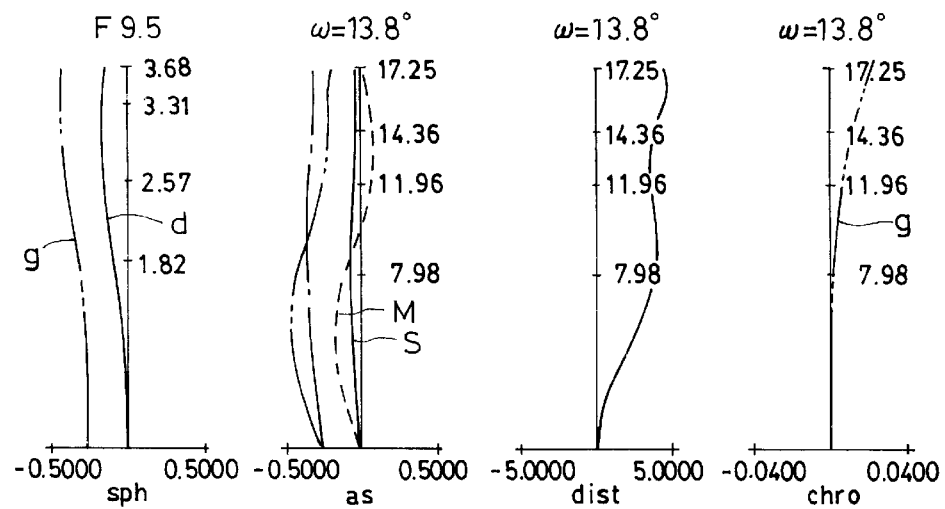
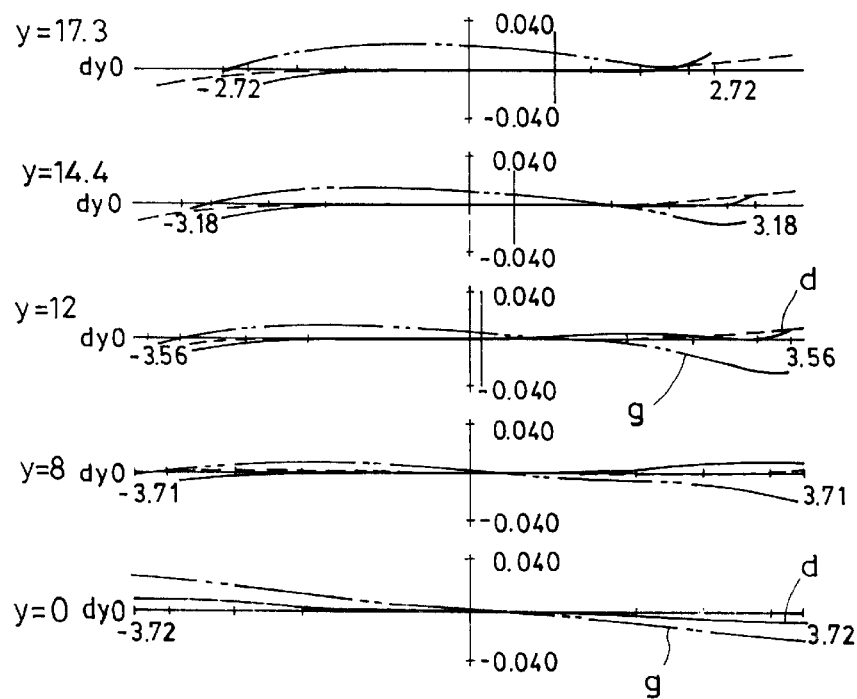

FIG. 35
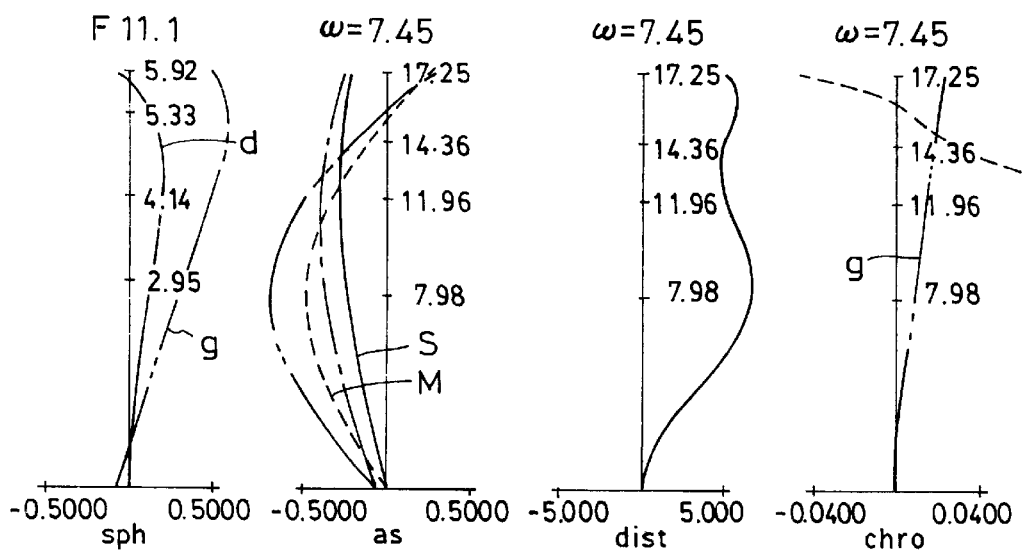
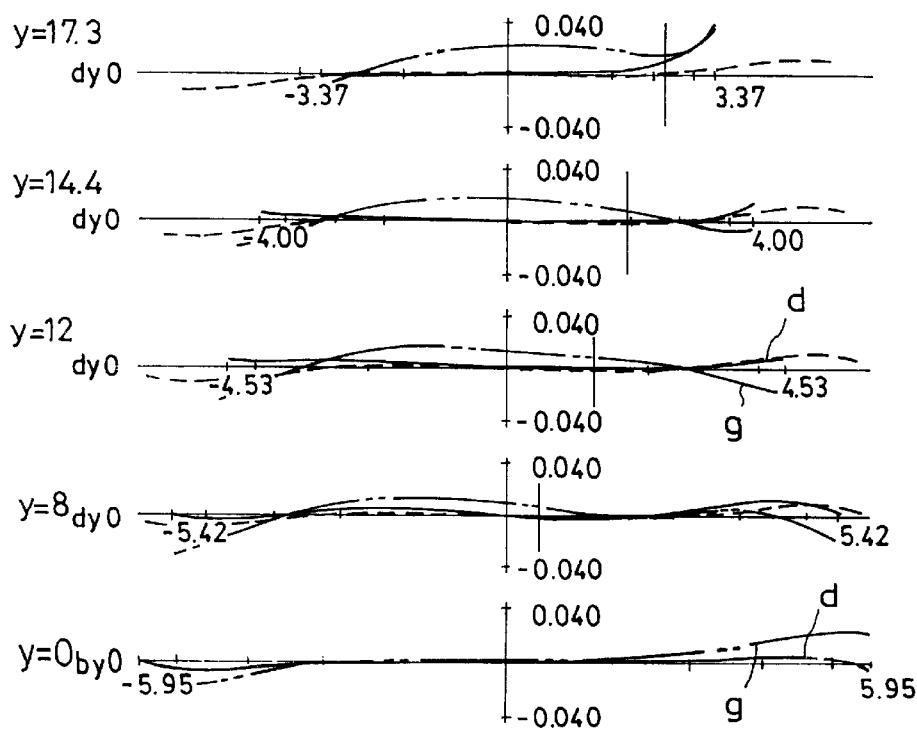

FIG. 42
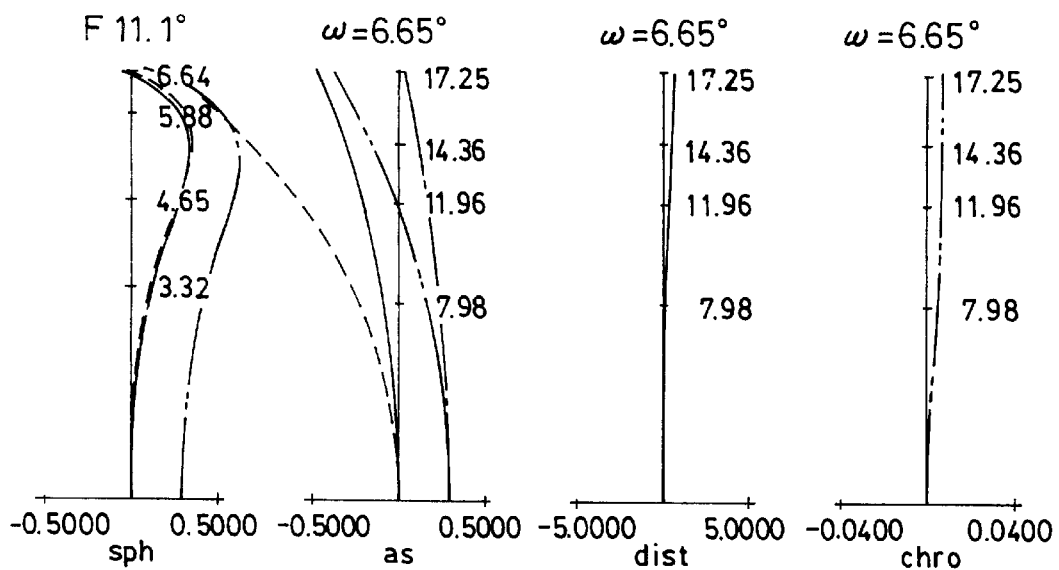
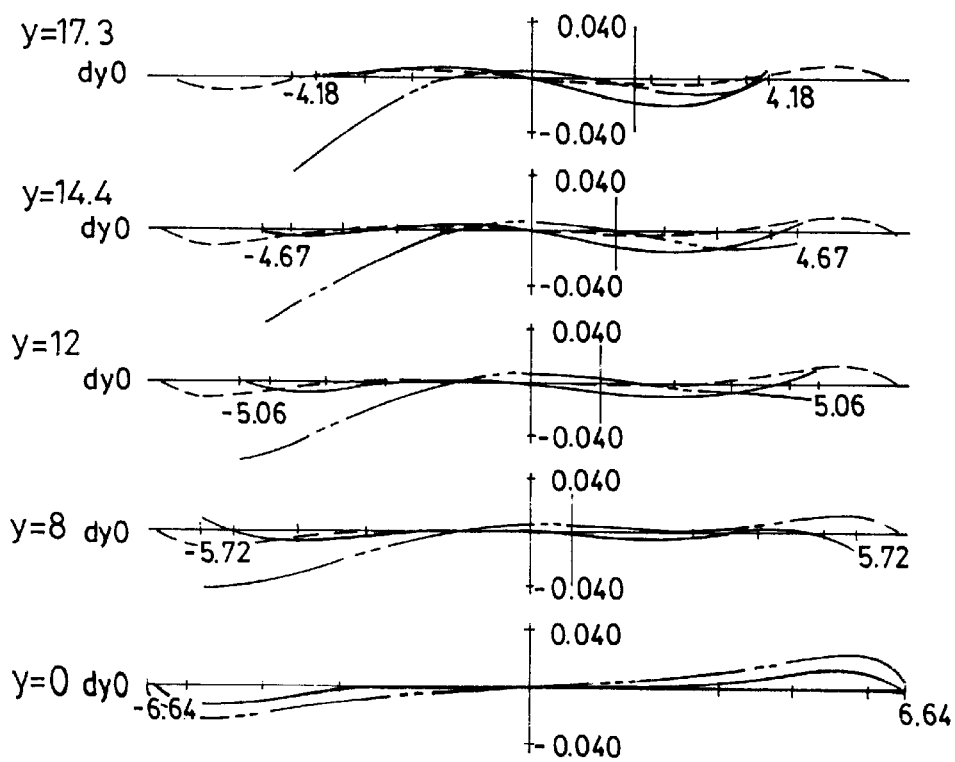

FIG. 45
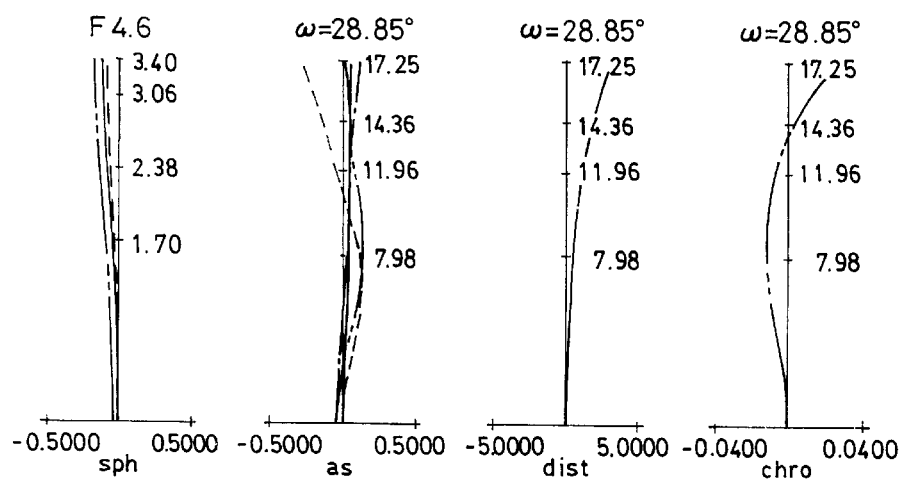
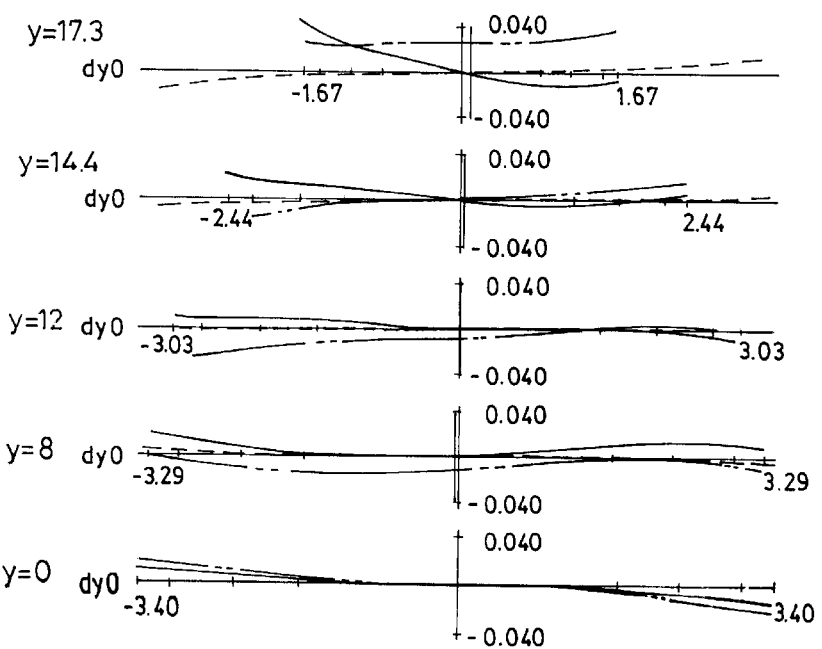

FIG. 47
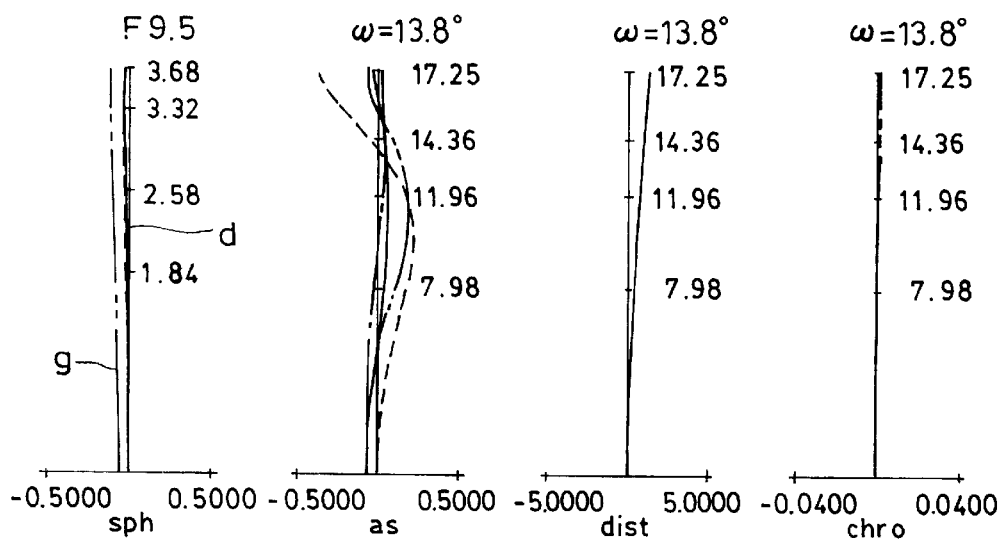
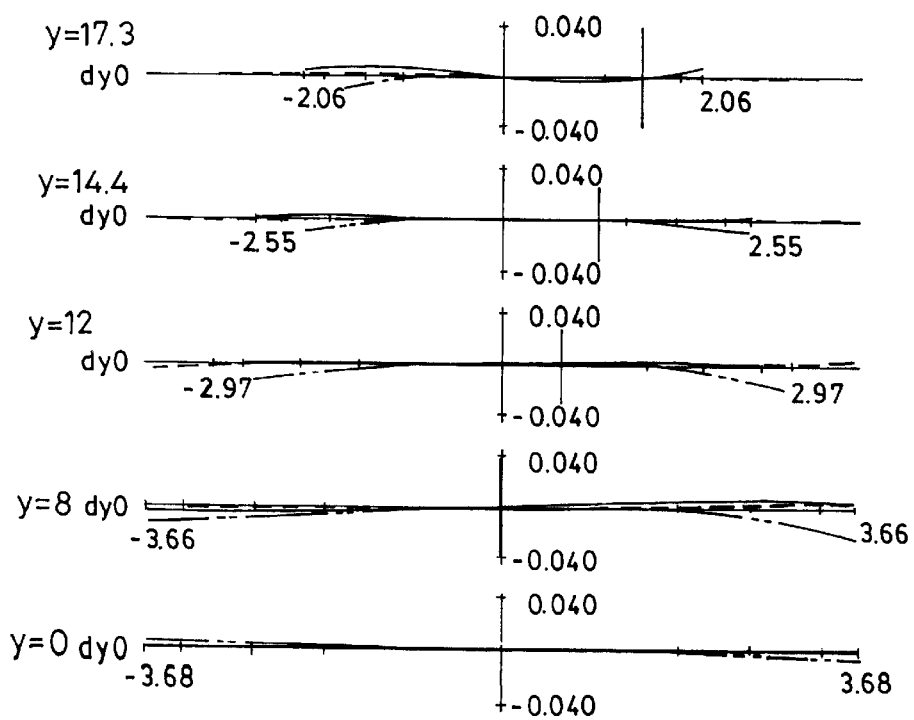

FIG. 52
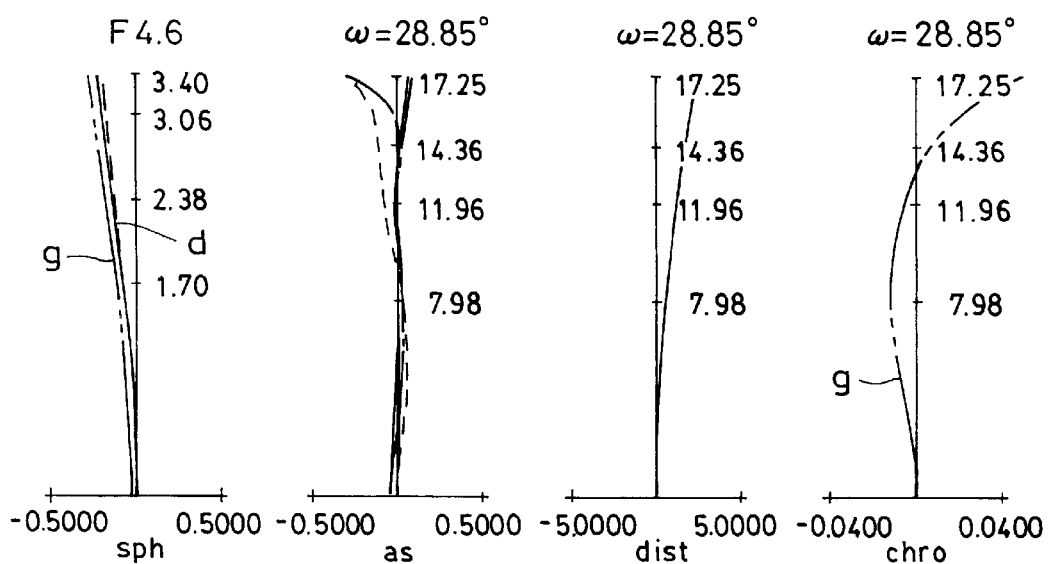
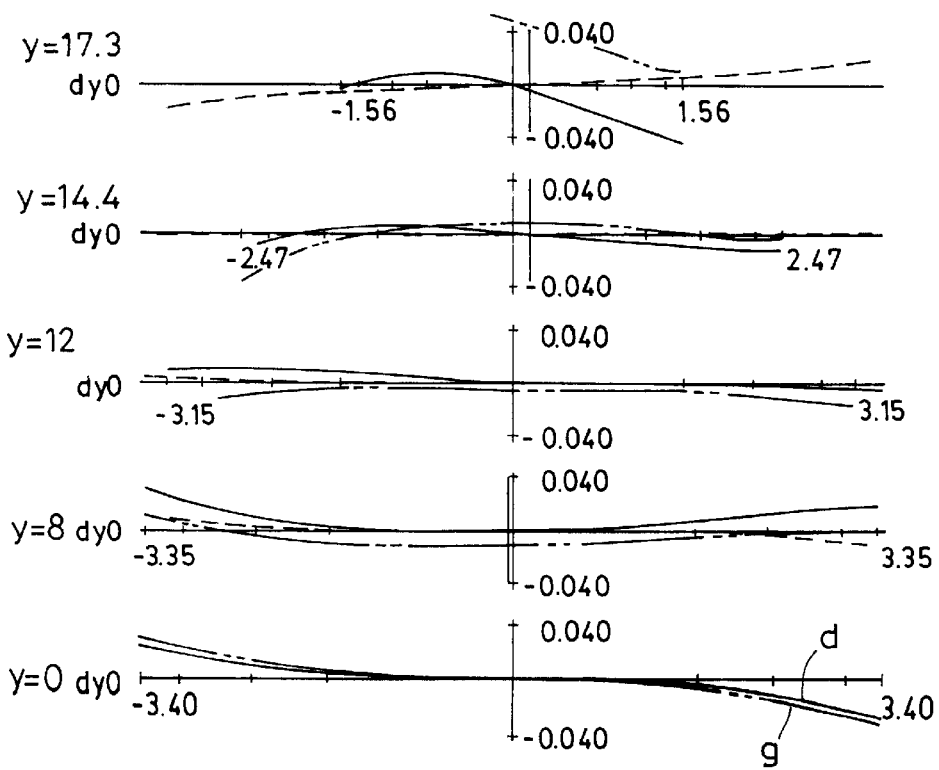

FIG. 54
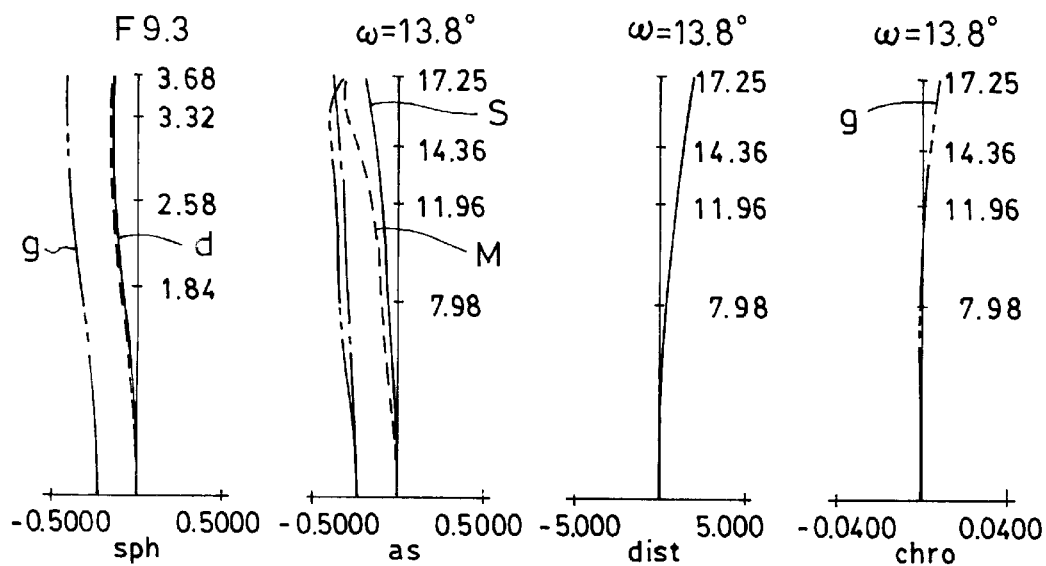
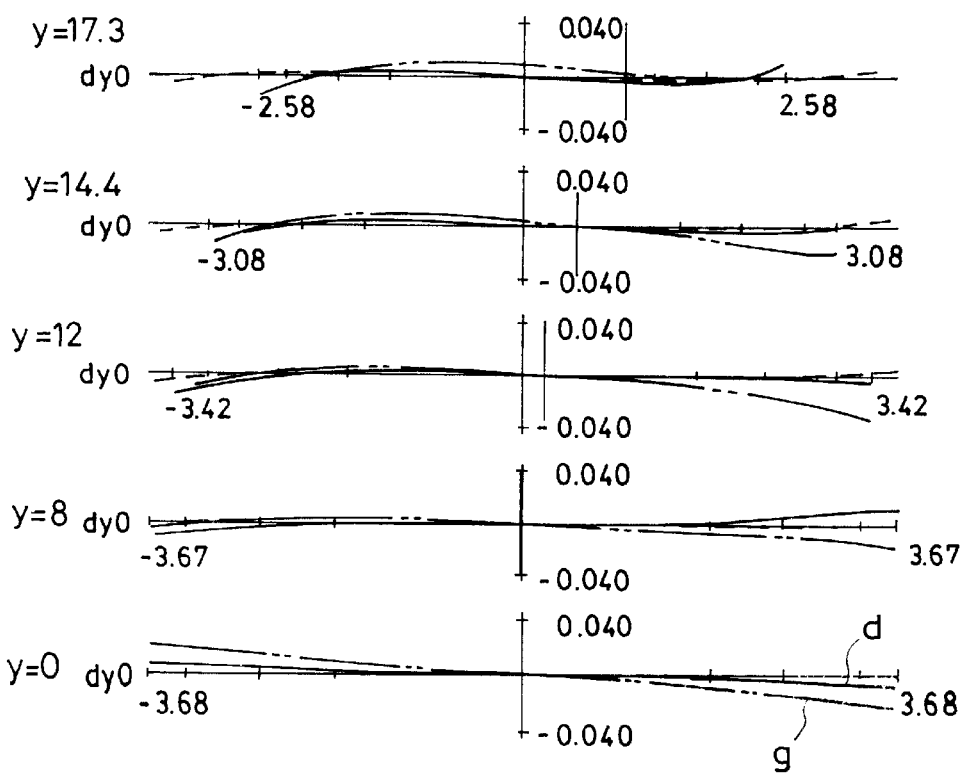

ZOOM LENS AND OPTICAL DEVICE HAVING THE SAME

BACKGROUND OF THE INVENTION

1. Field of the Invention

The present invention generally relates to zoom lenses suitable for silver halide cameras, video cameras, electronic still cameras, and the like, and, more particularly, to a compact zoom lens that corrects well image shaking (or blur) at the time of vibration (or a tilting operation) of a zoom lens by moving lens groups or units of a part of an optical system or a part of the lens groups perpendicularly to an optical axis and by simultaneously maintaining high optical performance, and that has a relatively short back focus and a high variable magnification range.

2. Description of the Related Art

Hitherto, there have been proposed various optical systems (hereunder referred to as vibration-proof optical systems) for correcting image blur, which occurs during vibration of an imaging optical system, by driving optical members of the imaging optical system in some way, thereby stabilizing the images.

Generally, important requirements for such an optical system are that an optical element having a weight that is as light as possible is driven by a drive mechanism of a relatively simple configuration so as to make the driving amount as small much as possible, and that the optical performance thereof is favorably maintained over a vibration-proofing angle range that is as wide as possible.

Further, in a high magnification zoom lens having increasingly been developed in recent years, a large camera shake is apt to occur, especially, at a telephoto end thereof. Therefore, importance is attached to a vibration-proofing function. There have been proposed various zoom lenses each having a vibration-proofing function that have attempted to meet the aforementioned requirements and to have high magnification.

Incidentally, the vibration-proof optical systems include what is termed a shifting vibration-proof system adapted to displace all or part of lens groups perpendicularly to an optical axis, what is called a tilting vibration-proof system adapted to rotate all or part of lens groups around an axis of rotation that is perpendicular to an optical axis, and a variable angle prism system adapted to perform a vibration-proofing operation by providing a member, which is obtained by sandwiching relatively transparent liquid, such as silicon oil, between transparent members, in the vicinity of or inside an imaging optical system, and by inclining the transparent members with respect to an optical axis, and by utilizing a prism action. Additionally, various examples of the application of such a vibration-proof optical system to a zoom lens are known.

Among such vibration-proof optical systems, especially, the shifting vibration-proof optical system is widely adopted, because of the following facts. That is, although the shifting vibration-proof optical system is lower in flexibility in correcting aberration than the tilting vibration-proof system enabled to set an axis of rotation in a relatively free position, the shifting vibration-proof optical system has a relatively simple lens drive mechanism. Further, the shifting vibration-proof optical system is advantageous over the variable-angle prism-vibration-proof system in that the shifting vibration-proof optical system has high flexibility in correcting color aberration. Consequently, the shifting vibration-proof optical system has a relatively simple configuration and obtains relatively high optical performance.

Conventional vibration-proof zoom lenses each employing such a shifting vibration-proof system are disclosed in Japanese Patent Laid-Open No. 6-265827 (corresponding to U.S. Pat. No. 5,638,210), and Nos. 7-318865 and 8-82769 Official Gazettes.

Japanese Patent Laid-Open No. 6-265827 Official Gazette discloses the zoom lens, which comprises, in order from an object side, a first lens group of positive refractive power, a second lens group of positive refractive power, and a third lens group of negative refractive power. This zoom lens is configured so that, when performing zooming from a wide-angle end thereof to a telephoto end thereof, the spacing between the first and second lens groups increases, whereas the spacing between the second and third lens groups decreases. The second lens group is divided into a front group and a rear group. A shifting vibration-proof operation is performed by the rear group.

Japanese Patent Laid-Open No. 7-318865 Official Gazette discloses the zoom lens, which comprises, in succession from an object side, a first lens group of positive refractive power, a second lens group of negative refractive power, a third lens group of positive refractive power, a fourth lens group of positive refractive power, and a fifth lens group of negative refractive power. This zoom lens is configured so that, when performing zooming from a wide-angle end thereof to a telephoto end thereof, the spacing between the first and second lens groups increases, and the spacing between the second and third lens groups decreases, and the spacing between the third and fourth lens groups increases, and the spacing between the fourth and fifth lens groups decreases, and that at least the first and fifth lens groups are moved to the object side. A shifting vibration-proof operation is performed by the fourth lens group.

Japanese Patent Laid-Open No. 8-82769 Official Gazette discloses a zoom lens, which comprises, in order from an object side, a first lens group of positive refractive power, a second lens group of positive refractive power, a stop, and a third lens group of negative refractive power. This zoom lens is configured so that, when performing zooming from a wide-angle end thereof to a telephoto end thereof, the spacing between the first and second lens groups increases, whereas the spacing between the second and third lens groups decreases. A shifting vibration-proof operation is performed by the second lens group.

The zoom lens disclosed in Japanese Patent Laid-Open 6-265827 Official Gazette has a zoom ratio of about 2.6 and thus, has a low magnification level. If the magnification of the zoom lens is increased to 5 or so without changing the configuration thereof, the aberration at the time of vibration-proofing and the aberration in a normal or reference state deteriorate.

Moreover, the number of lenses of the vibration-proof lens groups is large, so that the weight of the zoom lens is relatively large. If various aberrations at the time of vibration-proofing, which are caused owing to an increase in magnification, are corrected, the number of the lenses of the lens groups increases. Consequently, a lens driving load at the time of vibration-proofing increases.

The zoom lens disclosed in Japanese Patent Laid-Open No. 7-318865 Official Gazette has a zoom ratio of about 3.3 and thus has a little higher magnification. Although this zoom lens has a relatively simple configuration of lenses of vibration-proof lens groups, the aberration at the time of vibration-proofing deteriorates.

The zoom lens, especially, a second embodiment disclosed in Japanese Patent Laid-Open No. 8-82769 Official Gazette has a zoom ratio of about 3.9 and thus has a relatively high magnification. In this zoom lens, the aberration at the time of vibration-proofing is relatively favorably corrected over a relatively wide range of vibration-proofing angles. However, the number of lenses of the vibration-proof lens groups is large. The lens driving load at the time of vibration-proofing is large. Further, when attempting to obtain a zoom ratio of about 5, the number of lenses of the zoom lens increases with the result that the size of the lens system increases. It is, thus, difficult to achieve both the correction of the aberration in the normal state and the correction of the aberration at the time of vibration-proofing by simultaneously maintaining the simple and compact configuration of this zoom lens.

SUMMARY OF THE INVENTION

Accordingly, an object of the present invention is to provide a compact zoom lens having a simple lens configuration favorably corrects aberrations in both of the normal state and a state in which an image is displaced, despite the high magnification thereof.

To achieve the foregoing object, according to an aspect of the present invention, there is provided a zoom lens, which comprises, in order from an object side, a first lens unit of negative refractive power, and a second lens unit of positive refractive power, which has, in order from an object side, a first lens sub-unit of negative refractive power, and a second lens sub-unit of positive refractive power. An image is displaced by moving the second lens sub-unit in such a manner as to have a component perpendicular to an optical axis. This zoom lens further comprises a third lens unit of positive refractive power, and a fourth lens unit of negative refractive power. In this zoom lens, when performing zooming from a wide-angle end to a telephoto end, the spacing between the first and second lens units increases. Moreover, the spacing between the third and fourth lens units decreases. Furthermore, this zoom lens meets the following conditions:

$-0.9 < f2a/ft < -0.4$, and $-90 < f1/ft < -5$ where "ft", "f2$a$", and "f1" respectively designates a focal length of the entire system at the telephoto end, a focal length of the first lens sub-unit, and a focal length of the first lens unit.

Further, according to another aspect of the present invention, there is provided a zoom lens that comprises, in order from an object side, a first lens unit of negative refractive power, which has, in order from an object side, a first lens sub-unit of positive refractive power, and a second lens sub-unit of negative refractive power. An image is displaced by moving the second lens sub-unit in such a way as to have a component perpendicular to an optical axis. This zoom lens further comprises a second lens unit of positive refractive power, a third lens unit of positive refractive power, and a fourth lens unit of negative refractive power. In this zoom lens, when performing zooming from a wide-angle end to a telephoto end, the spacing between the second and third lens units increases. Moreover, the spacing between the third and fourth lens units decreases. Furthermore, this zoom lens meets the following conditions:

$-0.9 < f1b/ft < -0.4$, and $-150 < f1/ft < -5$ where "ft", "f1$b$", and "f1" respectively designate a focal length of the entire system at the telephoto end, a focal length of the second lens sub-unit, and a focal length of the first lens unit.

Moreover, an optical device of the present invention comprises the aforementioned zoom lens of the present invention.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIGS. 1A to 1C are diagrams illustrating a principle of a vibration-proofing action;

FIG. 7 is a graphic representation of aberrations at a telephoto end of the numerical example 1 of the zoom lens in a normal state;

FIG. 12 is a graphic representation of aberrations in a middle focal length range of the numerical example 2 of the zoom lens in the normal state;

FIG. 14 is a graphic representation of aberrations at a telephoto end of the numerical example 2 of the zoom lens in a normal state;

FIG. 19 is a graphic representation of aberrations in a middle focal length range of the numerical example 3 of the zoom lens in the normal state;

FIG. 21 is a graphic representation of aberrations at a telephoto end of the numerical example 3 of the zoom lens in a normal state;

FIG. 24 is a graphic representation of aberrations at a wide-angle end of the numerical example 4 of the zoom lens in a normal state;

FIG. 26 is a graphic representation of aberrations in a middle focal length range of the numerical example 4 of the zoom lens in the normal state;

FIG. 31 is a graphic representation of aberrations at a wide-angle end of the numerical example 5 of the zoom lens in a normal state;

FIG. 33 is a graphic representation of aberrations in a middle focal length range of the numerical example 5 of the zoom lens in the normal state;

FIG. 35 is a graphic representation of aberrations at a telephoto end of the numerical example 5 of the zoom lens in a normal state;

FIG. 42 is a graphic representation of aberrations at a telephoto end of the numerical example 6 of the zoom lens in a normal state;

FIG. 45 is a graphic representation of aberrations at a wide-angle end of the numerical example 7 of the zoom lens in a normal state;

FIG. 47 is a graphic representation of aberrations in a middle focal length range of the numerical example 7 of the zoom lens in the normal state;

FIG. 52 is a graphic representation of aberrations at a wide-angle end of the numerical example 8 of the zoom lens in a normal state;

FIG. 54 is a graphic representation of aberrations in a middle focal length range of the numerical example 8 of the zoom lens in the normal state;

DESCRIPTION OF THE PREFERRED EMBODIMENTS

Figure 2A:
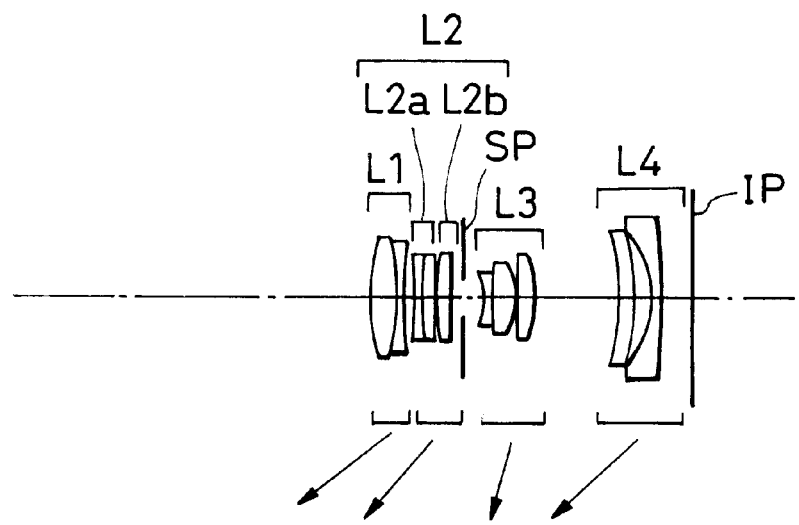
FIGS. 2A to 2C are sectional views of a numerical example 1 of a zoom lens of the present invention.
Figure 2B:
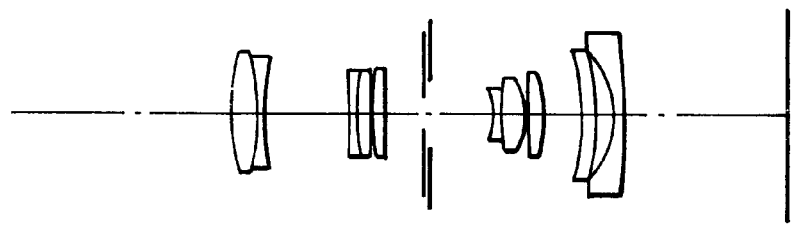
Figure 2C:
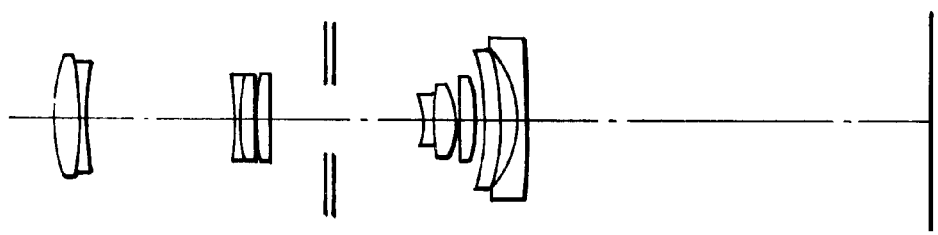

FIGS. 1A to 1C are diagrams illustrating the principle of correcting camera shake, that is, illustrating how displacement or movement (or shaking) of an image of an object to be imaged or photographed, which is caused owing to a camera shake, is corrected according to a shifting vibration-proof system of the present invention.

FIG. 1A illustrates the relation between the object (O), which is placed before a camera shake occurs, and an image (I) of the object (O), which is formed by the imaging lenses (L) in a normal state. The position indicated by "I", is a predetermined image formation place, at which an image of the object is to be formed, on an image-formation plane IP in this state. When camera shake occurs as illustrated in FIG. 1B, the image I is moved to a position I'. Thus, as illustrated in FIG. 1C, a vibration-proofing lens (S) is shifted perpendicularly to an optical axis and thus the image I' is displaced so as to return the image I' to the initially predetermined image-formation position I.

Incidentally, for simplicity of description, it is assumed that the imaging lenses L consists of a lens group F, the vibration-proofing lens S, and another lens group R.

Hereinafter, image formation performance in the normal state and the vibration-proofing state will be described by referring to this figure illustrating the principle. First, it results from the principle of correction of camera shake that the correction causes almost no change in the optical path of each of light rays that are outputted from the vibration-proofing lens (S) and then pass through the lens group (R) and reach the image formation plane (IP), as is seen from FIG. 1A, which illustrates the normal state before the correction of the camera shake, and FIG. 1C, which illustrates the vibration-proofing state after the correction of camera shake. Thus, the correction changes only the optical paths of light rays, which come from the object and pass through the object-side lens group (F) and reach the vibration-proofing lens (S).

That is, a change (hereunder referred to as a vibration-proofing aberration component) in the optical performance at the time of vibration-proofing is caused by the change of the optical path of light rays passing through each of the vibration-proofing lens (S) and the lens group (F). Thus, the lens group (R) provided in the rear of the vibration-proofing lens group (S) does not contribute to the generation of the vibration-proofing aberration component.

Therefore, in the case of treating a problem of how aberration coefficients are set so as to prevent the generation of the vibration-proofing aberration component, the following requirements should be satisfied for the aforementioned reasons. First, decentration aberration coefficients, which are represented by employing an ordinary-object side as a reference side, should be changed to those (hereunder referred to as vibration-proofing aberration coefficients) represented by employing an ordinary-object side as a reference side. Then, the values of aberration coefficients acting as elements of the vibration-proofing aberration coefficients, namely, those of the aberration coefficients allotted to the vibration-proofing lens (S) and the lens group (F), should be suitably set so that the vibration-proofing aberration coefficients are 0 or within a tolerance range. Moreover, in the case of a zoom lens, the aberration coefficients corresponding to the vibration-proofing lens (S) and the lens group (F) one set as a simultaneous solution of equations for the zoom lens so that desired vibration-proofing aberration coefficients are obtained correspondingly to each focal length.

However, even if the generation of the vibration-proofing aberration component corresponding to each focal length is prevented, the aberration coefficients corresponding to the vibration-proofing lens (S) and the lens group (F) do not necessarily provide favorable imaging performance in the normal state.

Thus, it is necessary that such aberration coefficients are subsystem aberration coefficients that meet requirements for the entire or complete system aberration coefficients in the normal state and that satisfy various simultaneous relations, as described above.

Next, the simultaneous relations among aberration coefficients will be described in more detail hereinbelow by being decomposed into characteristic coefficients and a matrix (see "Study on Optical Design of Zoom Lens", by K. Yamaji, Study Report of Canon, No. 3) of an optical system.

Let $S_{ijn}$, $S_{0in}$, and $A_{ijn}$, respectively denote an aberration coefficient represented in vector notation in an nth order region of an ith lens group of a subsystem at a jth one of zoom positions, a characteristic coefficient, and a characteristic matrix. Then, the following relation among the aberration coefficients, the characteristic coefficients, and the characteristic matrix holds:

$$S_{jn} = S_{0in} \cdot A_{ijn} (n=1, 3, 5, \ldots)$$

Incidentally, the following relation holds for a composite system (namely, a complete system):

$$S_{jn} = \sum_{i=1}^{N} S_{ijn}$$

where N designates a total number of lens groups.

Additionally, the characteristic coefficients are a set of aberration coefficients calculated by setting the absolute value of the refractive power at 1, and by making a pupil coincide with a point on a front-side surface of a principal plane, and by setting an incident height and an incident angle or inclination of a paraxial ray and an incident height and an incident angle of a paraxial principal ray at 1, 0, 0, and 1, respectively. Further, the characteristic coefficients depend only upon data, such as the radii of curvature, refraction factors, the thickness, and air spaces, concerning the shapes of lenses of the subsystem. In contrast, the characteristic matrix does not depend upon the shapes of the lenses at all.

Namely, the characteristic matrix is a synthetic matrix of matrices respectively representing a focal length, positions of object points and a stop, and light ray passing states, and indicates use conditions of a subsystem having a certain shape, and depends only upon what is called a power arrangement.

Therefore, if the vibration-proofing lens group (S) is a kth lens group, the following operations are required to correct image formation performance in the normal state by simultaneously preventing the generation of the vibration-proofing aberrations corresponding to each focal length. That is, the characteristic coefficients $S_{0in}$ (i=1, ..., K) and the characteristic matrices $A_{ijn}$ (i=1, ..., K) of the lens groups of the vibration-proofing lens unit (S) and the lens unit (F) are suitably set. Moreover, the aberration coefficients $S_{ijn}$ (i=1, ..., K) indicating the operating characteristics obtained by linear transformation of the characteristic coefficients are set so that the requirements for desired vibration-proofing aberration coefficients are satisfied. Simultaneously with this, the characteristic coefficients $S_{0in}$ (i=K+1, ..., N) and the characteristic matrices $A_{ijn}$ (i=K+1, ..., N) of the lens groups of the vibration-proofing lens unit (S) and the subsequent lens unit (R) are suitably set. Then, the aberration coefficients $S_{ijn}$ (i=K+1, ..., N) indicating the operating characteristics are obtained by linear transformation of the characteristic coefficients, and canceled by the aberration coefficients $S_{ijn}$ (i=1, ..., K). Thus, the desired complete system aberration coefficients $S_{jn}$ are obtained correspondingly to each focal length.

In this manner, the present invention provides a compact zoom lens having a simple lens configuration, by which aberrations are well corrected in both of the normal state and the vibration-proofing state, in spite of high magnification, for example, a zoom ratio of 5, by decomposing the optical system into characteristic coefficients and matrices and analyzing the characteristic coefficients and matrices Next, a practical lens configuration of the present invention is described hereunder.

FIGS. 2A to 2C, 9A to 9C, 16A to 16C, and 23A to 23C are sectional views of the zoom lenses of the numerical example 1 to the numerical example 4 (to be described later). In these figures, FIGS. 2A, 9A, 16A, and 23A correspond to the case that the zoom position is a wide-angle end of each of the zoom lenses. FIGS. 2B, 9B, 16B, and 23B correspond to the case that the zoom position is a point in a middle focal-length range of each of the zoom lenses. FIGS. 2C, 9C, 16C, and 23C correspond to the case that the zoom position is a telephoto end of each of the zoom lenses.

In these figures, L1, L2, L3, and L4 respectively designate a first lens unit of negative refractive power, a second lens unit of positive refractive power, a third lens unit of positive refractive power, and a fourth lens unit of negative refractive power.

Figure 3:
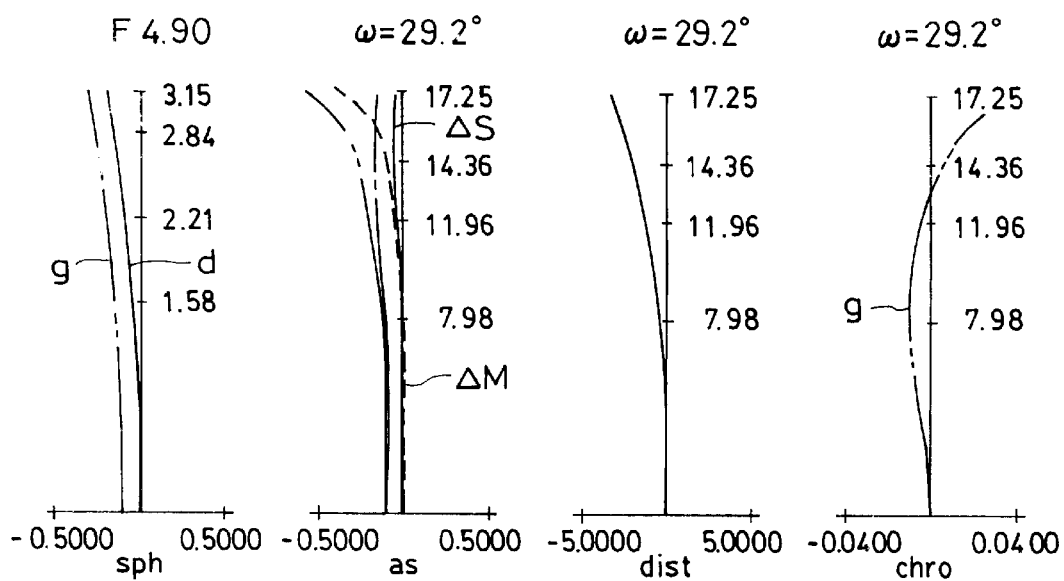
FIG. 3 is a graphic representation of aberrations at a wide-angle end of the numerical example 1 of the zoom lens in a normal state.
Figure 4:
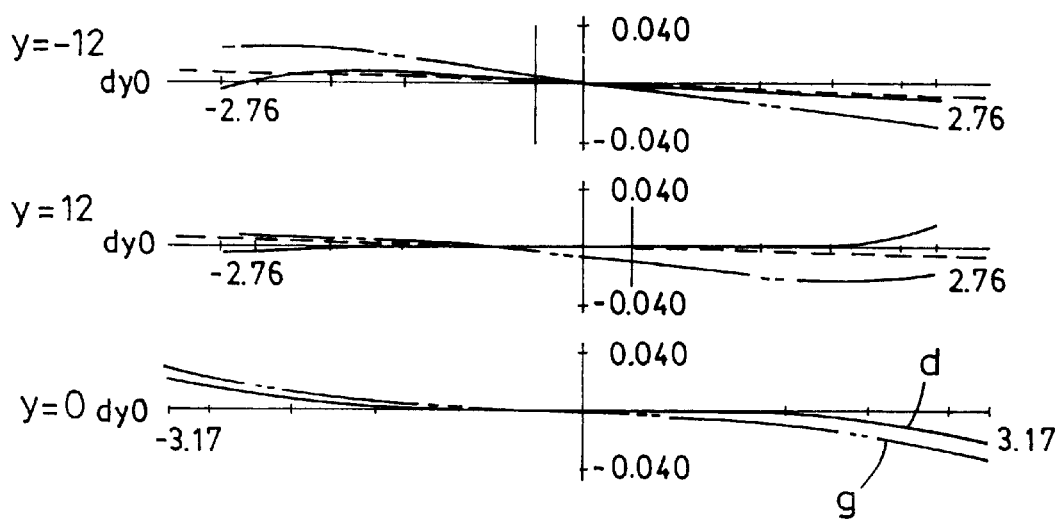
FIG. 4 is a graphic representation of transverse aberrations at the wide-angle end of the numerical example 1 of the zoom lens in a 0.2°-vibration-proofing state when the height of an image is 0, or ±12 mm.
Figure 5:
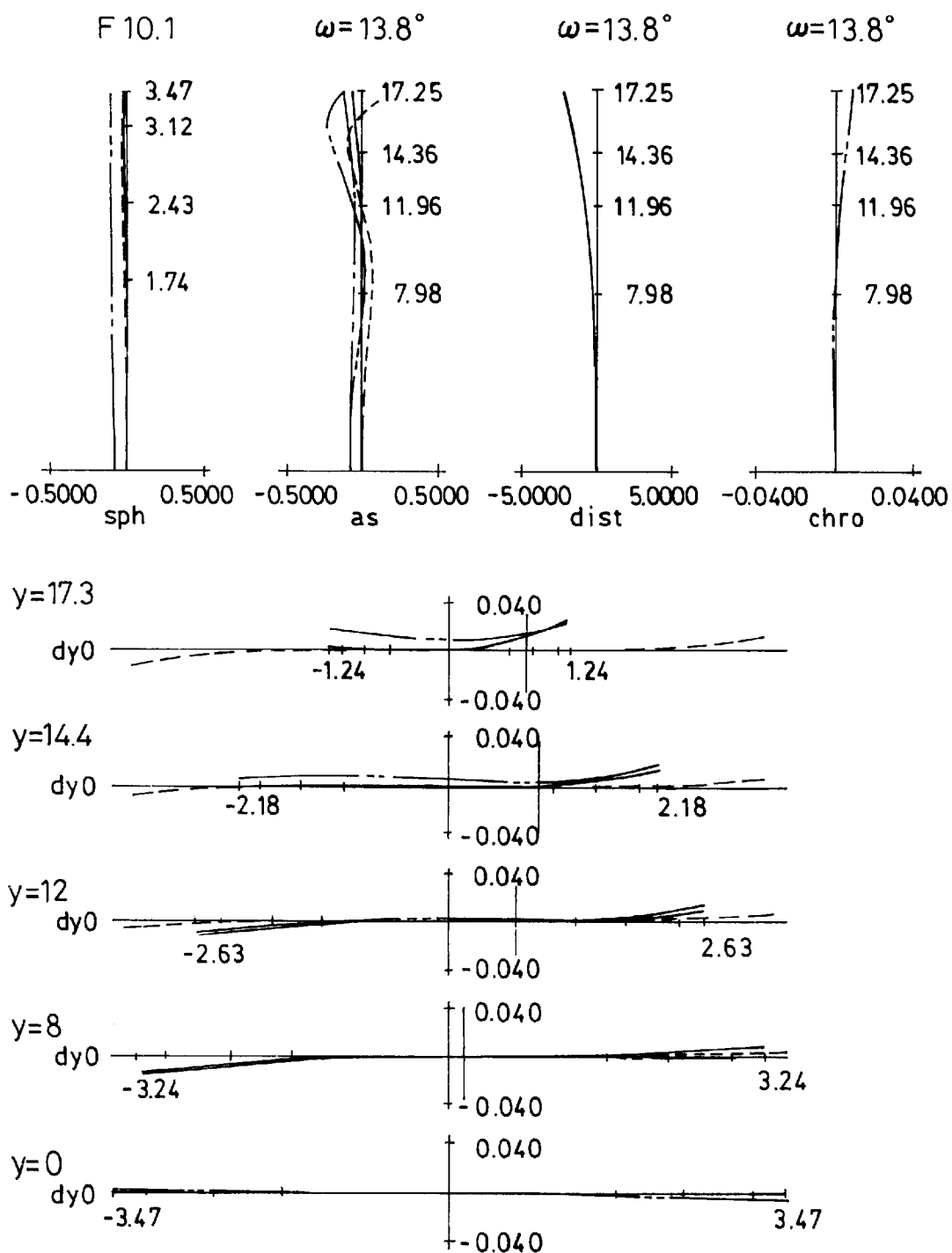
FIG. 5 is a graphic representation of aberrations in a middle focal length range of the numerical example 1 of the zoom lens in the normal state.
Figure 6:
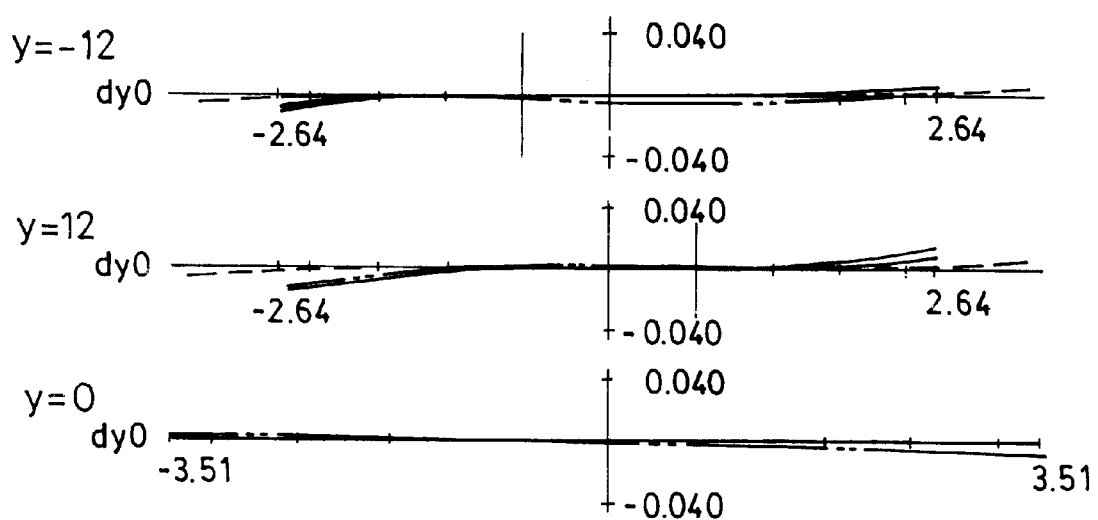
FIG. 6 is a graphic representation of transverse aberrations in the middle focal length range of the numerical example 1 of the zoom lens in a 0.2°-vibration-proofing state when the height of an image is 0, or ±12 mm.
Figure 8:
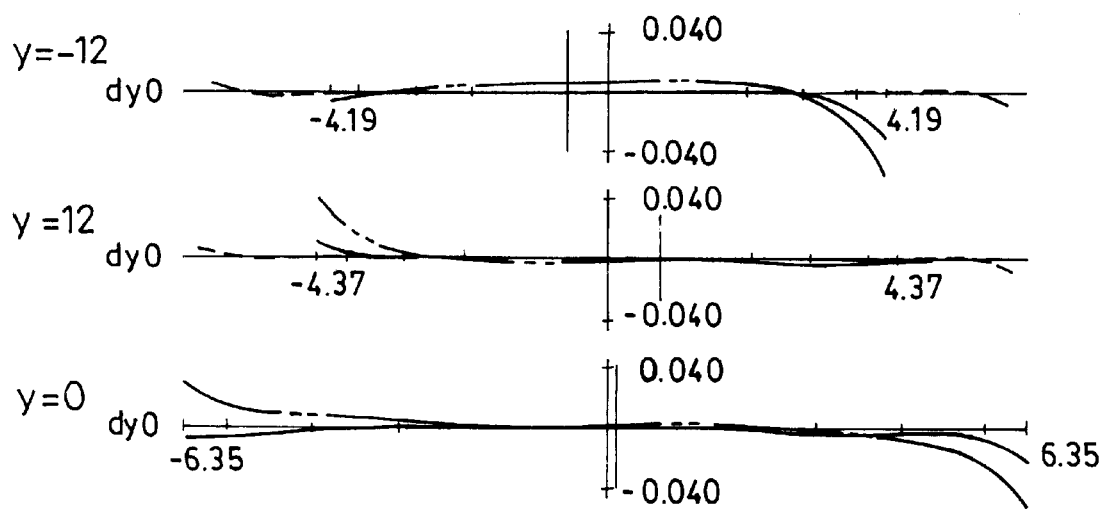
FIG. 8 is a graphic representation of transverse aberrations at the telephoto end of the numerical example 1 of the zoom lens in a 0.2°-vibration-proofing state when the height of an image is 0, or ±12 mm.
Figure 9A:
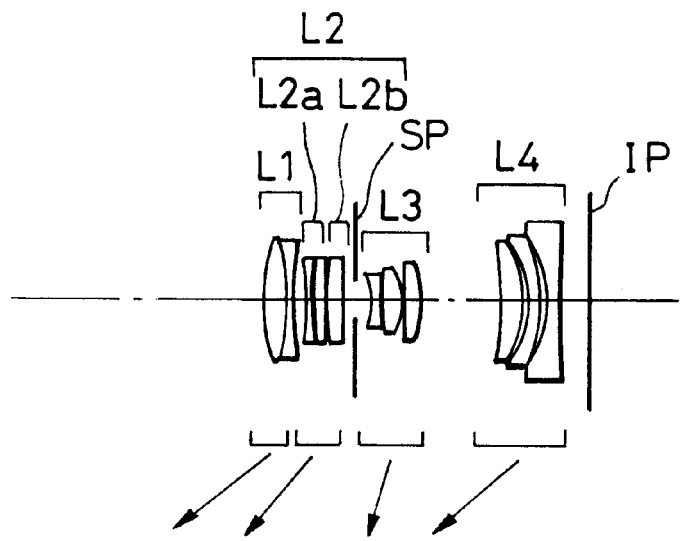
FIGS. 9A to 9C are sectional views of a numerical example 2 of a zoom lens of the present invention.
Figure 9B:
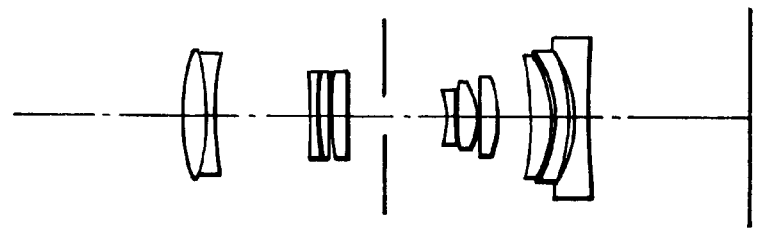
Figure 9C:
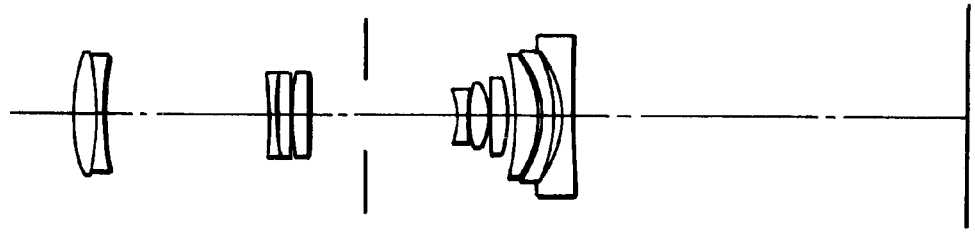

Further, FIG. 3 is a graphic representation of aberrations at a wide-angle end of the numerical example 1 of the zoom lens in a normal state. FIG. 4 is a graphic representation of transverse aberrations at the wide-angle end of the numerical example 1 of the zoom lens in a 0.2°-vibration-proofing state when the height of an image is 0, or ±12 mm. FIG. 5 is a graphic representation of aberrations in a middle focal-length range of the numerical example 1 of the zoom lens in the normal state. FIG. 6 is a graphic representation of transverse aberrations in the middle focal length range of the numerical example 1 of the zoom lens in a 0.2°-vibration-proofing state when the height of an image is 0, or ±12 mm. FIG. 7 is a graphic representation of aberrations at a telephoto end of the numerical example 1 of the zoom lens in a normal state. FIG. 8 is a graphic representation of transverse aberrations at the telephoto end of the numerical example 1 of the zoom lens in a 0.2°-vibration-proofing state when the height of an image is 0, or ±12 mm.

Figure 10:
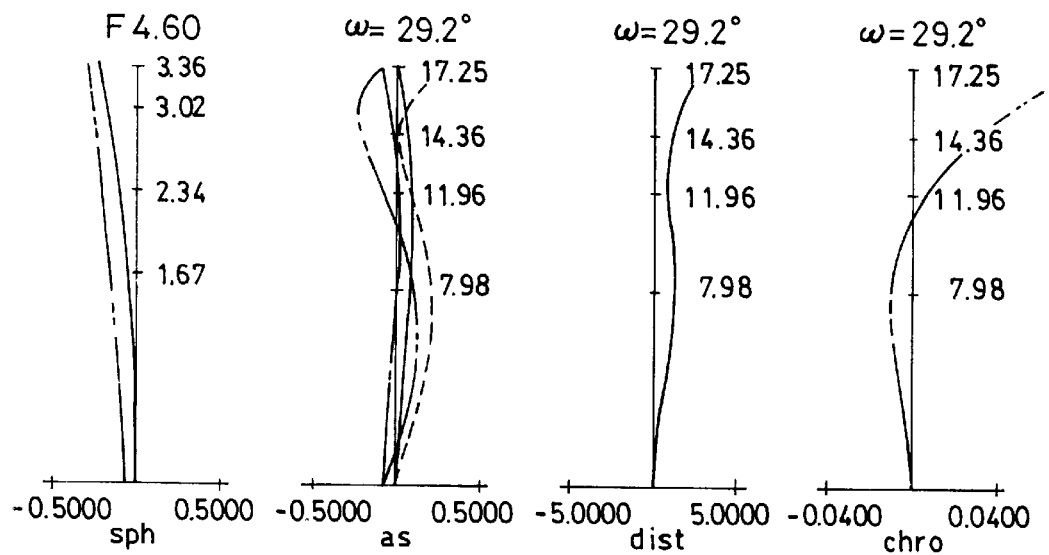
FIG. 10 is a graphic representation of aberrations at a wide-angle end of the numerical example 2 of the zoom lens in a normal state.
Figure 11:
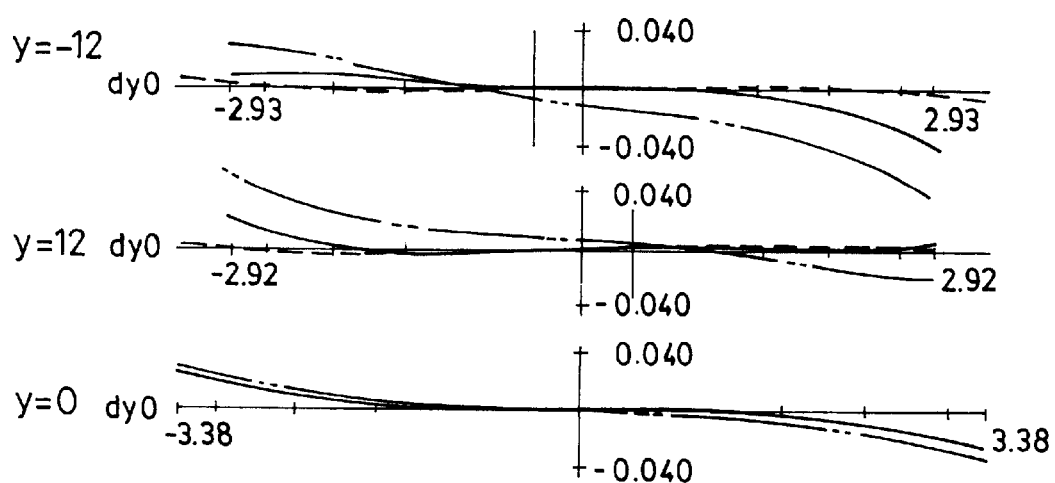
FIG. 11 is a graphic representation of transverse aberrations at the wide-angle end of the numerical example 2 of the zoom lens in a 0.2°-vibration-proofing state when the height of an image is 0, or ±12 mm.
Figure 13:
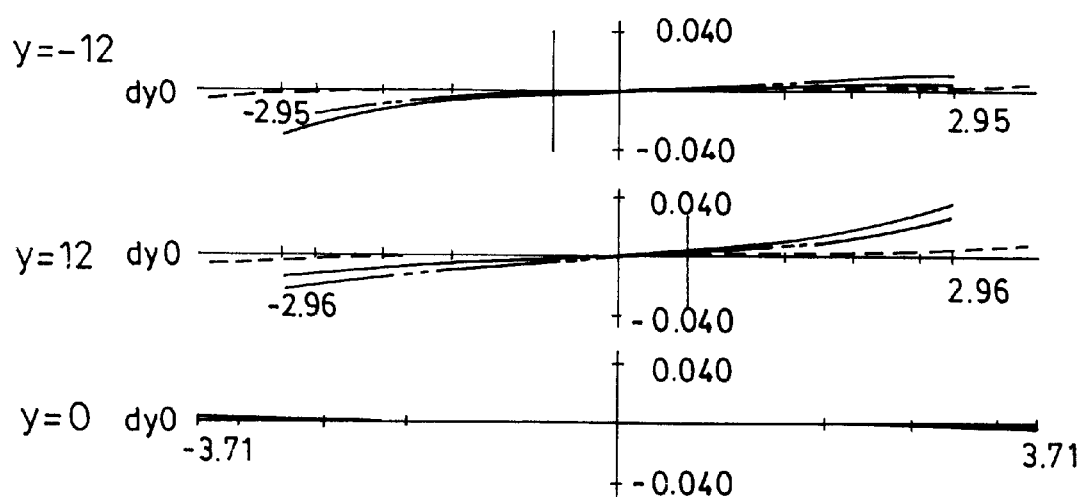
FIG. 13 is a graphic representation of transverse aberrations in the middle focal length range of the numerical example 2 of the zoom lens in a 0.2°-vibration-proofing state when the height of an image is 0, or ±12 mm.
Figure 15:
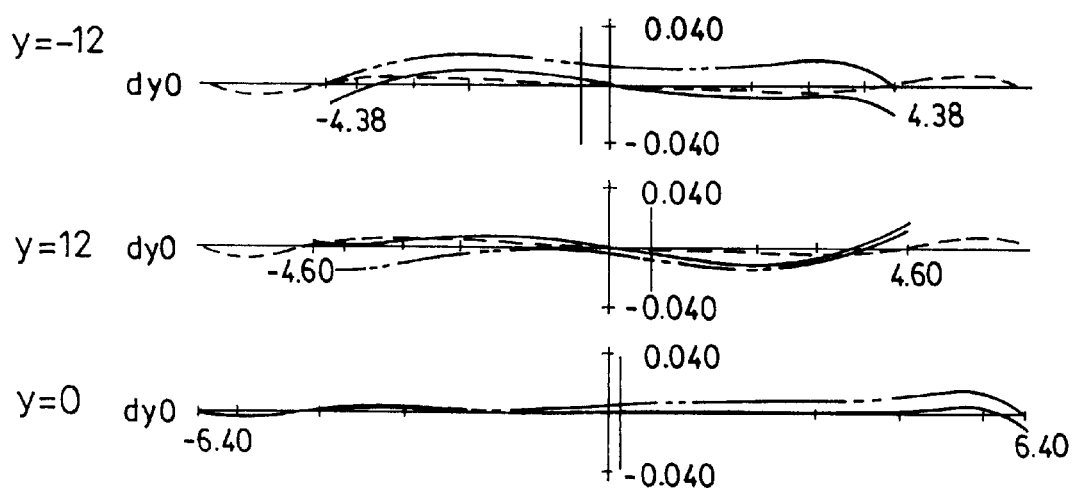
FIG. 15 is a graphic representation of transverse aberrations at the telephoto end of the numerical example 2 of the zoom lens in a 0.2°-vibration-proofing state when the height of an image is 0, or ±12 mm.
Figure 16A:
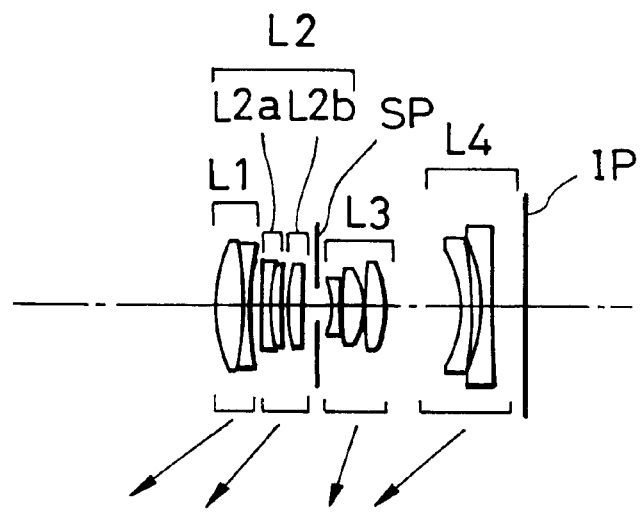
FIGS. 16A to 16C are sectional views of a numerical example 3 of a zoom lens of the present invention.
Figure 16B:
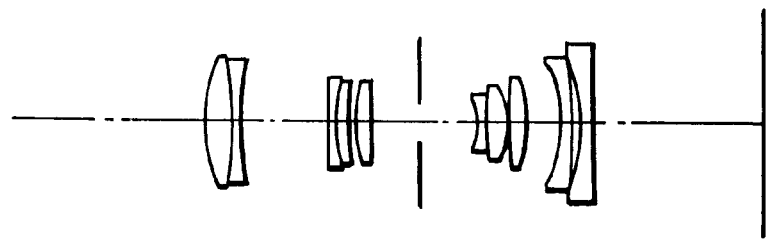
Figure 16C:
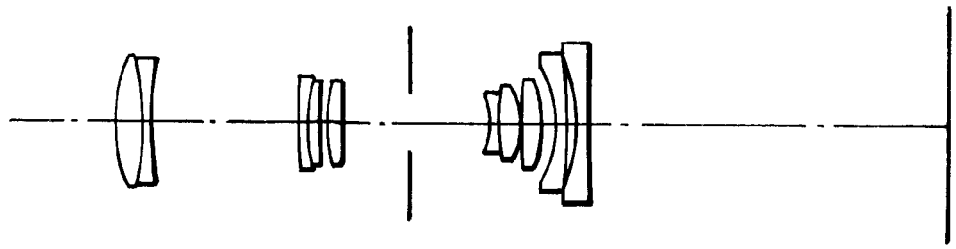

FIG. 10 is a graphic representation of aberrations at a wide-angle end of the numerical example 2 of the zoom lens in a normal state. FIG. 11 is a graphic representation of transverse aberrations at the wide-angle end of the numerical example 2 of the zoom lens in a 0.2°-vibration-proofing state when the height of an image is 0, or ±12 mm. FIG. 12 is a graphic representation of aberrations in a middle focal-length range of the numerical example 2 of the zoom lens in the normal state. FIG. 13 is a graphic representation of transverse aberrations in the middle focal-length range of the numerical example 2 of the zoom lens in a 0.2°-vibration-proofing state when the height of an image is 0, or ±12 mm. FIG. 14 is a graphic representation of aberrations at a telephoto end of the numerical example 2 of the zoom lens in a normal state. FIG. 15 is a graphic representation of transverse aberrations at the telephoto end of the numerical example 2 of the zoom lens in a 0.2°-vibration-proofing state when the height of an image is 0, or ±12 mm.

Figure 17:
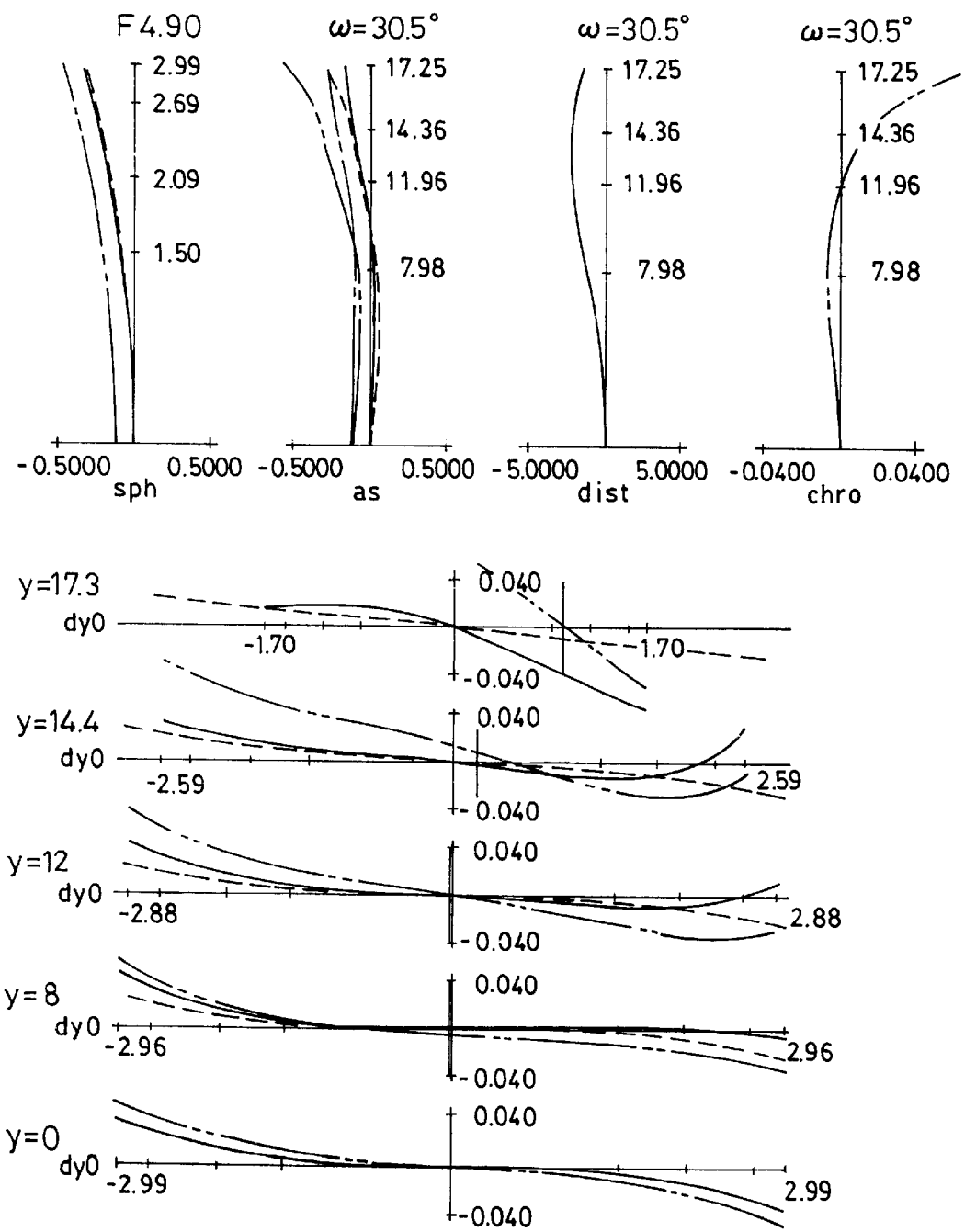
FIG. 17 is a graphic representation of aberrations at a wide-angle end of the numerical example 3 of the zoom lens in a normal state.
Figure 18:
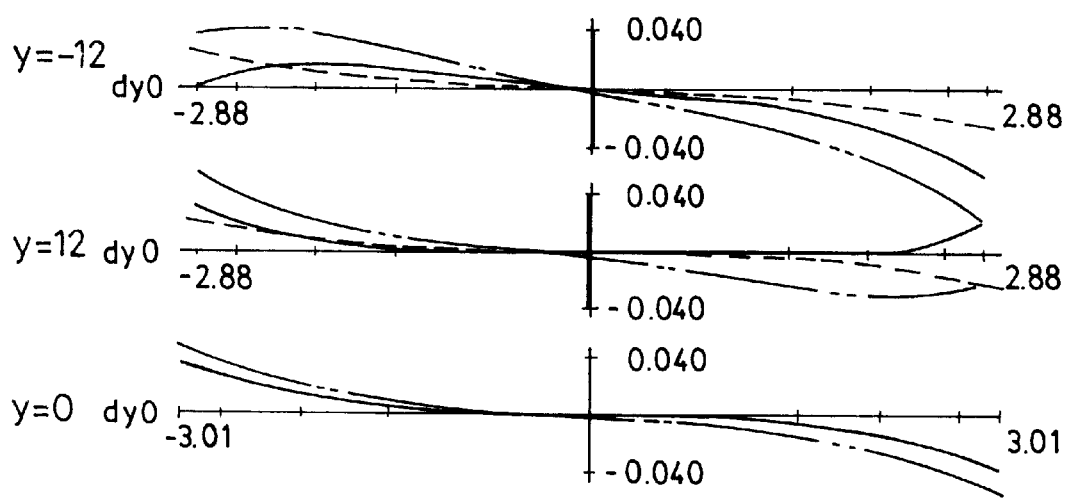
FIG. 18 is a graphic representation of transverse aberrations at the wide-angle end of the numerical example 3 of the zoom lens in a 0.2°-vibration-proofing state when the height of an image is 0, or ±12 mm.
Figure 20:
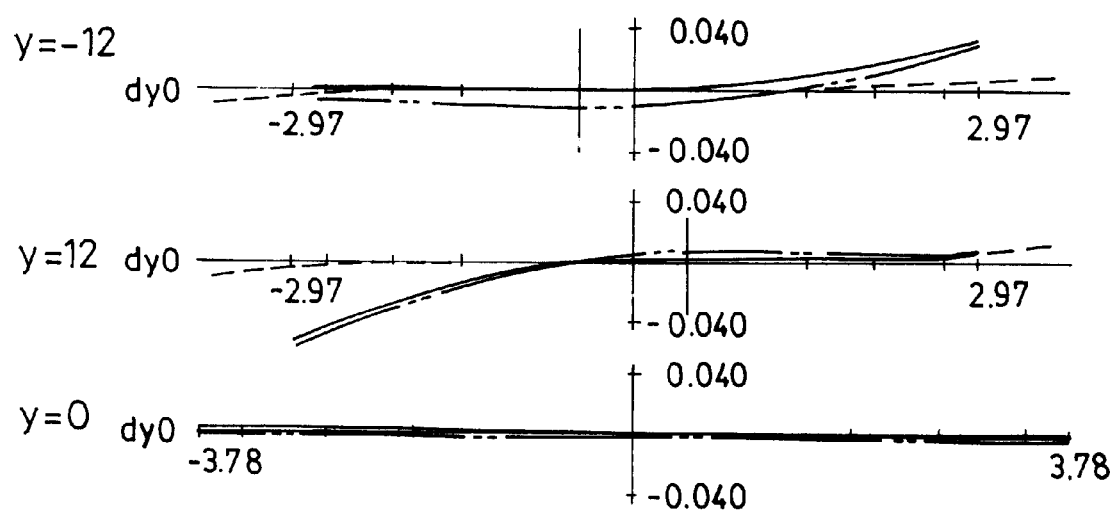
FIG. 20 is a graphic representation of transverse aberrations in the middle focal length range of the numerical example 3 of the zoom lens in a 0.2°-vibration-proofing state when the height of an image is 0, or ±12 mm.
Figure 22:
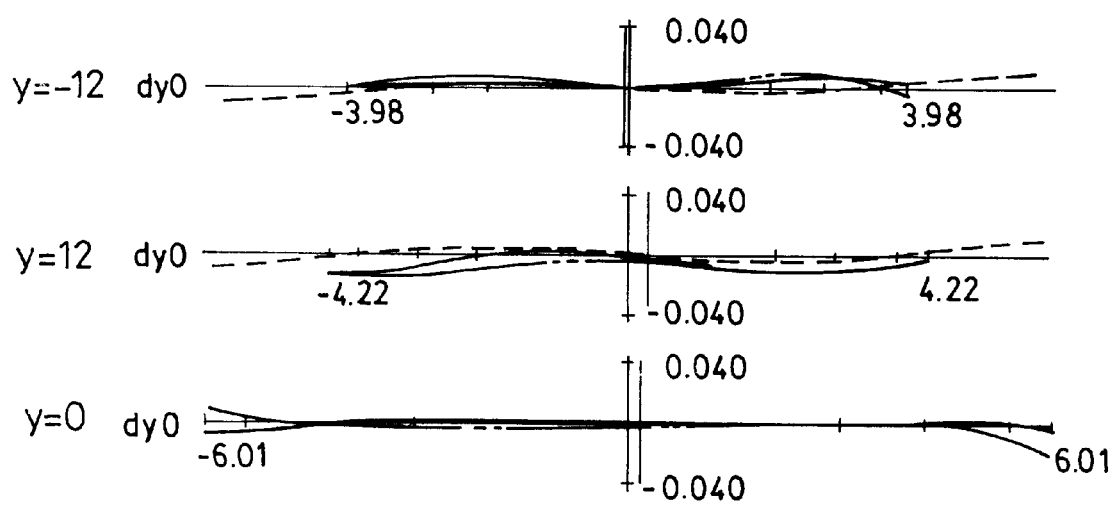
FIG. 22 is a graphic representation of transverse aberrations at the telephoto end of the numerical example 3 of the zoom lens in a 0.2°-vibration-proofing state when the height of an image is 0, or ±12 mm.
Figure 23A:
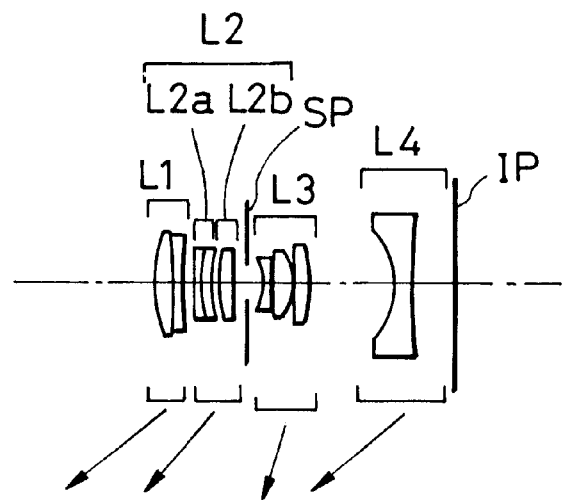
FIGS. 23A to 23C are sectional views of a numerical example 4 of a zoom lens of the present invention.
Figure 23B:
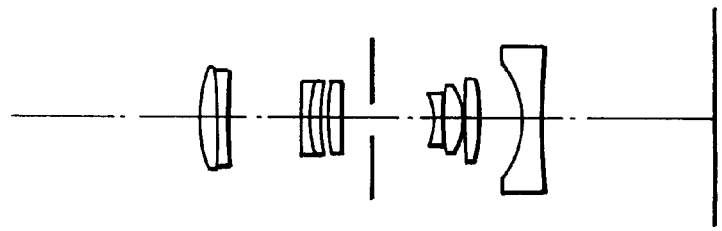
Figure 23C:
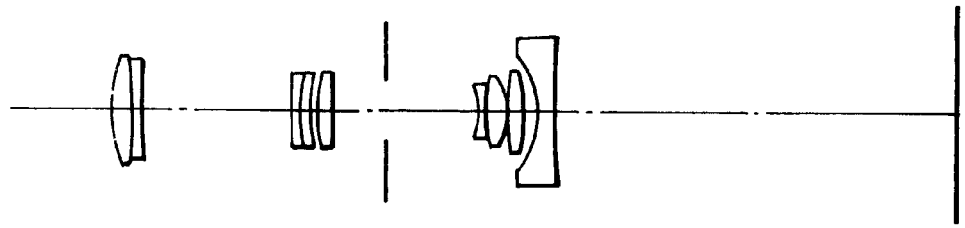

FIG. 17 is a graphic representation of aberrations at a wide-angle end of the numerical example 3 of the zoom lens in a normal state. FIG. 18 is a graphic representation of transverse aberrations at the wide-angle end of the numerical example 3 of the zoom lens in a 0.2°-vibration-proofing state when the height of an image is 0, or ±12 mm. FIG. 19 is a graphic representation of aberrations in a middle-focal length range of the numerical example 3 of the zoom lens in the normal state. FIG. 20 is a graphic representation of transverse aberrations in the middle focal-length range of the numerical example 3 of the zoom lens in a 0.2°-vibration-proofing state when the height of an image is 0, or ±12 mm. FIG. 21 is a graphic representation of aberrations at a telephoto end of the numerical example 3 of the zoom lens in a normal state. FIG. 22 is a graphic representation of transverse aberrations at the telephoto end of the numerical example 3 of the zoom lens in a 0.2°-vibration-proofing state when the height of an image is 0, or ±12 mm.

Figure 25:
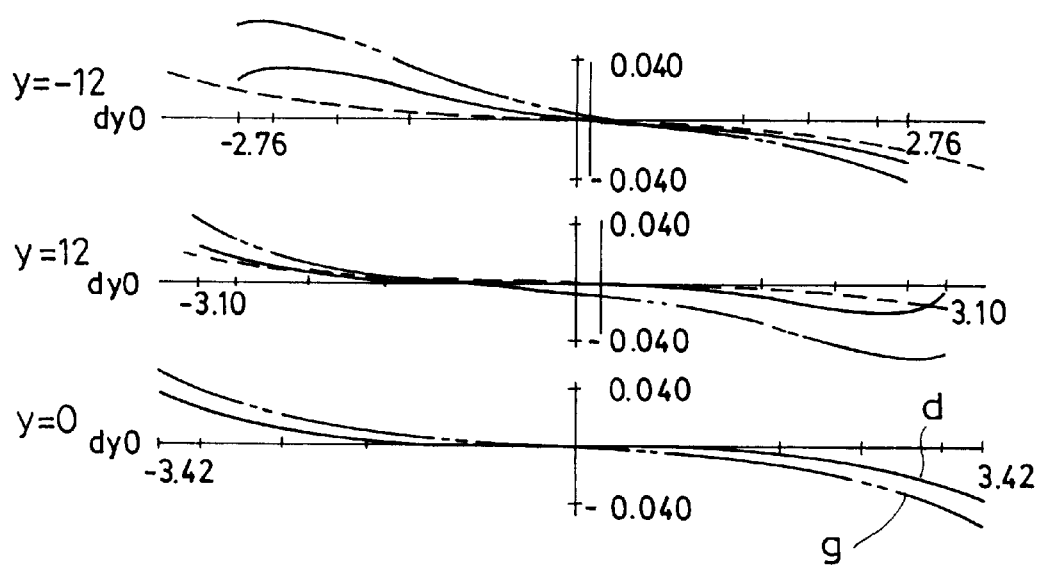
FIG. 25 is a graphic representation of transverse aberrations at the wide-angle end of the numerical example 4 of the zoom lens in a 0.2°-vibration-proofing state when the height of an image is 0, or ±12 mm.
Figure 27:
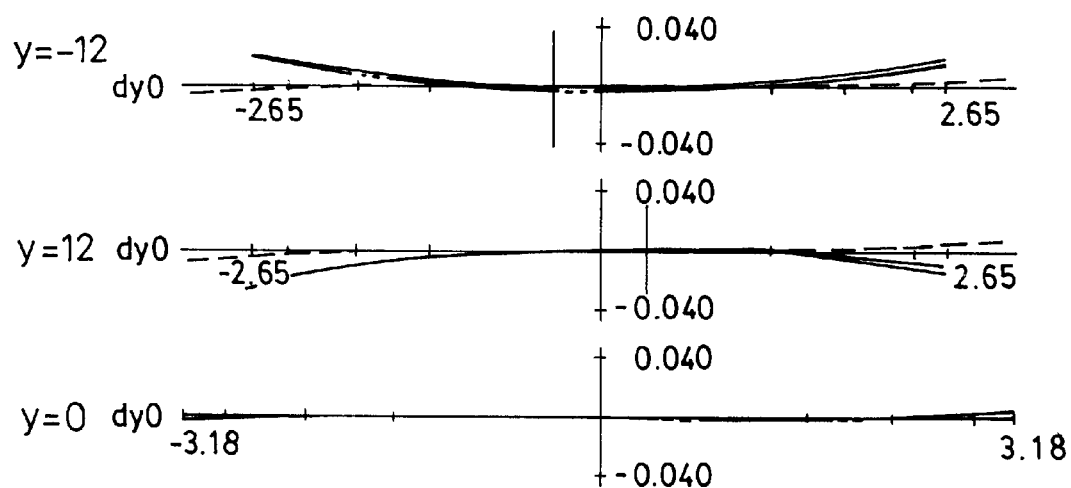
FIG. 27 is a graphic representation of transverse aberrations in the middle focal length range of the numerical example 4 of the zoom lens in a 0.2°-vibration-proofing state when the height of an image is 0, or ±12 mm.
Figure 28:
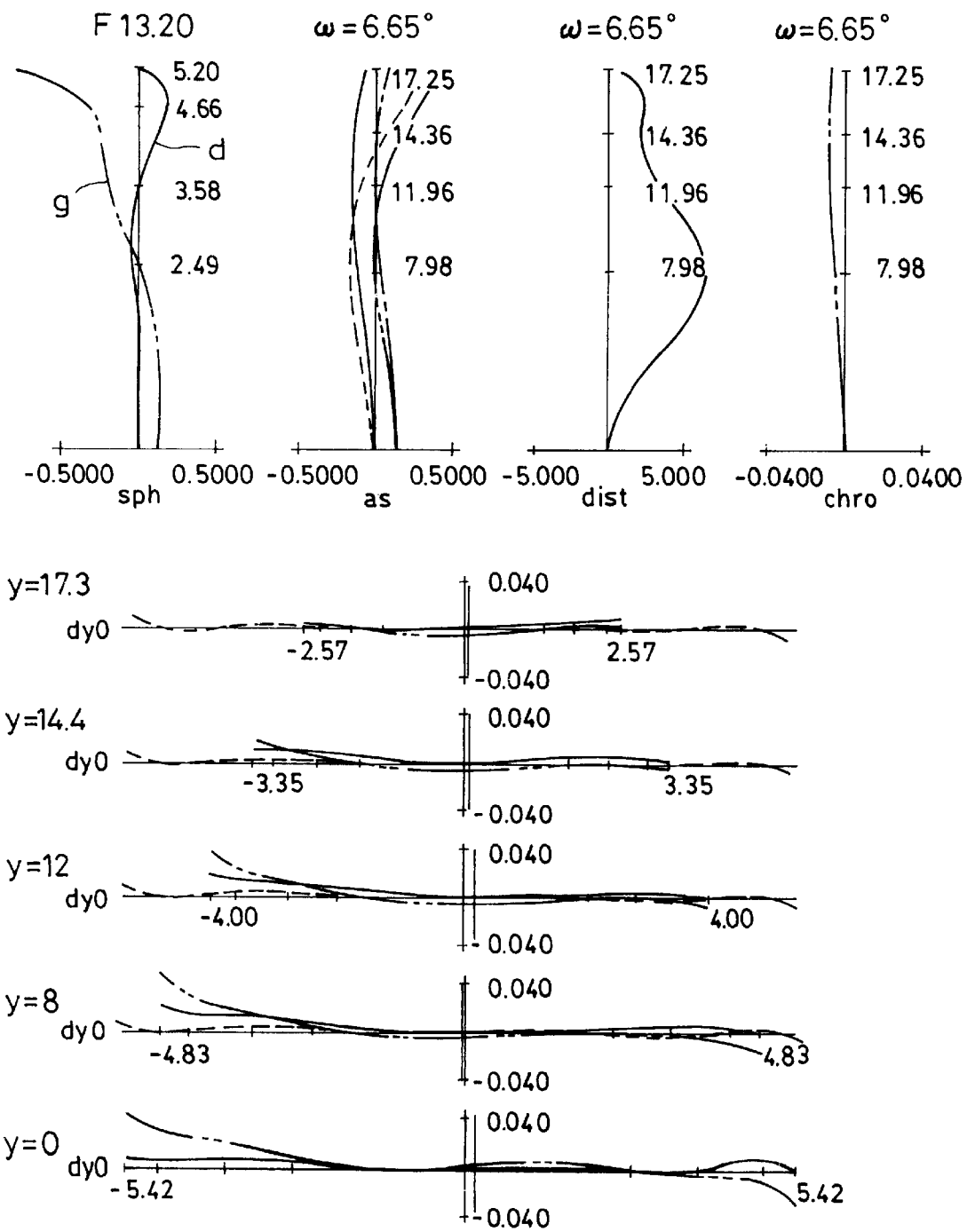
FIG. 28 is a graphic representation of aberrations at a telephoto end of the numerical example 4 of the zoom lens in a normal state.
Figure 29:
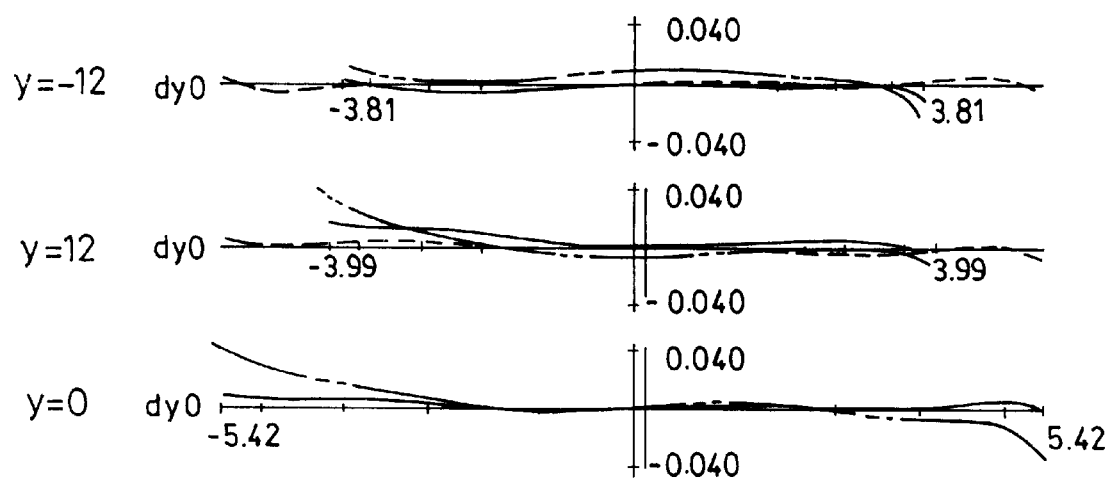
FIG. 29 is a graphic representation of transverse aberrations at the telephoto end of the numerical example 4 of the zoom lens in a 0.2°-vibration-proofing state when the height of an image is 0, or ±12 mm.
Figure 30A:
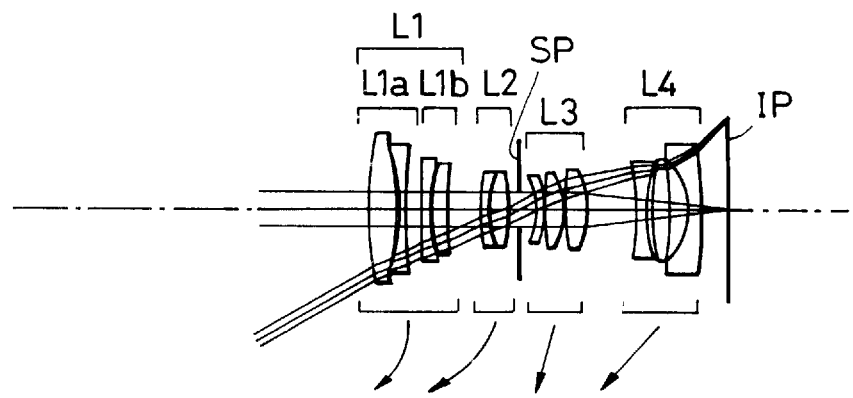
FIGS. 30A to 30C are sectional views of a numerical example 5 of a zoom lens of the present invention.
Figure 30B:
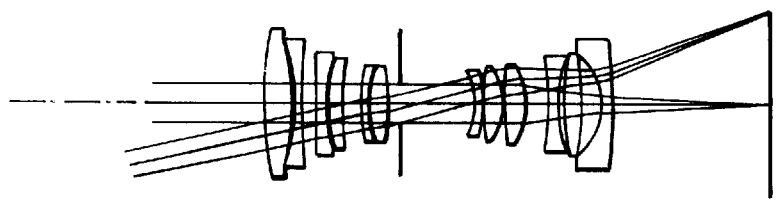
Figure 30C:
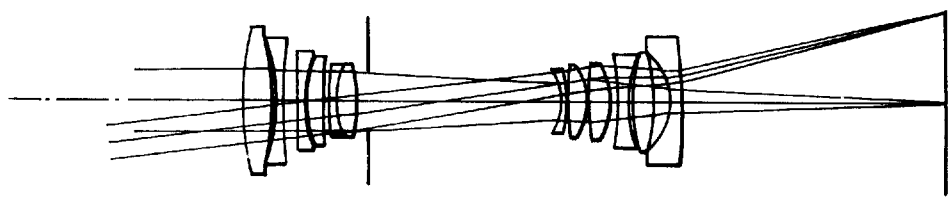

FIG. 24 is a graphic representation of aberrations at a wide-angle end of the numerical example 4 of the zoom lens in a normal state. FIG. 25 is a graphic representation of transverse aberrations at the wide-angle end of the numerical example 4 of the zoom lens in a 0.2°-vibration-proofing state when the height of an image is 0, or ±12 mm. FIG. 26 is a graphic representation of aberrations in a middle focal-length range of the numerical example 4 of the zoom lens in the normal state. FIG. 27 is a graphic representation of transverse aberrations in the middle focal length range of the numerical example 4 of the zoom lens in a 0.2°-vibration-proofing state when the height of an image is 0, or ±12 mm. FIG. 28 is a graphic representation of aberrations at a telephoto end of the numerical example 4 of the zoom lens in a normal state. FIG. 29 is a graphic representation of transverse aberrations at the telephoto end of the numerical example 4 of the zoom lens in a 0.2°-vibration-proofing state when the height of an image is 0, or ±12 mm.

The second lens group or unit L2 has a first lens sub-unit L2a of negative refractive power and a second lens sub-unit L2b of positive refractive power. Reference character "SP" designates a stop provided between the second and third lens units. Reference character "IP" denotes an image plane.

In these examples, when zooming from the wide-angle end to the telephoto end is performed, the lens units are moved to an object side so that the spacing between the first and second lens units increases, so that the spacing between the second and third lens units increases, and so that the spacing between the third and fourth lens units decreases.

Moreover, the second lens unit has, in order from the object side, a first lens sub-unit L2a of negative refractive power, and a second lens sub-unit L2b of positive refractive power. Furthermore, the first lens sub-unit L2a is moved perpendicularly to the optical axis. Thus, image shake is corrected.

Further, these examples of the zoom lens employ a rear-focus method, by which a third lens unit is moved in the direction of the optical axis. As the magnification varies, the stop SP moves in such a way as to be integral with the fourth lens unit.

Furthermore, these examples are adapted so that the following conditions are satisfied:

$$-0.9 < f2a/ft < -0.4 \quad (1)$$

$$-90 < f1/ft < -5 \quad (2)$$

where "ft", "f2a", and "f1" respectively designate the focal length of the entire system at the telephoto end, the focal length of the first lens sub-unit, and the focal-length of the first lens unit. Thus, the optical performance of each of these zoom lenses before a vibration-proofing operation is favorably maintained even after the vibration-proofing operation. The condition (1) relates to the focal-length of the entire system at the telephoto end and that of the first lens sub-system. The condition (2) relates to the focal length of the first lens unit. These conditions prescribe the power arrangement (thus, the characteristic matrix) in the first lens unit and the first lens sub-system so as to prevent mainly the generation of the vibration-proofing aberration component and to favorably maintain the imaging performance in the normal state.

In the case that the zoom lenses exceed the upper limits or the lower limits determined in the conditions (1) and (2), even when the power arrangement (or characteristic matrix) of the subsequent lens unit is changed, it becomes difficult to prevent the generation of the vibration-proofing aberration components, such as a vibration-proofing coma aberration and a vibration-proofing astigmatism, at the telephoto end and at each focal-length and to favorably and simultaneously correct aberrations, such as the spherical aberration and the coma aberration, in the normal state.

As a result, the power of each of the first and second lens sub-units L2a and L2b is enhanced. Although the driving amount of the first lens sub-unit L2a at the time of vibration-proofing, the values of the characteristic coefficients serving simultaneous solutions are not favorably obtained, if the first lens unit, and the first and second lens sub-units have simple lens configurations. Thus, unfavorably, the size of the lens system is increased.

Furthermore, preferably, the numerical ranges of the focal-lengths determined according to the conditions (1) and (2) met the following conditions (1a) and (2a). Thus, more favorable performance is obtained in both of the vibration-proofing state and the normal state. That is, $$-0.8 < f2a/ft < -0.5 \quad (1a); \text{ and}$$

$$-80 < f1/ft < -30 \quad (2a).$$

The zoom lens having the vibration-proofing function according to the present invention is realized by satisfying the aforementioned conditions. However, it is preferable for achieving favorable optical performance that the zoom lens meets at least one of the following conditions (A1) to (A15).

(A1) The first lens sub-unit L2a consists of one negative lens and one positive lens.

(A2) The first lens sub-unit L2a has at least one aspheric surface.

(A3) The single negative lens and the single positive lens of the first lens sub-unit L2a meet the following conditions (3) and (4):

$$vN > vP \quad (3); \text{ and}$$

$$NN < nP \quad (4)$$

where vN designates the Abbe number of the material of the negative lens of the first lens sub-unit L2a, and vP denotes the Abbe number of the material of the positive lens thereof, and nN designates the refractive power of the material of the negative lens thereof, and nP denotes the refractive power of the material of the positive lens thereof.

When the conditions (3) and (4) are satisfied, mainly the generation of the vibration-proofing chromatic aberration is suppressed. Simultaneously, the characteristic coefficients in the first-order region, which have values allotted to the entire second lens unit in the normal state, meet the requirements. Consequently, favorable imaging performance is obtained.

(A4) The second lens sub-unit L2a meets the following condition:

$$-3.5 < f2a/f2b < -1.5 \quad (5)$$

where f2b designates the focal-length of the second lens sub-unit L2a.

If the focal-length of the first lens sub-unit L2a exceeds the upper limit determined according to the condition (5) and is reduced, the driving amount of the first lens sub-unit L2a with respect to a certain vibration-proofing angle decreases. Consequently, it becomes difficult to drive and control this lens sub-unit.

Conversely, if the focal-length of the first lens sub-unit L2a exceeds the lower limit determined according to the condition (5) and becomes too long, the driving amount of the first lens sub-unit L2a with respect to the certain vibration-proofing angle increases. Consequently, it becomes difficult to correct the vibration-proofing aberrations.

Incidentally, more preferably, the zoom lens meets the following condition (5a):

$$-3.0 < f2a/f2b < -2.0 \quad (5a)$$

(A5) The second lens sub-unit L2b consists of one positive lens. Alternatively, the third lens unit consists of a negative lens, a positive lens, and a positive lens having at least one surface that is an aspheric surface. Alternatively, the fourth lens unit has at least one aspheric lens.

(A6) The zoom lens meets the following conditions (6) to (8):

$$3.5 < ft/fw < 6.5 \quad (6);$$

$$0.005 < T2a/fw < 0.05 \quad (7); \text{ and}$$

$$0.001 < T2a/ft < 0.01 \quad (8)$$

where fw designates the focal-length of the entire system at the wide-angle end, and T2a denotes the moving amount of the first lens sub-unit L2a from a position thereof in the normal state when the first lens sub-unit L2a is moved perpendicularly to the optical axis by a maximum amount.

If the focal-length at the telephoto end exceeds the upper limit determined according to the condition (6) and becomes too long, the total length of the zoom lens increases. Thus, the size of a camera employing the zoom lens is increased.

Conversely, if the focal-length at the telephoto end exceeds the lower limit determined according to the condition (6) and becomes too short, the vibration-proofing function added to the zoom lens falls in value.

The conditions (7) and (8) are set for suitably setting the shifting amounts at the maximum vibration-proofing angles at the wide-angle end and the telephoto end, and for ensuring a favorable vibration-proofing function. Thus, if the zoom lens exceeds such an upper or lower limit, it becomes difficult to obtain favorable vibration-proofing aberrations.

Incidentally, more preferably, the zoom lens meets the following conditions (6a), (7a), and (8a), instead of the conditions (6) to (8):

$$4.5 < ft/fw < 6.5 \quad (6a)$$

$$0.007 < T2a/fw < 0.02 \quad (7a); \text{ and}$$

$$0.0015 < T2a/ft < 0.05 \quad (8a).$$

(A7) The first lens unit consists of a biconvex positive lens and a biconcave negative lens.

(A8) The first lens sub-unit L2a consists of a negative lens, which has an image-side surface of refractive power higher than that of an object-side surface thereof, and a positive lens, which has an object-side surface of refractive power higher than that of an image-side surface thereof.

(A9) One of lens surfaces of the first lens sub-unit L2a, which is closest to the object, is an aspheric surface.

(A10) The second lens sub-unit L2b is constituted by a biconvex positive lens, which has an object-side surface of refractive power higher than that of an image-side surface thereof.

(A11) The third lens unit consists of a meniscus-like negative lens, whose convex surface is directed to an image side, and two biconvex positive lenses, which has an image-side surface of refractive power higher than that of an object-side surface thereof.

(A12) The fourth lens unit consists of two meniscus-like negative lenses, each of which has a convex surface directed to an image side.

(A13) The fourth lens unit consists of a biconcave negative lens.

(A14) The fourth lens unit consists of a meniscus-like positive lens, which has a convex surface directed to an image side, and a meniscus-like negative lens, which has a convex surface directed to an image side, and a negative lens having a concave surface directed to an object side.

(A15) One of lens surfaces, which is closest to the object, of the third lens unit is an aspheric surface.

Next, numerical data of the numerical example 1 to the numerical example 4 will be described hereinbelow. In each of the numerical examples, Ri designates the radius of curvature of an ith surface from an object side. Further, Di denotes an ith optical member or air space from the object side. Moreover, Ni and vI designate the refraction factor and the Abbe number of the ith optical member from the object side, respectively.

Furthermore, the relation among the aforementioned conditions and the numerical examples is shown in TABLE 1 listed below. The shape of the aspheric surface is represented in the coordinates with the X-axis in the axial direction and the H-axis in a direction perpendicular to the optical axis, the direction in which light advances is taken as positive, by the following equation:

$$X = \frac{(1/R)H^2}{1 + \sqrt{1 - (1+K)(H/R)^2}} + BH^4 + CH^6 + DH^8 + EH^{10}$$

where R designates the paraxial radius of curvature, and K, B, C, D, and E are aspheric coefficients. Additionally, the notation "e-0X" means "$\times 10^{-x}$". Further, the relation among various values of factors of the aforementioned conditions for the numerical examples is shown in TABLE 1.

Numerical Example 1

F = 30.90–146.20   Fno = 4.90–11.8   2ω = 58.4–13.5

| | | | |
|---|---|---|---|
| R1 = 31.088 | D1 = 4.00 | N1 = 1.563839 | v1 = 50.7 |
| R2 = −49.711 | D2 = 0.04 | | |
| R3 = −43.871 | D3 = 1.20 | N2 = 1.846659 | v2 = 23.8 |
| R4 = 63.542 | D4 = Variable | | |
| *R5 = −85.230 | D5 = 1.00 | N3 = 1.674700 | v3 = 54.9 |
| R6 = 36.772 | D6 = 0.24 | | |
| R7 = 56.313 | D7 = 1.80 | N4 = 1.846659 | v4 = 23.8 |
| R8 = 3130.342 | D8 = 0.20 | | |
| R9 = 28.948 | D9 = 2.30 | N5 = 1.728250 | v5 = 28.5 |
| R10 = 63.542 | D10 = Variable | | |
| R11 = Stop | D11 = Variable | | |
| R12 = −9.315 | D12 = 1.00 | N6 = 1.834000 | v6 = 37.2 |
| R13 = −59.691 | D13 = 0.20 | | |
| R14 = 41.027 | D14 = 3.60 | N7 = 1.487490 | v7 = 70.2 |
| R15 = −10.825 | D15 = 0.20 | | |
| R16 = 70.758 | D16 = 2.70 | N8 = 1.683126 | v8 = 59.4 |
| *R17 = −18.646 | D17 = Variable | | |
| R18 = −36.532 | D18 = 2.10 | N9 = 1.574700 | v9 = 54.9 |
| *R19 = −93.784 | D19 = 3.00 | | |
| R20 = −16.045 | D20 = 1.50 | N10 = 1.334807 | v10 = 42.7 |
| R21 = −122.553 | | | |

| | Focal Length | | |
|---|---|---|---|
| Variable Separation | 30.90 | 70.13 | 146.20 |
| D4 | 1.80 | 13.50 | 23.03 |
| D10 | 2.40 | 6.67 | 9.24 |
| D17 | 13.36 | 5.85 | 1.49 |

| Shifting Amount at Image Stabilization | |
|---|---|
| R5–R7 | 0.32 mm |
| 0.2° | |

*Aspheric Surface

Aspheric Coefficients Surface

| | | | |
|---|---|---|---|
| 5 | k = 0.00000e + 00 | B = 5.35086e − 06 | C = −5.77816e − 09 |
| | D = 6.83084e − 11 | E = 3.06796e − 12 | |
| 17 | k = 0.00000e + 00 | B = 7.98344e − 06 | C = 2.57702e − 09 |
| | D = 1.38658e − 09 | E = 1.00884e − 11 | |
| 19 | k = 0.00000e + 00 | B = −4.65282e − 06 | C = −2.44804e − 09 |
| | D = 2.85141e − 09 | E = −1.36618e − 11 | |

Numerical Example 2

F = 30.89–146.20   Fno = 4.60–19.23   2ω = 58.4–13.5

| | | | |
|---|---|---|---|
| R1 = 28.553 | D1 = 3.25 | N1 = 1.563839 | v1 = 60.7 |
| R2 = −68.117 | D2 = 0.04 | | |
| R3 = −62.529 | D3 = 1.20 | N2 = 1.846659 | v2 = 23.8 |
| R4 = 51.946 | D4 = Variable | | |
| *R5 = −97.748 | D5 = 1.00 | N3 = 1.674700 | v3 = 54.9 |
| R6 = 40.838 | D6 = 0.31 | | |
| R7 = 82.505 | D7 = 1.75 | N4 = 1.846659 | v4 = 23.8 |
| R8 = −335.524 | D8 = 0.20 | | |
| R9 = 31.816 | D9 = 2.50 | N5 = 1.805177 | v5 = 26.4 |
| R10 = −926.700 | D10 = Variable | | |
| R11 = Stop | D11 = Variable | | |
| R12 = −9.710 | D12 = 1.00 | N6 = 1.834000 | v6 = 37.2 |
| R13 = −120.810 | D13 = 0.20 | | |
| R14 = 31.687 | D14 = 3.33 | N7 = 1.487490 | v7 = 70.2 |
| R15 = −11.059 | D15 = 0.20 | | |
| R16 = 75.917 | D16 = 2.74 | N8 = 1.683126 | v8 = 59.4 |
| *R17 = −17.949 | D17 = Variable | | |
| R18 = −39.896 | D18 = 3.36 | N9 = 1.516830 | v9 = 54.9 |

-continued

| | | | |
|---|---|---|---|
| R19 = −16.960 | D19 = 0.93 | | |
| R20 = −15.564 | D20 = 1.40 | N10 = 1.674700 | ν10 = 54.9 |
| *R21 = −36.798 | D21 = 1.41 | | |
| R22 = −16.671 | D20 = 1.70 | N11 = 1.834807 | ν11 = 42.7 |
| R23 = 398.112 | | | |

| | Focal Length | | |
|---|---|---|---|
| Variable Separation | 30.90 | 59.86 | 146.20 |
| D4 | 2.00 | 15.31 | 26.58 |
| D10 | 2.00 | 5.87 | 9.08 |
| D11 | 3.00 | 10.23 | 14.42 |
| D17 | 12.91 | 5.68 | 1.49 |

| | Shifting Amount at Image Stabilization |
|---|---|
| R5–R7 0.2° | 0.32 mm |

*Aspheric Surface

Aspheric Coefficients Surface

| | | | |
|---|---|---|---|
| 5 | k = 0.00000e + 00 | B = 3.94833e − 06 | C = −1.88486e − 08 |
| | D = −5.46976e − 10 | E = 7.90500e − 12 | |
| 17 | k = 0.00000e + 00 | B = 8.88202e − 05 | C = 3.64211e − 07 |
| | D = −1.48846e − 09 | E = 7.36976e − 11 | |
| 19 | k = 0.00000e + 00 | B = −7.25065e − 05 | C = −3.00591e − 07 |
| | D = −4.63054e − 09 | E = 2.59700e − 11 | |

Numerical Example 3

| F = 29.31–137.39 | Fno = 4.90–11.10 | 2ω = 51.0–14.3 | |
|---|---|---|---|
| R1 = 24.055 | D1 = 3.70 | N1 = 1.563839 | ν1 = 60.7 |
| R2 = −130.135 | D2 = 0.32 | | |
| R3 = −68.458 | D3 = 1.20 | N2 = 1.846859 | ν2 = 23.8 |
| R4 = 48.780 | D4 = Variable | | |
| *R5 = 288.194 | D5 = 1.00 | N3 = 1.674700 | ν3 = 54.9 |
| R6 = 23.692 | D6 = 0.16 | | |
| R7 = 27.502 | D7 = 1.80 | N4 = 1.846659 | ν4 = 23.8 |
| R8 = 55.204 | D8 = 0.96 | | |
| R9 = 26.006 | D9 = 2.50 | N5 = 1.672700 | ν5 = 32.1 |
| R10 = −168.603 | D10 = Variable | | |
| R11 = Stop | D11 = Variable | | |
| R12 = −9.242 | D12 = 1.00 | N6 = 1.834000 | ν6 = 37.2 |
| R13 = −46.491 | D13 = 0.20 | | |
| R14 = 40.491 | D14 = 3.21 | N7 = 1.487490 | ν7 = 70.2 |
| R15 = −11.155 | D15 = 0.20 | | |
| R16 = 60.605 | D16 = 3.00 | N8 = 1.583126 | ν8 = 59.4 |
| *R17 = −15.556 | D17 = Variable | | |
| R18 = −18.365 | D18 = 2.10 | N9 = 1.574700 | ν9 = 40.8 |
| R19 = −81.684 | D19 = 1.24 | | |
| *R20 = −21.169 | D20 = 2.00 | N10 = 1.674700 | ν10 = 54.9 |
| R21 = −881.463 | | | |

| | Focal Length | | |
|---|---|---|---|
| Variable Separation | 29.31 | 74.99 | 137.39 |
| D4 | 2.00 | 13.46 | 22.71 |
| D10 | 2.00 | 6.89 | 10.00 |
| D17 | 11.46 | 5.26 | 2.04 |

| | Shifting Amount at Image Stabilization |
|---|---|
| R5–R7 0.2° | 0.36 mm |

*Aspheric Surface

Aspheric Coefficients Surface

| | | | |
|---|---|---|---|
| 5 | k = 0.00000e + 00 | B = 5.68126e − 06 | C = −4.34281e − 08 |
| | D = 1.86037e − 09 | E = 1.83764e − 11 | |
| 17 | k = 0.00000e + 00 | B = 1.07099e − 04 | C = 4.18563e − 07 |
| | D = −5.66887e − 09 | E = 1.18630e − 11 | |
| 19 | k = 0.00000e + 00 | B = 8.85487e − 05 | C = 8.73273e − 08 |
| | D = −5.16039e − 09 | E = 2.23506e − 11 | |

Numerical Example 4

| F = 31.31–147.41 | Fno = 4.60–13.20 | 2ω = 57.7–13.3 | |
|---|---|---|---|
| R1 = 28.942 | D1 = 2.77 | N1 = 1.563839 | ν1 = 60.7 |
| R2 = −458.941 | D2 = 0.32 | | |
| R3 = −81.000 | D3 = 1.20 | N2 = 1.846659 | ν2 = 23.8 |
| R4 = 75.003 | D4 = Variable | | |
| *R5 = 156.080 | D5 = 1.00 | N3 = 1.674700 | ν3 = 54.9 |
| R6 = 23.744 | D6 = 0.08 | | |
| R7 = 24.869 | D7 = 1.66 | N4 = 1.846659 | ν4 = 23.8 |
| R8 = 39.288 | D8 = 1.02 | | |
| R9 = 25.380 | D9 = 2.50 | N5 = 1.701536 | ν5 = 41.2 |
| R10 = −226.198 | D10 = Variable | | |
| R11 = Stop | D11 = Variable | | |
| R12 = −9.411 | D12 = 1.00 | N6 = 1.882997 | ν6 = 40.8 |
| R13 = −51.089 | D13 = 0.20 | | |
| R14 = 31.158 | D14 = 3.39 | N7 = 1.487490 | ν7 = 70.2 |
| R15 = −10.568 | D15 = 0.20 | | |
| R16 = 108.572 | D16 = 2.49 | N8 = 1.583126 | ν8 = 59.4 |
| *R17 = −18.011 | D17 = Variable | | |
| *R18 = −12.460 | D18 = 2.50 | N9 = 1.674700 | ν9 = 54.9 |
| R19 = 134.960 | | | |

| | Focal Length | | |
|---|---|---|---|
| Variable Separation | 31.31 | 69.42 | 147.41 |
| D4 | 2.00 | 12.17 | 23.93 |
| D10 | 2.00 | 5.06 | 8.41 |
| D17 | 13.88 | 6.84 | 2.08 |

| | Shifting Amount at Image Stabilization |
|---|---|
| R5–R7 0.2° | 0.32 mm |

*Aspheric Surface

Aspheric Coefficients Surface

| | | | |
|---|---|---|---|
| 5 | k = 0.00000e + 00 | B = 2.96091e − 06 | C = 5.72323e − 08 |
| | D = 3.83038e − 09 | E = 6.42130e − 11 | |
| 17 | k = 0.00000e + 00 | B = 1.05710e − 04 | C = 8.03080e − 07 |
| | D = 1.95935e − 08 | E = 3.36025e − 11 | |
| 18 | k = 0.00000e + 00 | B = 1.13551e − 04 | C = 2.15590e − 07 |
| | D = 5.61739e − 09 | E = 3.96304e − 11 | |

TABLE 1

| | CONDITION | | | | | | | | |
|---|---|---|---|---|---|---|---|---|---|
| | 1 | 2 | 3 | | 4 | | 5 | 6 | 7 | 8 |
| EXAMPLE | f2a/ft | fl/ft | vN | vP | nN | nP | f2a/f2b | ft/fw | T2a/fw | T2a/ft |
| 1 | −0.6 | −68 | 54.9 | 23.8 | 1.68 | 1.85 | −2.43 | 4.73 | 0.01 | 0.002 |
| 2 | −0.6 | −68 | 54.9 | 23.8 | 1.68 | 1.85 | −2.43 | 4.73 | 0.011 | 0.002 |
| 3 | −0.7 | −73 | 54.9 | 23.8 | 1.68 | 1.85 | −2.82 | 4.73 | 0.012 | 0.003 |
| 4 | −0.6 | −68 | 54.9 | 23.8 | 1.68 | 1.85 | −2.70 | 4.71 | 0.011 | 0.002 |

Next, other examples adapted to correct image blur by moving lens units, which are different from those of the numerical example 1 to the numerical example 4, perpendicularly to the optical axis, will be described hereinbelow.

FIGS. 30A to 30C, 37A to 37C, 44A to 44C, and 51A to 51C are sectional views of the zoom lenses of the numerical example 5 to the numerical example 8 (to be described later). In these figures, FIGS. 30A, 37A, 44A, and 51A correspond to the case that the zoom position is at a wide-angle end of each of the zoom lenses. FIGS. 30B, 37B, 44B, and 51B correspond to the case that the zoom position is a point in a middle focal-length range of each of the zoom lenses. FIGS. 30C, 37C, 44C, and 51C correspond to the case that the zoom position is at a telephoto end of each of the zoom lenses.

Figure 32:
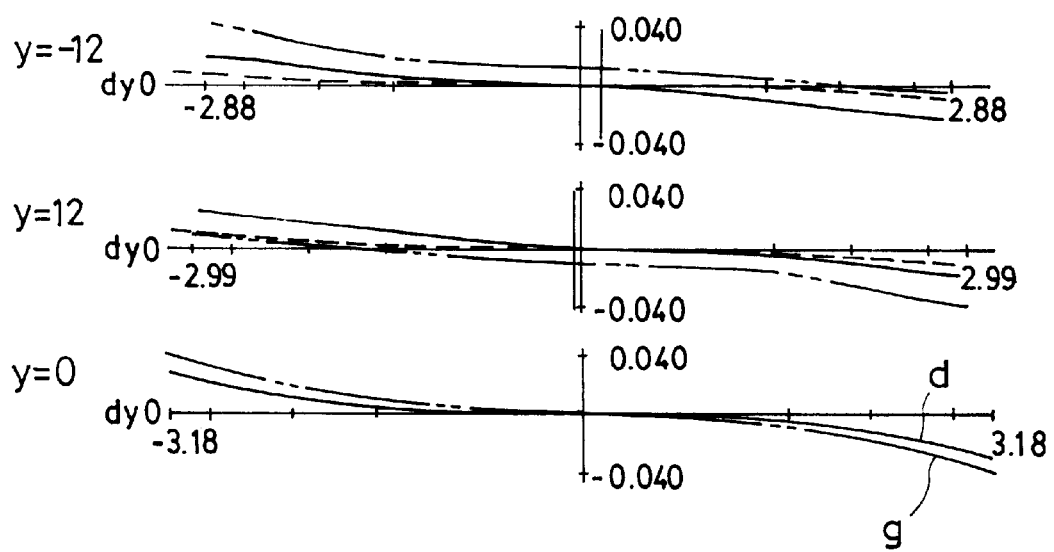
FIG. 32 is a graphic representation of transverse aberrations at the wide-angle end of the numerical example 5 of the zoom lens in a 0.2°-vibration-proofing state when the height of an image is 0, or ±12 mm.
Figure 34:
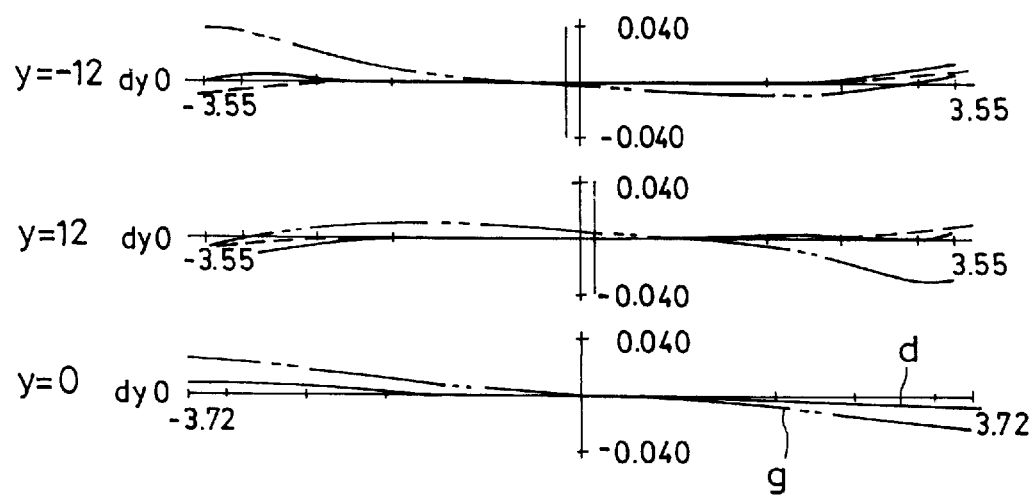
FIG. 34 is a graphic representation of transverse aberrations in the middle focal length range of the numerical example 5 of the zoom lens in a 0.2°-vibration-proofing state when the height of an image is 0, or ±12 mm.
Figure 36:
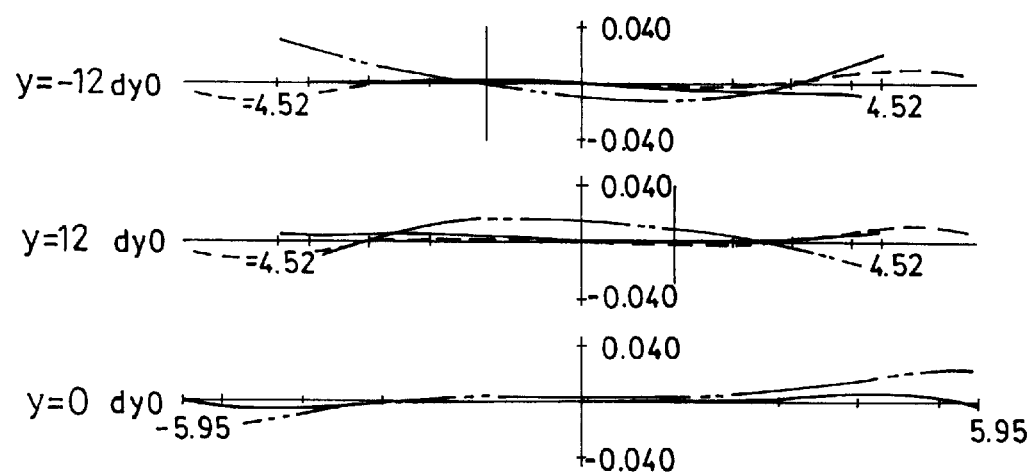
FIG. 36 is a graphic representation of transverse aberrations at the telephoto end of the numerical example 5 of the zoom lens in a 0.2°-vibration-proofing state when the height of an image is 0, or ±12 mm.
Figure 37A:
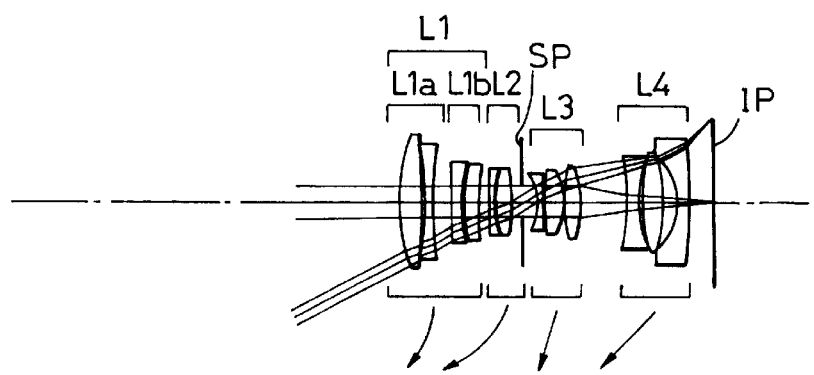
FIGS. 37A to 37C are sectional views of a numerical example 6 of a zoom lens of the present invention.
Figure 37B:
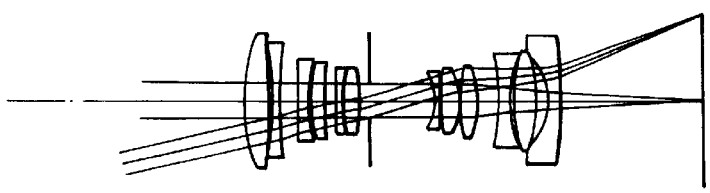
Figure 37C:
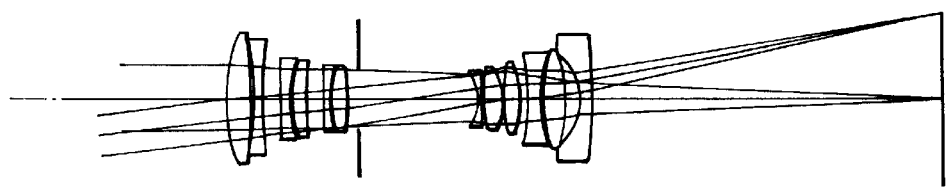

Further, FIG. 31 is a graphic representation of aberrations at a wide-angle end of the numerical example 5 of the zoom lens in a normal state. FIG. 32 is a graphic representation of transverse aberrations at the wide-angle end of the numerical example 5 of the zoom lens in a 0.2°-vibration-proofing state when the height of an image is 0, or ±12 mm. FIG. 33 is a graphic representation of aberrations in a middle focal-length range of the numerical example 5 of the zoom lens in the normal state. FIG. 34 is a graphic representation of transverse aberrations in the middle focal-length range of the numerical example 5 of the zoom lens in a 0.2°-vibration-proofing state when the height of an image is 0, or ±12 mm. FIG. 35 is a graphic representation of aberrations at a telephoto end of the numerical example 5 of the zoom lens in a normal state. FIG. 36 is a graphic representation of transverse aberrations at the telephoto end of the numerical example 5 of the zoom lens in a 0.2°-vibration-proofing state when the height of an image is 0, or ±12 mm.

Figure 38:
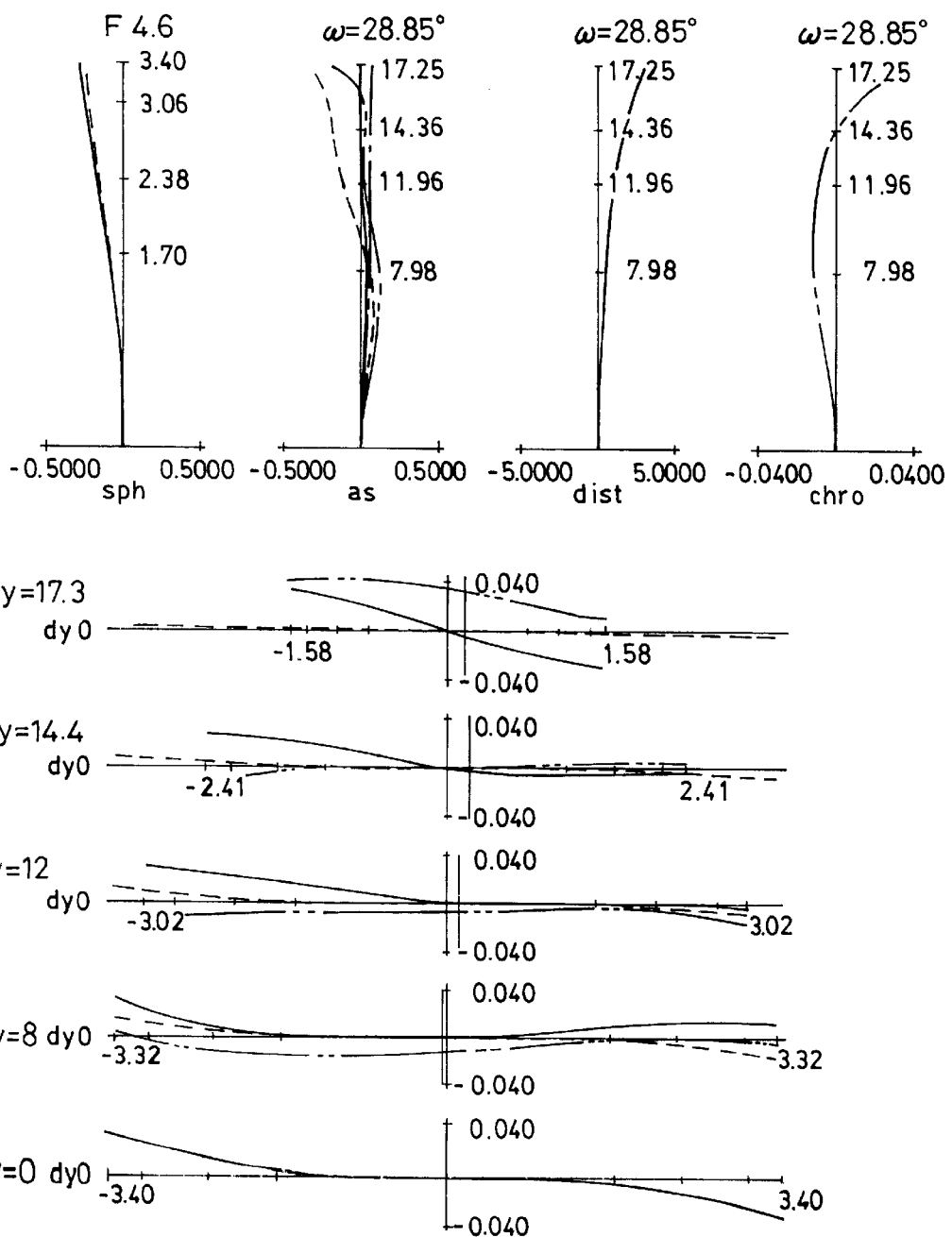
FIG. 38 is a graphic representation of aberrations at a wide-angle end of the numerical example 6 of the zoom lens in a normal state.
Figure 39:
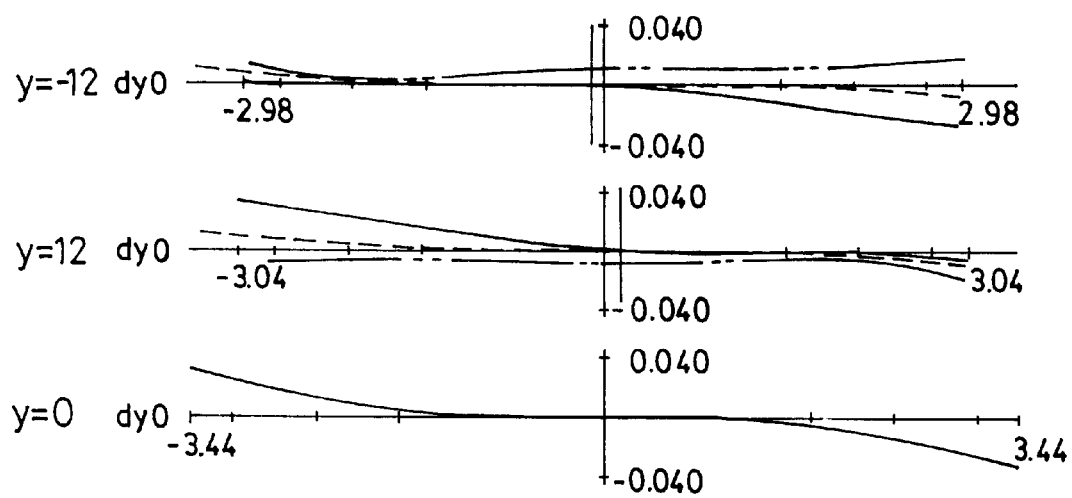
FIG. 39 is a graphic representation of transverse aberrations at the wide-angle end of the numerical example 6 of the zoom lens in a 0.2°-vibration-proofing state when the height of an image is 0, or ±12 mm.
Figure 40:
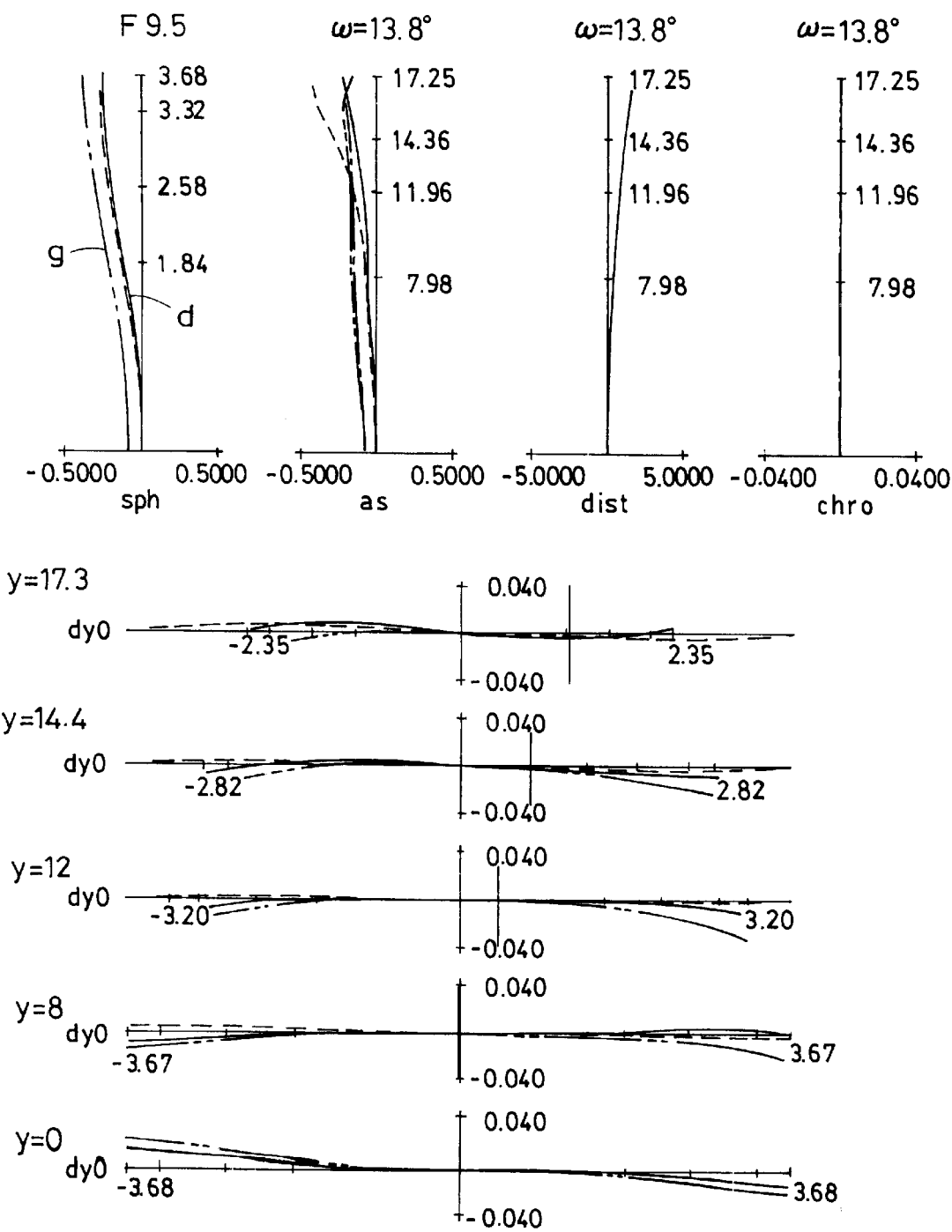
FIG. 40 is a graphic representation of aberrations in a middle focal length range of the numerical example 6 of the zoom lens in the normal state.
Figure 41:
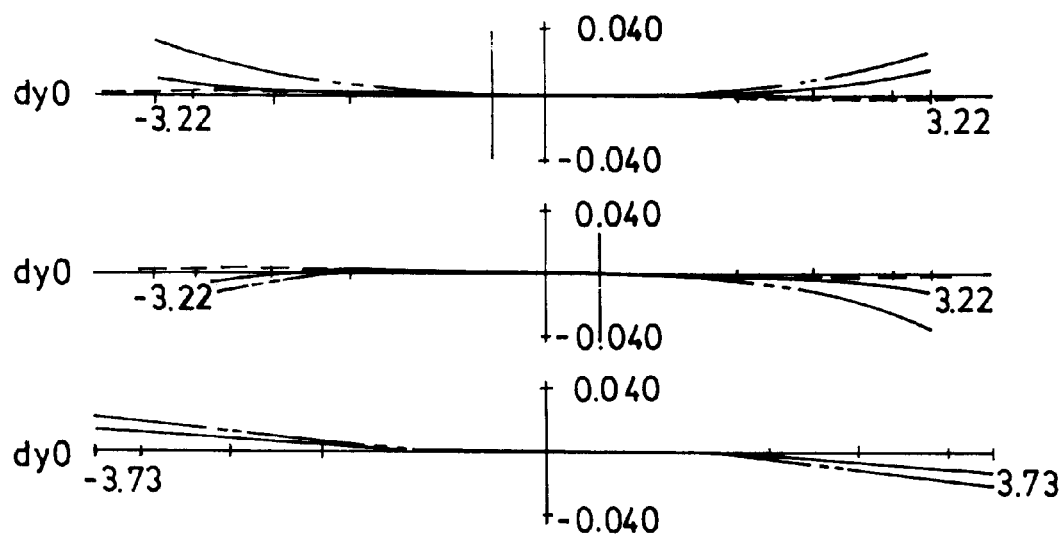
FIG. 41 is a graphic representation of transverse aberrations in the middle focal length range of the numerical example 6 of the zoom lens in a 0.2°-vibration-proofing state when the height of an image is 0, or ±12 mm.
Figure 43:
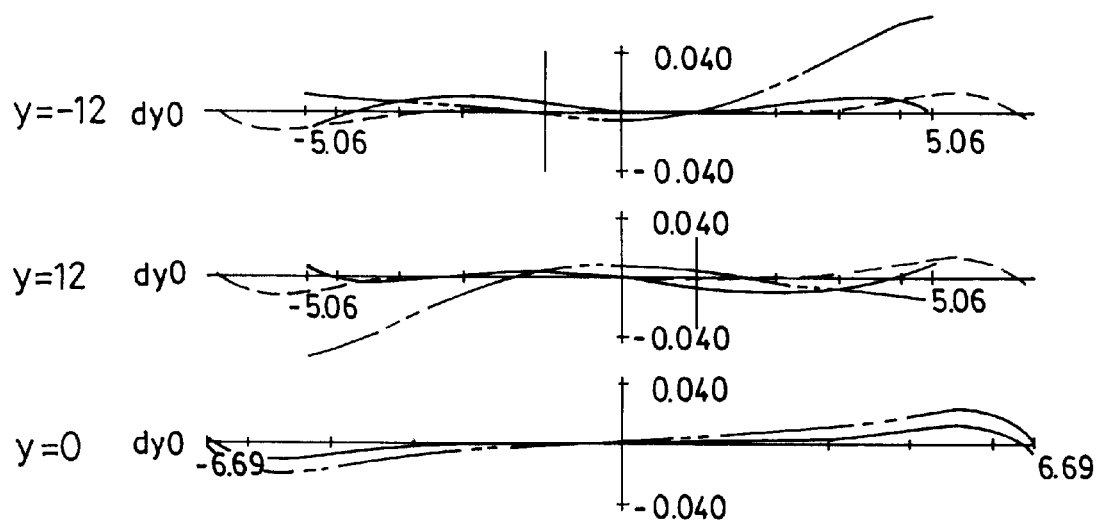
FIG. 43 is a graphic representation of transverse aberrations at the telephoto end of the numerical example 6 of the zoom lens in a 0.2°-vibration-proofing state when the height of an image is 0, or ±12 mm.
Figure 44A:
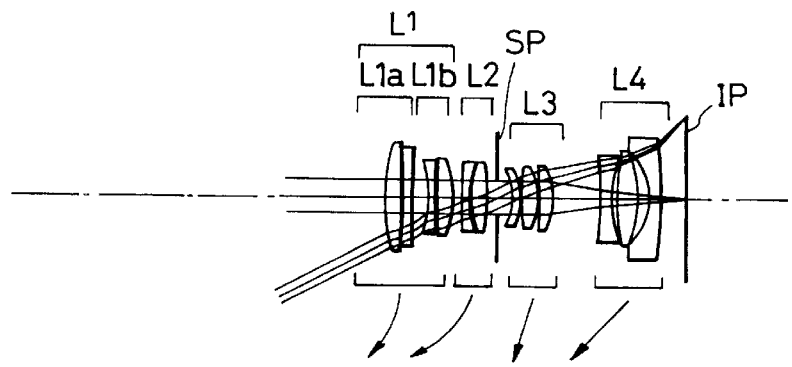
FIGS. 44A to 44C are sectional views of a numerical example 7 of a zoom lens of the present invention.
Figure 44B:
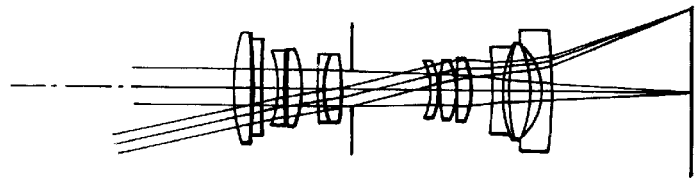
Figure 44C:
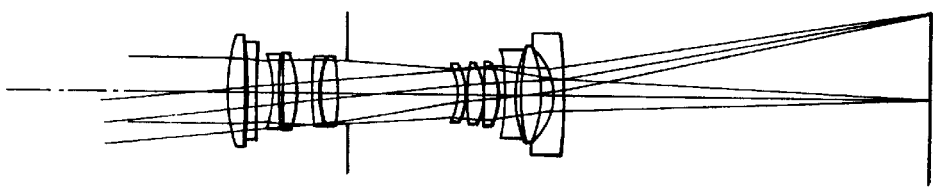

FIG. 38 is a graphic representation of aberrations at a wide-angle end of the numerical example 6 of the zoom lens in a normal state. FIG. 39 is a graphic representation of transverse aberrations at the wide-angle end of the numerical example 6 of the zoom lens in a 0.2°-vibration-proofing state when the height of an image is 0, or ±12 mm. FIG. 40 is a graphic representation of aberrations in a middle focal-length range of the numerical example 6 of the zoom lens in the normal state. FIG. 41 is a graphic representation of transverse aberrations in the middle focal-length range of the numerical example 6 of the zoom lens in a 0.2°-vibration-proofing state when the height of an image is 0, or ±12 mm. FIG. 42 is a graphic representation of aberrations at a telephoto end of the numerical example 6 of the zoom lens in a normal state. FIG. 43 is a graphic representation of transverse aberrations at the telephoto end of the numerical example 6 of the zoom lens in a 0.2°-vibration-proofing state when the height of an image is 0, or ±12 mm.

Figure 46:
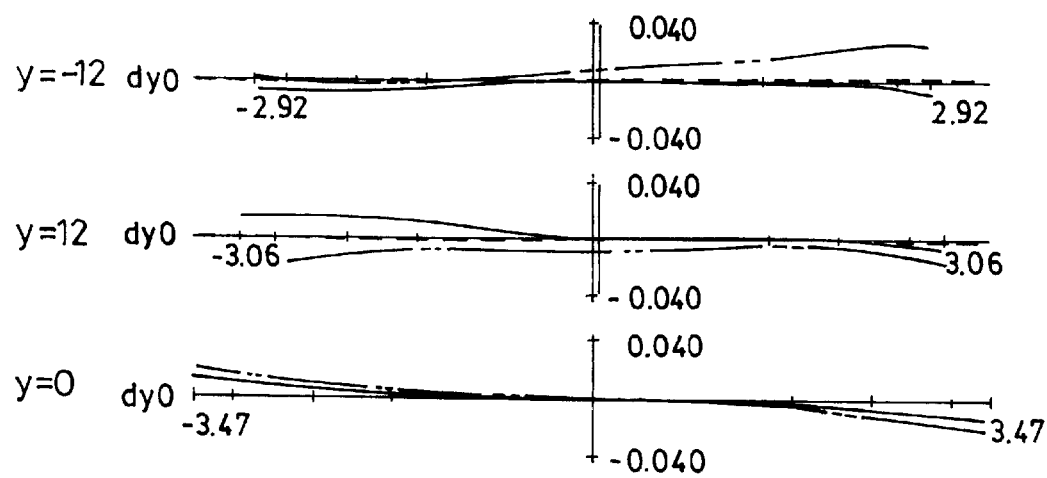
FIG. 46 is a graphic representation of transverse aberrations at the wide-angle end of the numerical example 7 of the zoom lens in a 0.2°-vibration-proofing state when the height of an image is 0, or ±12 mm.
Figure 48:
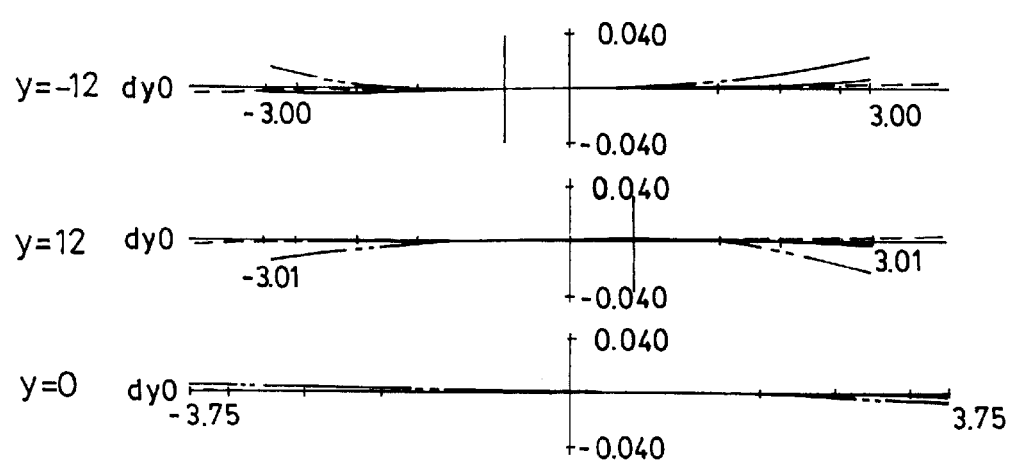
FIG. 48 is a graphic representation of transverse aberrations in the middle focal length range of the numerical example 7 of the zoom lens in a 0.2°-vibration-proofing state when the height of an image is 0, or ±12 mm.
Figure 49:
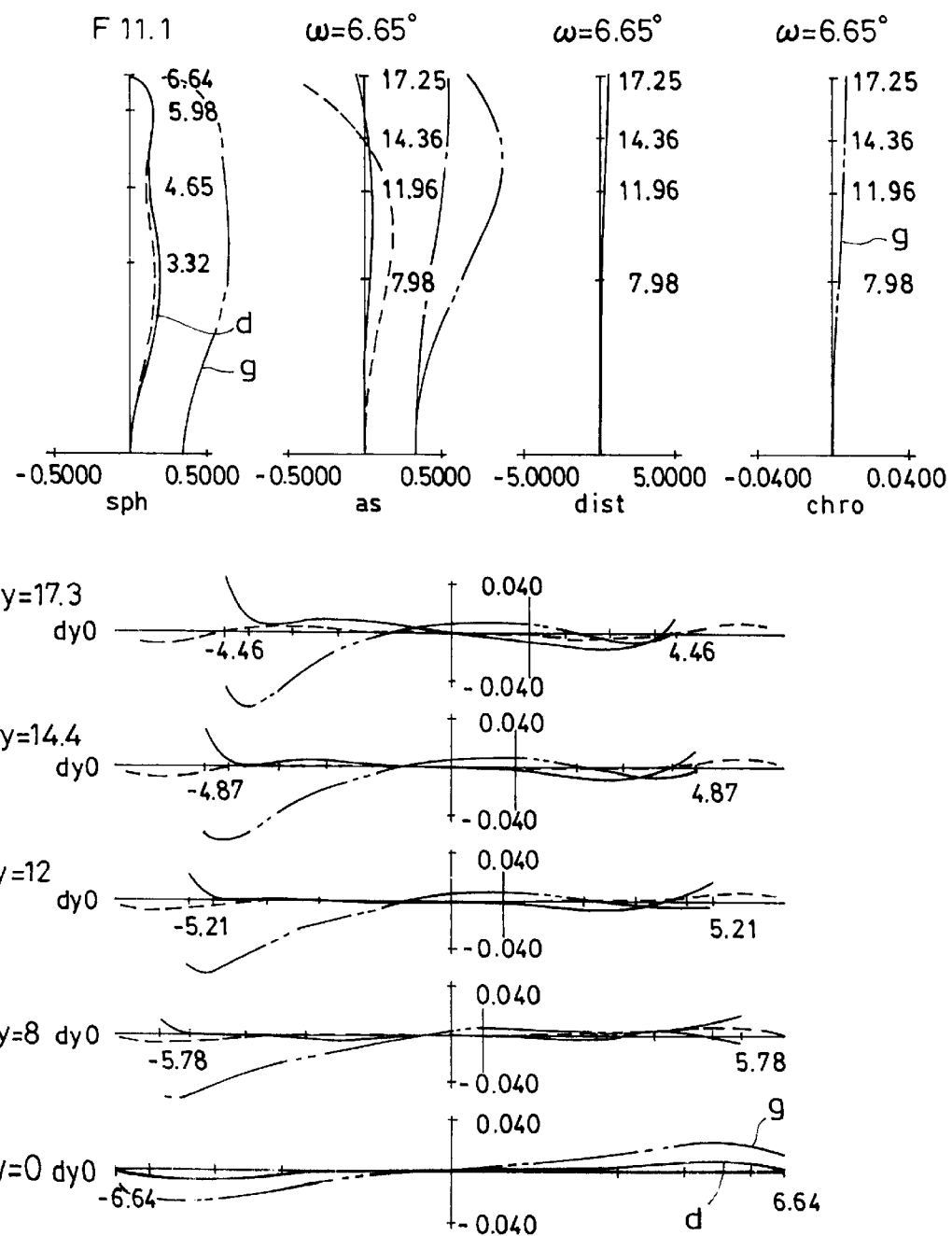
FIG. 49 is a graphic representation of aberrations at a telephoto end of the numerical example 7 of the zoom lens in a normal state.
Figure 50:
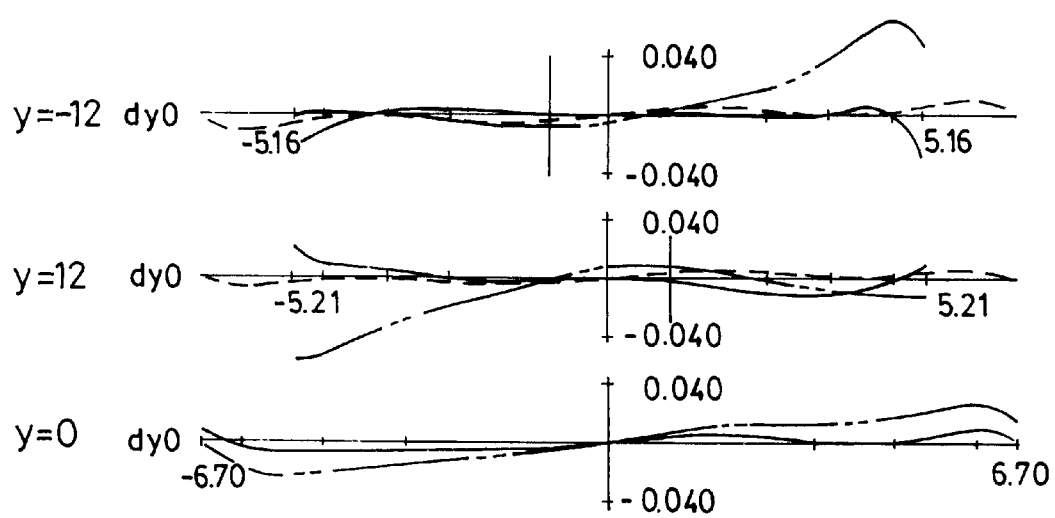
FIG. 50 is a graphic representation of transverse aberrations at the telephoto end of the numerical example 7 of the zoom lens in a 0.2°-vibration-proofing state when the height of an image is 0, or ±12 mm.
Figure 51A:
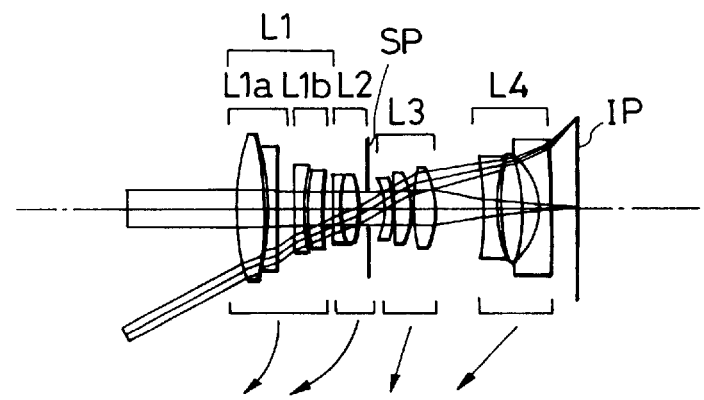
FIGS. 51A to 51C are sectional views of a numerical example 8 of a zoom lens of the present invention.
Figure 51B:
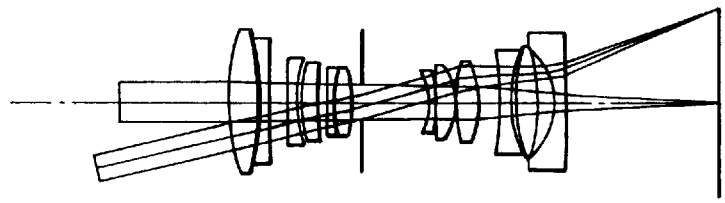
Figure 51C:
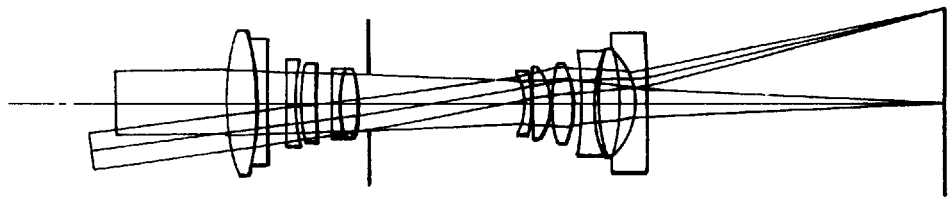

FIG. 45 is a graphic representation of aberrations at a wide-angle end of the numerical example 7 of the zoom lens in a normal state. FIG. 46 is a graphic representation of transverse aberrations at the wide-angle end of the numerical example 7 of the zoom lens in a 0.2°-vibration-proofing state when the height of an image is 0, or ±12 mm. FIG. 47 is a graphic representation of aberrations in a middle focal-length range of the numerical example 7 of the zoom lens in the normal state. FIG. 48 is a graphic representation of transverse aberrations in the middle focal-length range of the numerical example 7 of the zoom lens in a 0.2°-vibration-proofing state when the height of an image is 0, or ±12 mm. FIG. 49 is a graphic representation of aberrations at a telephoto end of the numerical example 7 of the zoom lens in a normal state. FIG. 50 is a graphic representation of transverse aberrations at the telephoto end of the numerical example 7 of the zoom lens in a 0.2°-vibration-proofing state when the height of an image is 0, or ±12 mm.

Figure 53:
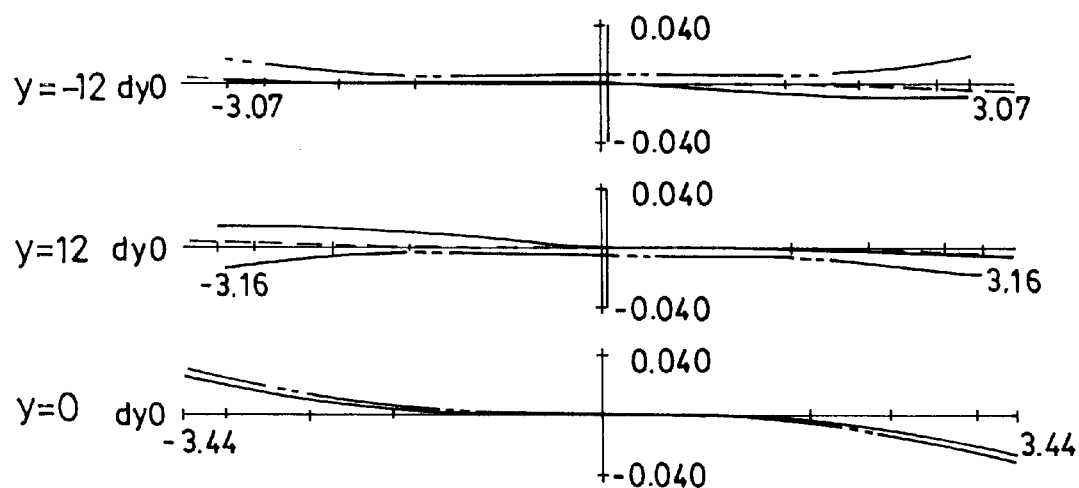
FIG. 53 is a graphic representation of transverse aberrations at the wide-angle end of the numerical example 8 of the zoom lens in a 0.2°-vibration-proofing state when the height of an image is 0, or ±12 mm.
Figure 55:
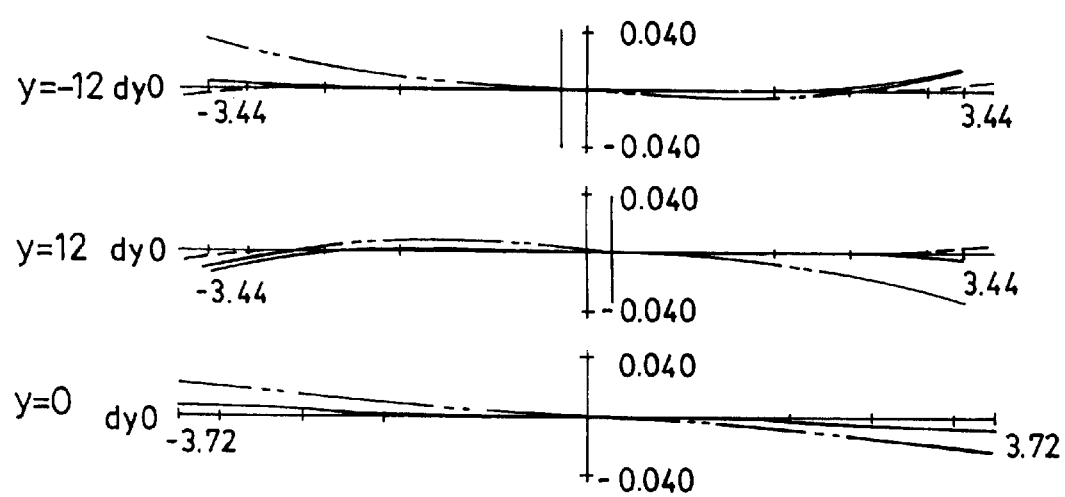
FIG. 55 is a graphic representation of transverse aberrations in the middle focal length range of the numerical example 8 of the zoom lens in a 0.2°-vibration-proofing state when the height of an image is 0, or ±12 mm.
Figure 56:
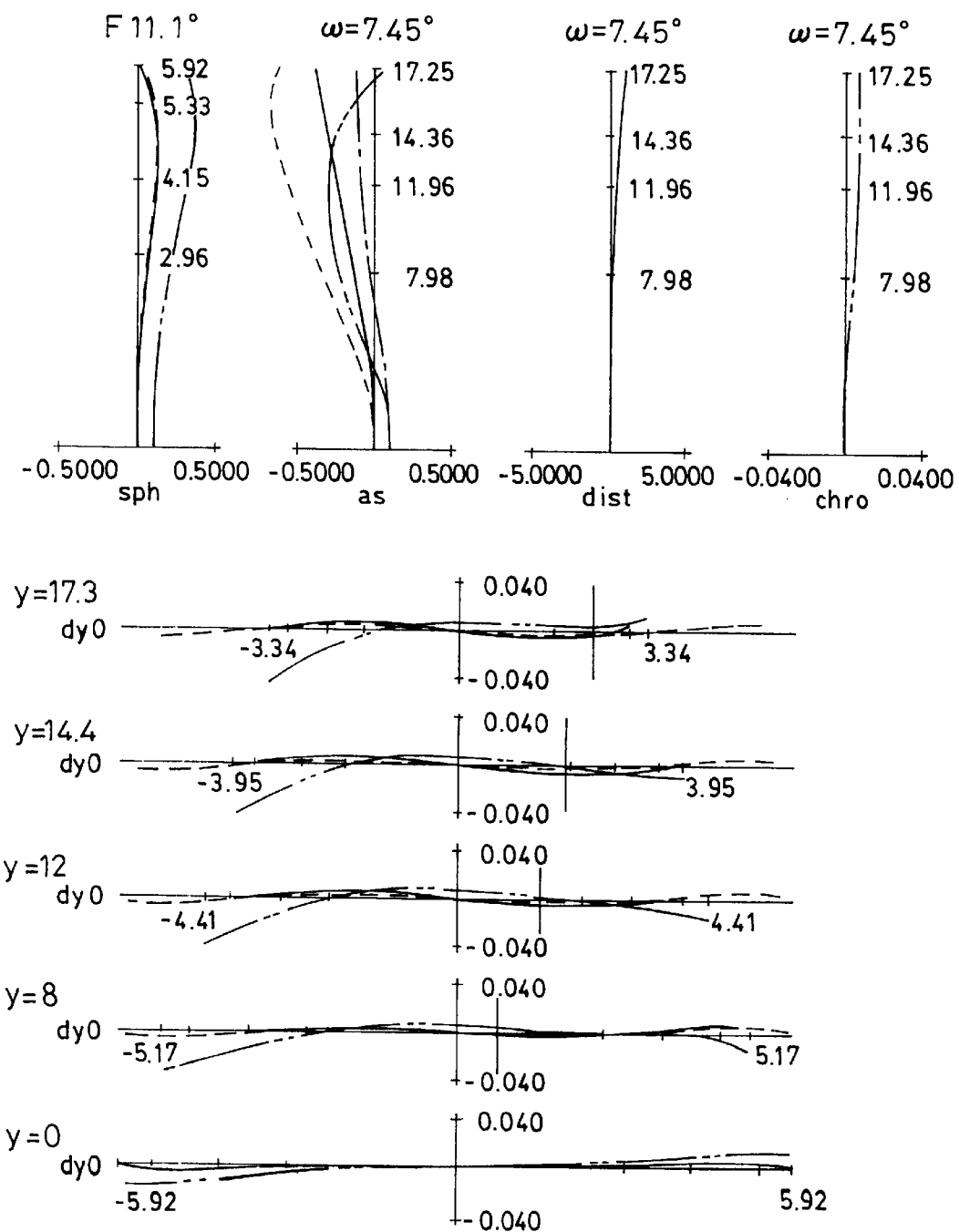
FIG. 56 is a graphic representation of aberrations at a telephoto end of the numerical example 8 of the zoom lens in a normal state.
Figure 57:
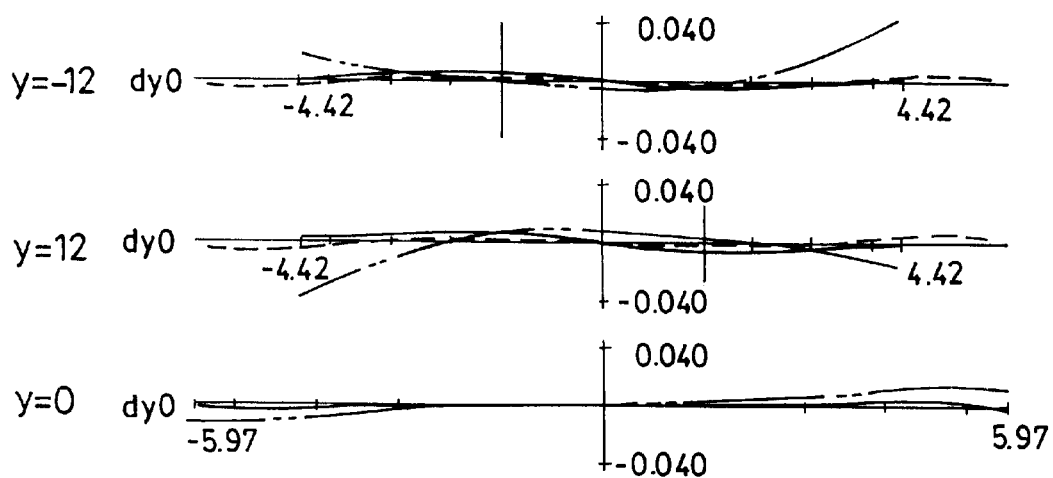
FIG. 57 is a graphic representation of transverse aberrations at the telephoto end of the numerical example 8 of the zoom lens in a 0.2°-vibration-proofing state when the height of an image is 0, or ±12 mm.

FIG. 52 is a graphic representation of aberrations at a wide-angle end of the numerical example 8 of the zoom lens in a normal state. FIG. 53 is a graphic representation of transverse aberrations at the wide-angle end of the numerical example 8 of the zoom lens in a 0.2°-vibration-proofing state when the height of an image is 0, or +12 mm. FIG. 54 is a graphic representation of aberrations in a middle focal-length range of the numerical example 8 of the zoom lens in the normal state. FIG. 55 is a graphic representation of transverse aberrations in the middle focal-length range of the numerical example 8 of the zoom lens in a 0.2°-vibration-proofing state when the height of an image is 0, or ±12 mm. FIG. 56 is a graphic representation of aberrations at a telephoto end of the numerical example 8 of the zoom lens in a normal state. FIG. 57 is a graphic representation of transverse aberrations at the telephoto end of the numerical example 8 of the zoom lens in a 0.2°-vibration-proofing state when the height of an image is 0, or ±12 mm.

In these figures, L1, L2, L3, and L4 respectively designate a first lens unit of negative refractive power, a second lens unit of positive refractive power, a third lens unit of positive refractive power, and a fourth lens unit of negative refractive power. The first lens group or unit L1 has a first lens sub-unit L1a of positive refractive power and a second lens sub-unit L1b of negative refractive power. Reference character "SP" designates a stop provided between the second and third lens units. Reference character "IP" denotes an image plane.

In these examples, when zooming from the wide-angle end to the telephoto end is performed, the lens units are moved to an object side so that the spacing between the first and second lens units increases, so that the spacing between the second and third lens units increases, and so that the spacing between the third and fourth lens units decreases.

Moreover, the first lens unit has, in order from the object side, a first lens sub-unit L1a of positive refractive power, and a second lens sub-unit L1b of negative refractive power. Furthermore, the second lens sub-unit L1b is moved perpendicularly to the optical axis. Thus, image shake is corrected. Further, these examples of the zoom lens employ the rear focus method, by which a third lens unit is moved in the direction of the optical axis.

Furthermore, these examples are adapted so that the following conditions are satisfied:

$$-0.9 < f1b/ft < -0.4 \quad (9)$$

$$-150 < f1/ft < 0 \quad (10)$$

where "ft", "f1b", and "f1" respectively designate the focal length of the entire system at the telephoto end, the focal length of the second lens sub-unit, and the focal-length of the first lens unit. Thus, the optical performance of each of these zoom lenses before a vibration-proofing operation is favorably maintained even after the vibration-proofing operation.

Hereinafter, these conditions (9) and (10) are explained. The condition (9) relates to a ratio between the focal-length of the entire system at the telephoto end and that of the second lens sub-system. The condition (10) relates to the focal-length of the first lens unit. These conditions prescribe the power arrangement (thus, the characteristic matrix) in the first lens unit and the first lens sub-system, especially, at the telephoto end, at which large vibration-proofing aberration components are produced, so as to prevent mainly the generation of the vibration-proofing aberration component and to favorably maintain the imaging performance in the normal state.

In the case that the zoom lenses exceed the upper limits or the lower limits determined in the conditions (9) and (10), even when the power arrangement (or characteristic matrix) of the subsequent lens unit is changed, it becomes difficult to prevent the generation of the vibration-proofing aberration components, such as a vibration-proofing coma aberration and a vibration-proofing astigmatism, at the telephoto end and at each focal-length and to favorably and simultaneously correct aberrations, such as spherical aberration and coma aberration, in the normal state.

Further, if the refractive power of the first lens unit exceeds the upper limit value determined according to the condition (10) and increases, the power of each of the second lens sub-unit L1b and the second lens unit is enhanced. Although the driving amount of the second lens sub-unit L1b at the time of vibration-proofing, the values of the characteristic coefficients serving simultaneous solutions are not favorably obtained, if the first lens sub-unit L1a, the second lens sub-unit L1b, and the second lens unit have simple lens configurations. Thus, unfavorably, the size of the lens system is increased.

Furthermore, preferably, the numerical ranges of the focal-lengths determined according to the conditions (9) and (10) met the following conditions (9a) and (10a). Thus, more favorable performance is obtained in both of the vibration-proofing state and the normal state. That is, $$-0.8 < f2a/ft < -0.5 \quad (9a); \text{ and}$$

$$-130 < f1/ft < -0.5 \quad (10a).$$

The zoom lens having the vibration-proofing function according to the present invention is realized by satisfying the aforementioned conditions. However, it is preferable for achieving the favorable optical performance that the zoom lens meets at least one of the following conditions (B1) to (B10).

(B1) The second lens sub-unit L1b consists of one negative lens and one positive lens.

(B2) The single negative lens and the single positive lens of the second lens sub-unit L1b meet the following conditions (11) and (12):

$$vN > vP \quad (11); \text{ and}$$

$$NN < nP \quad (12)$$

where vN designates the Abbe number of the material of the negative lens of the second lens sub-unit L1b, and vP denotes the Abbe number of the material of the positive lens thereof, and nN designates the refractive power of the material of the negative lens thereof, and nP denotes the refractive power of the material of the positive lens thereof.

When the conditions (11) and (12) are satisfied, mainly the generation of the vibration-proofing chromatic aberration is suppressed. Simultaneously, the characteristic coefficients in the first-order region, which have values allotted to the entire second lens unit in the normal state, meet the requirements. Consequently, favorable imaging performance is obtained.

(B3) The first lens sub-unit L1a meets the following condition:

$$-0.99 < f1b/f1a < 0 \quad (13)$$

where f1a designates the focal-length of the first lens sub-unit L1a.

If the focal-length of the second lens sub-unit L1b exceeds the lower limit determined according to the condition (13) and decreases, the driving amount of the second lens sub-unit L1b with respect to a certain vibration-proofing angle decreases. Consequently, it becomes difficult to drive and control this lens sub-unit.

Conversely, if the focal-length of the second lens sub-unit L1b exceeds the upper limit determined according to the condition (13) and becomes too long, the driving amount of the first lens sub-unit L2a with respect to the certain vibration-proofing angle increases. Consequently, it becomes difficult to correct the vibration-proofing aberrations.

Incidentally, more preferably, the zoom lens meets the following condition (13a) instead of the condition (13):

$$-0.97 < f1b/f1a < -0.01 \quad (13a)$$

(B4) The zoom lens meets the following conditions (14) to (16):

$$3.5 < ft/fw < 6.5 \quad (14);$$

$$0.005 < T1b/fw < 0.05 \quad (15); \text{ and}$$

$$0.001 < T1a/ft < 0.01 \quad (16)$$

where fw designates the focal-length of the entire system at the wide-angle end, and T1b denotes the shifting amount of the second lens sub-unit L1b from a position thereof in the normal state when the second lens sub-unit L1b is shifted by a maximum amount, namely, by an amount corresponding to a maximum correcting angle for the vibration-proofing function.

If the focal-length at the telephoto end exceeds the upper limit determined according to the condition (14) and becomes too long, the total length of the zoom lens increases. Thus, the size of a camera employing the zoom lens is increased.

Conversely, if the focal-length at the telephoto end exceeds the lower limit determined according to the condition (14) and becomes too short, the vibration-proofing function added to the zoom lens falls in value.

The conditions (15) and (16) are set for suitably setting the shifting amounts at the maximum vibration-proofing angles at the wide-angle end and the telephoto end, and for ensuring the favorable vibration-proofing function. Thus, if the zoom lens exceeds such an upper or lower limit, it becomes difficult to obtain favorable vibration-proofing aberrations.

Incidentally, more preferably, the zoom lens meets the following conditions (14a), (15a), and (16a), instead of the conditions (14) to (16):

$$4 < ft/fw < 5 \quad (14a);$$

$$0.007 < T1b/fw < 0.02 \quad (15a); \text{ and}$$

$$0.0015 < T1b/ft < 0.05 \quad (16a).$$

(B5) The first lens sub-unit L1*a* consists of a biconvex positive lens and a biconcave negative lens.

(B6) The second lens sub-unit L1*b* consists of a negative lens, which has an image-side surface of refractive power higher than that of an object-side surface thereof, and a positive lens, which has an object-side surface of refractive power higher than that of an image-side surface thereof, or consists of biconcave negative lens and a positive lens.

(B7) The second lens unit consists of a meniscus-like negative lens, whose convex surface is directed to an object side, and a biconvex positive lens, which has an object-side surface of refractive power higher than that of an image-side surface thereof.

(B8) The third lens unit consists of a meniscus-like negative lens, whose convex surface is directed to an image side, and two biconvex positive lenses, each of which has an image-side surface of refractive power higher than that of an object-side surface thereof.

(B9) One of lens surfaces, which is closest to an image, of the third lens unit is an aspheric surface.

(B10) The fourth lens unit consists of a biconcave negative lens, a biconvex positive lens, and a negative lens having a concave surface directed to an object side.

Next, numerical data of the numerical example 5 to the numerical example 8 will be described hereinbelow. Further, the relation among various values of factors of the aforementioned conditions for the numerical examples is shown in TABLE 2.

Numerical Example 5

F = 28.88–131.49  Fno = 4.60–11.1  2ω = 61.7–14.9
R1 = 66.617    D1 = 4.87      N1 = 1.728249    ν1 = 28.5
R2 = −71.257   D2 = 0.80
R3 = −48.699   D3 = 1.50      N2 = 1.772499    ν2 = 49.6
R4 = 133.351   D4 = 2.50
R5 = 500.000   D5 = 1.50      N3 = 1.696797    ν3 = 55.5
R6 = 26.757    D6 = 0.45
R7 = 25.056    D7 = 2.80      N4 = 1.575006    ν4 = 41.5
R8 = 64.078    D8 = Variable
R9 = 30.976    D9 = 1.20      N5 = 1.846659    ν5 = 23.8
R10 = 17.200   D10 = 0.20
R11 = 16.533   D11 = 3.46     N6 = 1.516330    ν6 = 64.2
R12 = −48.439  D12 = 2.0
R13 = Stop     D13 = Variable
R14 = −10.461  D14 = 1.00     N7 = 1.834000    ν7 = 37.2
R15 = −31.165  D15 = 0.20
R16 = 51.163   D16 = 3.50     N8 = 1.487490    ν8 = 70.2
R17 = −15.239  D17 = 0.20
R18 = 60.506   D18 = 4.00     N9 = 1.583126    ν9 = 59.4
*R19 = −15.419 D19 = Variable
*R20 = −40.368 D20 = 2.00     N10 = 1.674700   ν10 = 54.9
R21 = 26.809   D21 = 0.82

-continued

R22 = 36.808   D20 = 3.40     N11 = 1.846659   ν11 = 23.8
R23 = −62.131  D23 = 3.48
R24 = −11.979  D24 = 2.00     N12 = 1.834807   ν12 = 42.7
R25 = −139.756

*Aspheric Surface

|  | Focal Length | | |
|---|---|---|---|
| Variable Separation | 28.88 | 70.00 | 131.49 |
| D8 | 6.11 | 3.61 | 1.00 |
| D19 | 8.94 | 3.90 | 1.50 |

Aspheric Coefficients Surface 19  k = 0.00000e + 00   B = 9.05279e − 05   C = 4.30885e − 07
    D = 7.78980e − 09   E = 6.01945e − 11
20  k = 0.00000e + 00   B = 6.70365e − 05   C = 2.95418e − 07
    D = −3.81524e − 09  E = 2.45204e − 11

| | Shifting Amount at Image Stabilization |
|---|---|
| R5–R8 0.2° | 0.35 mm |

Numerical Example 6

F = 31.31–147.44   Fno = 4.60–11.1   2ω = 57.7–13.3
R1 = 35.962    D1 = 4.68      N1 = 1.711731    ν1 = 28.7
R2 = −103.947  D2 = 0.80
R3 = −62.794   D3 = 1.50      N2 = 1.750663    ν2 = 49.5
R4 = 101.015   D4 = 3.50
R5 = 500.000   D5 = 1.50      N3 = 1.674700    ν3 = 54.9
R6 = 24.429    D6 = 0.80
R7 = 23.276    D7 = 2.80      N4 = 1.575006    ν4 = 41.5
R8 = 61.946    D8 = Variable
R9 = 83.580    D9 = 1.20      N5 = 1.846659    ν5 = 23.8
R10 = 19.453   D10 = 0.20
R11 = 17.691   D11 = 3.33     N6 = 1.516330    ν6 = 64.2
R12 = −35.655  D12 = 2.0
R13 = Stop     D13 = Variable
R14 = −9.806   D14 = 1.00     N7 = 1.834000    ν7 = 37.2
R15 = −43.770  D15 = 0.20
R16 = 51.936   D16 = 3.50     N8 = 1.487490    ν8 = 70.2
R17 = −13.172  D17 = 0.20
R18 = 33.594   D18 = 3.39     N9 = 1.583126    ν9 = 59.4
*R19 = −15.492 D19 = Variable
*R20 = −31.386 D20 = 2.00     N10 = 1.674700   ν10 = 54.9
R21 = 23.845   D21 = 1.02
R22 = 36.642   D22 = 3.99     N11 = 1.846659   ν11 = 23.8
R23 = −40.270  D23 = 3.08
R24 = −13.005  D24 = 2.00     N12 = 1.834807   ν12 = 42.7
R25 = −198.812

*: Aspheric Surface

|  | Focal Length | | |
| --- | --- | --- | --- |
| Variable Separation | 31.31 | 70.00 | 147.44 |
| D8 | 1.80 | 2.08 | 3.00 |
| D19 | 8.97 | 4.01 | 1.50 |

Aspheric Coefficients Surface

| 19 | k = 0.00000e + 00 | B = 1.00284e − 04 | C = 5.28959e − 07 |
| --- | --- | --- | --- |
| | D = −8.61856e − 09 | E = 5.47299e − 11 | |
| 20 | k = 0.00000e + 00 | B = 6.44361e − 06 | C = −5.54287e − 07 |
| | D = −9.50079e − 09 | E = 4.25321e − 11 | |

|  | Shifting Amount at Image Stabilization |
| --- | --- |
| R5-R8 0.2° | 0.38 mm |

Numerical Example 7

| F = 30.90–146.20 | Fno = 4.90–11.8 | 2ω = 58.6–13.6 | |
| --- | --- | --- | --- |
| R1 = 42.101 | D1 = 3.27 | N1 = 1.798243 | ν1 = 25.2 |
| R2 = −316.990 | D2 = 0.80 | | |
| R3 = −99.033 | D3 = 1.50 | N2 = 1.798938 | ν2 = 41.7 |
| R4 = 248.001 | D4 = 3.5 | | |
| *R5 = −22.249 | D5 = 1.00 | N3 = 1.674700 | ν3 = 54.9 |
| R6 = 80.580 | D6 = 0.80 | | |
| R7 = 1388.544 | D7 = 2.80 | N4 = 1.575006 | ν4 = 41.5 |
| R8 = −23.534 | D8 = Variable | | |
| R9 = 66.036 | D9 = 1.20 | N5 = 1.846659 | ν5 = 23.8 |
| R10 = 19.008 | D10 = 0.20 | | |
| R11 = 17.361 | D11 = 3.57 | N6 = 1.516330 | ν6 = 64.2 |
| R12 = −41.206 | D12 = 2.0 | | |
| R13 = Stop | D13 = Variable | | |
| R14 = −9.798 | D14 = 1.00 | N7 = 1.834000 | ν7 = 37.2 |
| R15 = −19.113 | D15 = 0.20 | | |
| R16 = 33.123 | D16 = 3.50 | N8 = 1.487490 | ν8 = 70.2 |
| R17 = −15.391 | D17 = 0.20 | | |
| R18 = −91.626 | D18 = 2.69 | N9 = 1.583126 | ν9 = 59.4 |
| *R19 = −15.352 | D19 = Variable | | |
| *R20 = −35.040 | D20 = 2.00 | N10 = 1.674700 | ν10 = 54.9 |
| R21 = 25.037 | D21 = 1.26 | | |
| R22 = 54.325 | D22 = 3.76 | N11 = 1.846659 | ν11 = 23.8 |
| R23 = −33.597 | D23 = 2.75 | | |
| R24 = −13.045 | D24 = 2.00 | N12 = 1.834807 | ν12 = 42.7 |
| R25 = −318.695 | | | |

*: Aspheric Surface

|  | Focal Length | | |
| --- | --- | --- | --- |
| Variable Separation | 31.31 | 70.00 | 147.44 |
| D8 | 1.80 | 3.01 | 3.00 |
| D19 | 9.87 | 4.37 | 1.50 |

|  | Shifting Amount at Image Stabilization |
| --- | --- |
| R5-R8 0.2° | 0.32 mm |

Aspheric Coefficients Surface

| 5 | k = 0.00000e + 00 | B = 1.00425e − 05 | C = 1.1789e − 07 |
| --- | --- | --- | --- |
| | D = −3.06894e − 09 | E = 2.68248e − 11 | |
| 19 | k = 0.00000e + 00 | B = 9.58381e − 05 | C = 3.50065e − 07 |
| | D = −5.09548e − 09 | E = 4.75803e − 11 | |
| 20 | k = 0.00000e + 00 | B = 6.80731e − 05 | C = 2.32305e − 07 |
| | D = −4.90769e − 09 | E = 1.60162e − 11 | |

Numerical Example 8

| F = 31.31–131.51 | Fno = 4.60–11.1 | 2ω = 57.7–14.9 | |
| --- | --- | --- | --- |
| R1 = 44.633 | D1 = 5.05 | N1 = 1.728249 | ν1 = 28.5 |
| R2 = −77.994 | D2 = 0.80 | | |
| R3 = −50.783 | D3 = 1.50 | N2 = 1.772499 | ν2 = 49.6 |
| R4 = 383.498 | D4 = 3.50 | | |
| R5 = 500.000 | D5 = 1.50 | N3 = 1.696797 | ν3 = 55.5 |
| R6 = 27.301 | D6 = 0.80 | | |
| R7 = 25.473 | D7 = 2.80 | N4 = 1.575006 | ν4 = 41.5 |
| R8 = 62.337 | D8 = Variable | | |
| R9 = 96.820 | D9 = 1.20 | N5 = 1.846659 | ν5 = 23.8 |
| R10 = 20.763 | D10 = 0.20 | | |
| R11 = 18.628 | D11 = 3.15 | N6 = 1.516330 | ν6 = 64.2 |
| R12 = −37.174 | D12 = 2.0 | | |
| R13 = Stop | D13 = Variable | | |
| R14 = −10.093 | D14 = 1.00 | N7 = 1.834000 | ν7 = 37.2 |
| R15 = −43.573 | D15 = 0.20 | | |
| R16 = 93.091 | D16 = 3.50 | N8 = 1.487490 | ν8 = 70.2 |
| R17 = −13.014 | D17 = 0.20 | | |
| R18 = −36.532 | D18 = 4.00 | N9 = 1.583126 | ν9 = 59.4 |
| *R19 = 30.541 | D19 = Variable | | |
| *R20 = −34.297 | D20 = 2.00 | N10 = 1.674700 | ν10 = 54.9 |
| R21 = 26.228 | D21 = 0.92 | | |
| R22 = 37.635 | D22 = 3.90 | N11 = 1.846659 | ν11 = 23.8 |
| R23 = −43.523 | D23 = 3.22 | | |
| R24 = −12.949 | D24 = 2.00 | N12 = 1.834807 | ν12 = 42.7 |
| R25 = −318.695 | | | |

*: Aspheric Surface

|  | Focal Length | | |
| --- | --- | --- | --- |
| Variable Separation | 31.31 | 70.00 | 131.51 |
| D8 | 1.80 | 1.78 | 3.00 |
| D19 | 9.00 | 3.88 | 1.50 |

Aspheric Coefficients Surface

| 19 | k = 0.00000e + 00 | B = 8.75800e − 05 | C = 4.00361e − 07 |
|---|---|---|---|
|    | D = −6.90275e − 09 | E = 4.41289e − 11 |    |
| 20 | k = 0.00000e + 00 | B = 6.23427e − 05 | C = 4.31661e − 07 |
|    | D = −6.58720e − 09 | E = 3.44407e − 11 |    |

|  | Shifting Amount at Image Stabilization |
|---|---|
| R5-R8 0.2° | 0.38 mm |

TABLE 2

| | CONDITION | | | | | | | |
|---|---|---|---|---|---|---|---|---|
| | 1 | 2 | 3 | 4 | 5 | 6 | 7 | 8 |
| EXAMPLE | f2a/ft | f1/ft | νN | νP | nN | nP | f2a/f2b | ft/fw | T2a/fw | T2a/ft |
| 5 | −0.7 | −0.8 | 55.5 | 41.5 | 1.7 | 1.58 | −0.02 | 4.55 | 0.012 | 0.003 |
| 6 | −0.6 | −9.3 | 54.9 | 41.5 | 1.68 | 1.58 | −0.80 | 4.71 | 0.012 | 0.003 |
| 7 | −0.6 | −115 | 54.9 | 41.5 | 1.68 | 1.58 | −0.96 | 4.71 | 0.01 | 0.002 |
| 8 | −0.7 | −128 | 55.5 | 41.5 | 1.7 | 1.58 | −0.87 | 4.20 | 0.012 | 0.003 |

According to each of the aforementioned examples, there is provided a compact zoom lens, that has a simple lens configuration and well corrects aberrations in both of the normal state and the vibration-proofing state, in spite of a high magnification ratio.

Next, an embodiment of an imaging device having the zoom lens, which is one of the example 1 to the example 8, is described hereinbelow.

Figure 58A:
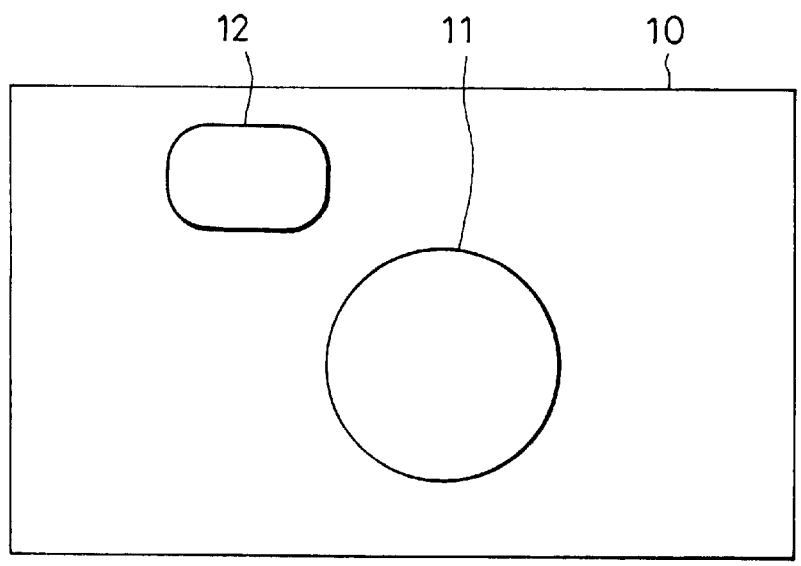
FIGS. 58A and 58B are schematic diagrams showing the configuration of a imaging device having a zoom lens of the present invention.
Figure 58B:
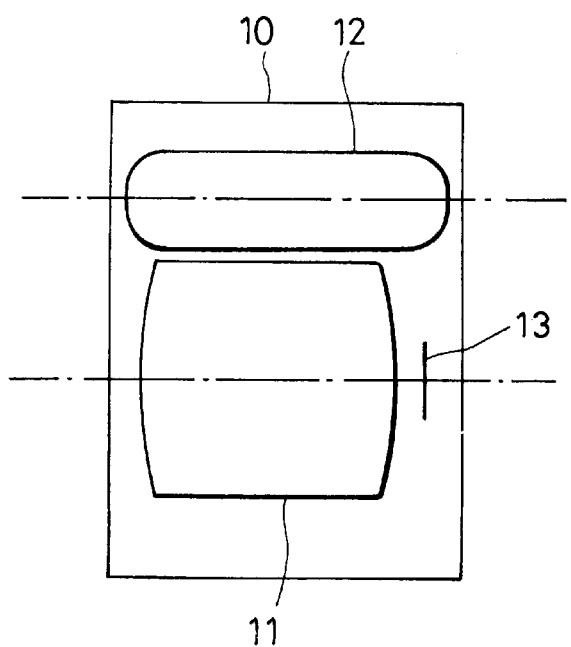

FIGS. 58A and 58B are a front view and a side sectional view of this imaging device, respectively. In these figures, reference numerals 10, 11, 12, and 13 respectively designate the main unit (or casing) of the imaging device, an imaging optical system employing one of the zoom lenses of the numerical example 1 to the numerical example 8, a finder optical system, and film serving as a photosensitive face.

Thus, a compact high-performance imaging device is realized by applying one of the zoom lenses of the numerical example 1 to the numerical example 8 to an imaging optical system of the imaging device.

Although the preferred embodiments of the present invention have been described above, it should be understood that the present invention is not limited thereto and that other modifications will be apparent to those skilled in the art without departing from the sprint of the invention.

The scope of the present invention, therefore, should be determined solely by the appended claims.

What is claimed is:

1. A zoom lens comprising, in order from an object side:
a first lens unit of negative refractive power;
a second lens unit of positive refractive power, which has, in order from an object side, a first lens sub-unit of negative refractive power, and a second lens sub-unit of positive refractive power, an image being displaced by moving said second lens sub-unit in such a manner as to have a component perpendicular to an optical axis;
a third lens unit of positive refractive power; and
a fourth lens unit of negative refractive power,
wherein, when zooming from a wide-angle end to a telephoto end is performed, the spacing between said first and second lens units increases, and the spacing between said third and fourth lens units decreases, and
wherein the following conditions are met:

$$-0.9 < f2a/ft < -0.4, \text{ and}$$

$$-90 < f1/ft < -5$$

where "ft", "f2a", and "f1" respectively designate the focal-length of the entire system at the telephoto end, the focal-length of said first lens sub-unit, and the focal-length of said first lens unit.

2. The zoom lens according to claim 1, wherein the spacing between said second and third lens units increases when the zooming from the wide-angle end to the telephoto end is performed.

3. The zoom lens according to claim 1, wherein said first lens sub-unit consists of one negative lens and one positive lens.

4. The zoom lens according to claim 3, which meets the following conditions:

$$νN > νP; \text{ and}$$

$$NN < nP$$

where νN designates the Abbe number of a material of said negative lens, and νP denotes the Abbe number of a material of said positive lens, and nN designates the refractive power of the material of said negative lens, and nP denotes the refractive power of the material of said positive lens.

5. The zoom lens according to claim 1, wherein said first lens sub-unit has at least one aspheric lens.

6. The zoom lens according to claim 1, which meets the following condition:

$$-3.5 < f2a/f2b < -1.5$$

where f2b designates the focal length of said second lens sub-unit.

7. The zoom lens according to claim 1, wherein said second lens sub-unit consists of one positive lens.

8. The zoom lens according to claim 1, wherein said third lens unit consists of, in order from the object side, a negative lens, a positive lens, and a positive lens having at least one surface that is an aspheric surface.

9. The zoom lens according to claim 1, wherein said fourth lens unit has at least one aspheric lens.

10. The zoom lens according to claim 1, which meets the following conditions:

$$3.5 < ft/fw < 6.5;$$

$$0.005 < T2a/fw < 0.05; \text{ and}$$

$$0.001 < T2a/ft < 0.01$$

where fw designates the focal-length of the entire system at the wide-angle end, and T2a denotes the moving amount of said first lens sub-unit from a position thereof in a normal state when said first lens sub-unit is moved perpendicularly to the optical axis by a maximum amount.

11. A zoom lens comprising, in order from an object side:
a first lens unit of negative refractive power, which has, in order from an object side, a first lens sub-unit of positive refractive power, and a second lens sub-unit of negative refractive power, an image being displaced by moving said second lens sub-unit in such a way as to have a component perpendicular to an optical axis;
a second lens unit of positive refractive power;
a third lens unit of positive refractive power; and
a fourth lens unit of negative refractive power,
wherein, when zooming from a wide-angle end to a telephoto end is performed, the spacing between said second and third lens units increases, and the spacing between said third and fourth lens units decreases, and
wherein the following conditions are met:

$-0.9 < f1b/ft < -0.4$, and $-150 < f1/ft < -5$ where "ft", "f1b", and "f1" respectively designate the focal length of the entire system at the telephoto end, the focal length of said second lens sub-unit, and the focal length of said first lens unit.

12. The zoom lens according to claim 11, wherein the spacing between said first and second lens units increases when the zooming from the wide-angle end to the telephoto end is performed.

13. The zoom lens according to claim 11, wherein said second lens sub-unit consists of one negative lens and one positive lens.

14. The zoom lens according to claim 13, which meets the following conditions:

$vN > vP$; and $NN < nP$ where vN designates the Abbe number of a material of said negative lens, and vP denotes the Abbe number of a material of said positive lens, and nN designates the refractive power of the material of said negative lens, and nP denotes the refractive power of the material of said positive lens.

15. The zoom lens according to claim 13, which meets the following condition:

$-0.99 < f1b/f1a < 0$ where f1a designates the focal-length of said first lens sub-unit.

16. The zoom lens according to claim 11, which meets the following conditions:

$3.5 < ft/fw < 6.5$;

$0.005 < T1b/fw < 0.05$; and $0.001 < T1b/ft < 0.01$ where fw designates the focal length of the entire system at the wide-angle end, and T1b denotes the moving amount of said second lens sub-unit from a position thereof in a normal state when said second lens sub-unit is moved perpendicularly to the optical axis by a maximum amount.

17. An optical device comprising a zoom lens, which has, in order from an object side:
a first lens unit of negative refractive power;
a second lens unit of positive refractive power, which has, in order from an object side, a first lens sub-unit of negative refractive power, and a second lens sub-unit of positive refractive power, an image being displaced by moving said second lens sub-unit in such a manner as to have a component perpendicular to an optical axis;
a third lens unit of positive refractive power; and
a fourth lens unit of negative refractive power,
wherein, when zooming from a wide-angle end to a telephoto end is performed, the spacing between said first and second lens units increases, and the spacing between said third and fourth lens units decreases, and
wherein the following conditions are met:

$-0.9 < f2a/ft < -0.4$, and $-90 < f1/ft < -5$ where "ft", "f2a", and "f1" respectively designate the focal length of the entire system at the telephoto end, the focal length of said first lens sub-unit, and the focal length of said first lens unit.

18. An optical device comprising a zoom lens, which has, in order from an object side:
a first lens unit of negative refractive power; which has, in order from an object side, a first lens sub-unit of positive refractive power, and a second lens sub-unit of negative refractive power, an image being displaced by moving said second lens sub-unit in such a way as to have a component perpendicular to an optical axis;
a second lens unit of positive refractive power;
a third lens unit of positive refractive power; and
a fourth lens unit of negative refractive power,
wherein, when zooming from a wide-angle end to a telephoto end is performed, the spacing between said second and third lens units increases, and the spacing between said third and fourth lens units decreases, and
wherein the following conditions are met:

$-0.9 < f1b/ft < -0.4$, and $-150 < f1/ft < -5$ where "ft", "f1b", and "f1" respectively designate the focal length of the entire system at the telephoto end, the focal length of said second lens sub-unit, and the focal length of said first lens unit.

* * * * *

UNITED STATES PATENT AND TRADEMARK OFFICE
CERTIFICATE OF CORRECTION

PATENT NO.    : 6,327,099 B1
DATED         : December 4, 2001
INVENTOR(S)   : Yoshinori Itoh It is certified that error appears in the above-identified patent and that said Letters Patent is hereby corrected as shown below:

Column 1,
Line 27, "much" should be deleted.
Line 63, "variable-angle prism-vibration-proof" should read -- variable-angle-prism, vibration-proof --.

Column 3,
Line 19, "favorably" should read -- that favorably --.

Column 7,
Line 9, "a" should read -- an --.

Column 9,
Line 26, "matrices" should read -- matrices. --.

Column 10,
Line 19, "middle-focal" should read -- middle focal --.

Column 25,
Line 13, "1 2 3 4 5 6 7 8" should read -- 9 10 11 12 12 14 15 16 --.
Line 14, "f2a/ft" should read -- flb/ft --; "f2a/f2b" should read -- flb/fla --; "T2a/fw" should read -- T1b/fw --; and "T2a/ft" should read -- T1b/ft --.
Line 32, "lens, that" should read -- lens that --.

Signed and Sealed this

Tenth Day of September, 2002

Attest:

JAMES E. ROGAN
Attesting Officer    Director of the United States Patent and Trademark Office